(12) United States Patent
Bakhash

(10) Patent No.: US 11,112,931 B2
(45) Date of Patent: *Sep. 7, 2021

(54) SYSTEM AND METHOD FOR PROVIDING THREE-DIMENSIONAL GRAPHICAL USER INTERFACE

(71) Applicant: Ezra Eddie Bakhash, Palo Alto, CA (US)

(72) Inventor: Ezra Eddie Bakhash, Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/616,815

(22) Filed: Jun. 7, 2017

(65) Prior Publication Data

US 2017/0336942 A1 Nov. 23, 2017

Related U.S. Application Data

(63) Continuation of application No. 15/336,682, filed on Oct. 27, 2016, now abandoned, which is a continuation of application No. 14/614,708, filed on Feb. 5, 2015, now Pat. No. 9,696,868, which is a continuation of application No. 14/503,142, filed on
(Continued)

(51) Int. Cl.
*G06F 3/048* (2013.01)
*G06F 3/0481* (2013.01)
*G06F 16/26* (2019.01)
*G06F 16/951* (2019.01)
*G06F 16/954* (2019.01)
*G11B 27/34* (2006.01)
*G06T 15/20* (2011.01)
(Continued)

(52) U.S. Cl.
CPC ........ *G06F 3/04815* (2013.01); *G06F 3/0482* (2013.01); *G06F 3/04817* (2013.01); *G06F 3/04845* (2013.01); *G06F 16/26* (2019.01); *G06F 16/951* (2019.01); *G06F 16/954* (2019.01); *G06T 15/20* (2013.01); *G11B 27/34* (2013.01)

(58) Field of Classification Search
CPC . G06F 3/048; G06F 3/00; G06F 3/041; G06F 17/00
See application file for complete search history.

(56) References Cited

U.S. PATENT DOCUMENTS 5,621,906 A * 4/1997 O'Neill ............... G06F 3/04815
715/839
6,040,833 A * 3/2000 Henshaw ............. G06F 3/0481
715/794
(Continued)

*Primary Examiner* — Hugo Molina
(74) *Attorney, Agent, or Firm* — Fitzsimmons IP Law

(57) ABSTRACT

Methods and systems for providing an improved graphical user interface. In one embodiment, the method generally comprises: displaying a first item in a first portion of a virtual space, where the first portion is initially visible on a screen, allowing a user to move to a second portion of the virtual space where a second item is displayed, and displaying a map (e.g., on the screen) that includes icons that identify the first and second items (i.e., both displayed and non-displayed items). In one embodiment, the user is allowed to move seamlessly from the first portion of the virtual space (where the first item is displayed) to the second portion (where the second item is displayed). For example, as the first item moves off the screen, the second item may move onto the screen.

12 Claims, 30 Drawing Sheets

Related U.S. Application Data

Sep. 30, 2014, now Pat. No. 9,304,654, which is a continuation of application No. 12/751,879, filed on Mar. 31, 2010, now Pat. No. 8,881,048, which is a continuation of application No. 11/531,676, filed on Sep. 13, 2006, now Pat. No. 7,735,018.

(60) Provisional application No. 60/717,019, filed on Sep. 13, 2005.

(51) Int. Cl.
*G06F 3/0482* (2013.01)
*G06F 3/0484* (2013.01)

(56) References Cited

U.S. PATENT DOCUMENTS

| | | | | |
|---|---|---|---|---|
| 6,163,318 | A * | 12/2000 | Fukuda | G06F 3/0481 715/803 |
| 6,262,732 | B1 * | 7/2001 | Coleman | G06F 3/0483 715/835 |
| 6,542,168 | B2 * | 4/2003 | Negishi | G06F 3/04815 715/732 |
| 6,577,330 | B1 * | 6/2003 | Tsuda | G06F 3/04815 715/782 |
| 6,597,358 | B2 * | 7/2003 | Miller | G06F 3/04815 345/427 |
| 7,269,797 | B1 * | 9/2007 | Bertocci | G06F 9/451 715/783 |
| 2001/0028365 | A1 * | 10/2001 | Ludolph | G06F 3/0481 715/764 |
| 2002/0033848 | A1 * | 3/2002 | Sciammarella | G06F 3/0481 715/838 |
| 2002/0140746 | A1 * | 10/2002 | Gargi | G06F 3/0483 715/853 |
| 2003/0179237 | A1 * | 9/2003 | Nelson | G06F 3/0483 715/765 |
| 2004/0216056 | A1 * | 10/2004 | Tootill | G06F 3/04855 715/786 |
| 2005/0091596 | A1 * | 4/2005 | Anthony | G06F 3/04815 715/712 |
| 2006/0041846 | A1 * | 2/2006 | Masselle | G06F 3/0481 715/793 |
| 2006/0059143 | A1 * | 3/2006 | Palmon | G06F 16/3323 |
| 2006/0161861 | A1 * | 7/2006 | Holecek | G06F 16/904 715/782 |
| 2006/0253791 | A1 * | 11/2006 | Kuiken | G06F 3/0481 715/766 |
| 2007/0067733 | A1 * | 3/2007 | Moore | G06F 16/957 715/777 |
| 2008/0129757 | A1 * | 6/2008 | Tanaka | G06F 3/0483 345/660 |

* cited by examiner

SYSTEM AND METHOD FOR PROVIDING THREE-DIMENSIONAL GRAPHICAL USER INTERFACE

CROSS-REFERENCE TO RELATED APPLICATION

This application is a continuation of U.S. patent application Ser. No. 15/336,682, filed Oct. 27, 2016, which is a continuation of U.S. patent application Ser. No. 14/614,708, filed Feb. 5, 2015, which is a continuation of U.S. patent application Ser. No. 14/503,142, filed Sep. 30, 2014, now U.S. Pat. No. 9,304,654, which is a continuation of U.S. patent application Ser. No. 12/751,879, filed Mar. 31, 2010, now U.S. Pat. No. 8,881,048, which is a continuation of U.S. patent application Ser. No. 11/531,676, filed Sep. 13, 2006, now U.S. Pat. No. 7,735,018, which claims priority pursuant to 35 U.S.C. § 119(e) to U.S. Provisional Application No. 60/717,019, filed Sep. 13, 2005, which applications are specifically incorporated herein, in their entirety, by reference.

COPYRIGHT NOTICE

This patent document contains material that is subject to copyright protection. The copyright owner has no objection to the reproduction of this patent document or related materials as they appear in the files of the patent offices of the United States or other countries, but otherwise reserves all copyright rights whatsoever.

BACKGROUND OF THE INVENTION

1. Field of the Invention

The present invention is directed toward graphical user interfaces for operating and accessing information on a computer, and more particularly, to a three-dimensional ("3D") interactive computing interface and sorting interface comprising information from real-time and static sources, including, but not limited to, meta search results from the Web; information from APIs, webservices, search engines, application programs, and networks; and files on the end user's desktop.

2. Description of Related Art

Currently, people use computers by inputting information into the computer to achieve a given output. Often this can be a series of tedious steps (mouse clicks and keyboard inputs) to run applications and documents or navigate to information. To get to new computing experiences, people often have to close their current applications and documents, hide them or overlap them on a finite desktop by drawing them on top of each other, and then mine through folders within folders to find them again at a later date. The user's desktop is finite, and one must redo the same tasks over and over again. This wastes time by (i) requiring many mouse clicks to open and close documents, (ii) requiring one to remember all the combinations of programs and documents one might need for a given purpose and (iii) requiring one to create elaborate hierarchical folder systems to aid in the process of storing and recalling applications and documents. This is primarily due to the limited space the end user has on their desktop. People currently compute within operating systems that present computer output, such as documents, applications, and operating system's interface in a 2D (two-dimensional) visual display. After initially being loaded into the computer by the boot program, the operating system controls all the other programs in a computer. Typically, the component of the operating system that summons the style in which this output is displayed is called the GUI or graphical user interface. A successful GUI will use screen presentations including metaphors that utilize graphic elements such as icons to make an operating system's input and output easier to manage. Most computer operating systems incorporate a GUI that utilizes two-dimensional graphics to capture, process, and output all input from an end user in a 2D form—having height and width only.

This output is usually confined within a window that is drawn on a finite-sized desktop, i.e., the working area of a computer, that has a given length and width. When the computer's output exceeds this finite working graphical area, elements of the GUI (the windows) are typically drawn on top of each other such that the GUI components overlap one another other. In some operating systems, a shadow is drawn beneath these overlapping windows on the desktop to make them appear as if they have depth. This technique allows an end user to identify the overlapping windows more easily.

We live in a 3D (three-dimensional) world where we see that objects not only have a horizontal position (x) and vertical position (y) but also have depth (z) that is also known as time, according to the three-dimensional coordinate system of mathematics. This notion of expressing depth or time in a visual computer metaphor is important for the creation of a visual history of the end user's computing sessions. By plotting new output of the computer (instead of replacing) in a virtual space that does not overlap or substitute what exists on the finite desktop, a new virtual space through depth and time is created. For example, if one were to pull up the webpage for the URL http://www.yahoo.com, and then click on a hyperlink (e.g., finance), the current webpage in its window would be replaced by the webpage for Yahoo! finance.

3D has shown itself in computing primarily in the following areas: (1) games, (2) CAD/medical visualization, and (3) virtual worlds. A virtual world is a computer-simulated environment that its users can inhabit and interact with via avatars. This habitation usually is represented in the form of two- or three-dimensional graphical representations of humanoids (or other graphical or text-based avatars).

The navigation window of many desktop operating systems use controls and buttons to allow end users to navigate to other folders and windows in the hierarchical structure of the file system. Often, in navigating to new windows, the new windows replace the display of the current window. Accordingly, it would be very desirable to provide an improved graphical user interface that allows the user to efficiently navigate though a virtual space wherein groups of windows can be easily organized, stored, and retrieved.

SUMMARY OF THE INVENTION

The present invention addresses the shortcomings of the prior-art systems and methods. In particular, the present invention is directed to a system and method for providing an improved 3D graphical user interface.

In accordance with one aspect of the embodiments described herein, there is provided a graphical user interface that uses the two-dimensional ("2D") display of a user's computer to display three-dimensional ("3D") objects in a simulated real-time 3D immersive Cartesian space.

In one embodiment, there is provided a system whereby new computing output occupies new virtual space near the original output, without losing the original output. When an end user clicks on a hyperlink on the webpage, there appears in the virtual space a new webpage that is linked to but does not replace the current webpage in its window; rather, the new webpage is drawn in a new virtual space. This way, the end user can visit past visual computing moments in time.

In accordance with another aspect of the embodiments described herein, there is provided a method for providing a three-dimensional graphical user interface, comprising receiving an input from an end user, capturing computing output from at least one computer source in response to the received end-user input, and presenting the computing output as at least two objects within a three-dimensional virtual space displayed to the end user.

In one embodiment, the method further comprises generating a timeline that includes an icon for each object presented within the virtual space, wherein the icons are organized in linear chronological order according to when the objects were presented within the virtual space and displaying the timeline within the virtual space. In another embodiment, the method further comprises providing a database module for storing and categorizing data regarding each object presented within the virtual space, providing a hyperlink within the database module to respective viewpoint of each object presented within the virtual space, and displaying the data regarding one or more of the objects within the database module presented along with virtual space.

In accordance with another aspect of the embodiments described herein, there is provided a system for providing a three-dimensional graphical user interface, comprising a display screen, an input device for receiving an input from an end user, a processor module operatively coupled to the display screen and the user input device, and a memory module operatively coupled to the processor module. The memory module preferably comprises executable code for the processor to capture computing output from at least one computer source in response to the received end-user input and present the computing output as at least two objects within a three-dimensional virtual space displayed on the display screen.

In one embodiment, the memory module further comprises executable code for the processor to generate a timeline that includes an icon for each object presented within the virtual space, wherein the icons are organized in linear chronological order according to when the objects were presented within the Cartesian space, and display the timeline within the virtual space. In another embodiment, the memory module further comprises executable code for the processor to provide a database module for storing and categorizing data regarding each object presented within the virtual space, provide a hyperlink within the database module to respective viewpoint of each object presented within the virtual space, and display the data regarding one or more of the objects within the database module presented along with virtual space.

In accordance with another aspect of the embodiments described herein, there is provided a system for providing a three-dimensional graphical user interface in a computer network, comprising a server connected to the computer network and a user-interface application executing in association with the server to provide the functions of receiving an input from an end user, capturing computing output from at least one computer source in response to the received end-user input, and presenting the computing output as at least two objects within a three-dimensional virtual space displayed to the end user.

In one embodiment, the user-interface application executing in association with the server further provides the functions of generating a timeline that includes an icon for each object presented within the virtual space, wherein the icons are organized in linear chronological order according to when the objects were presented within the Cartesian space, and displaying the timeline within the virtual space. In one embodiment, the user-interface application executing in association with the server further provides the functions of: providing a database module for storing and categorizing data regarding each object presented within the virtual space, providing a hyperlink within the database module to respective viewpoint of each object presented within the virtual space, and displaying the data regarding one or more of the objects within the database module presented along with virtual space.

In accordance with another aspect of the embodiments described herein, there is provided a network system for providing a three-dimensional graphical user interface, comprising: a computer-server network comprising a plurality of servers in communication with each other; at least one display screen operatively coupled to the computer-server network; at least one input device for receiving an input from an end user, the input device being operatively coupled to the computer server network; and a software module for providing a series of screen displays to the end user, the software module being accessible by one or more of the servers of the computer-server network. The software module preferably comprises instructions for directing the servers to capture computing output from at least one network source in response to the received end-user input and to present the computing output as at least two objects within a simulated three-dimensional Cartesian space displayed on the display screen.

In one embodiment, the software module further comprises instructions for directing the servers to generate a timeline that includes an icon for each object presented within the Cartesian space, wherein the icons are organized in linear chronological order according to when the objects were presented within the Cartesian space and to display the timeline within the Cartesian space. In another embodiment, the software module further comprises instructions for directing the servers to provide a database module for storing and categorizing data regarding each object presented within the virtual space, to provide a hyperlink within the database module to respective viewpoint of each object presented within the virtual space, and to display the data regarding one or more of the objects within the database module presented along with virtual space.

In accordance with another aspect of the embodiments described herein, there is provided a computer-readable recording medium for storing a computer program that makes a computer execute: receiving an input from an end user; capturing computing output from at least one computer source in response to the received end-user input; and presenting the computing output as at least two objects within a simulated three-dimensional Cartesian space displayed to the end user.

In one embodiment, the computer program makes the computer generate a timeline that includes an icon for each object presented within the Cartesian space, wherein the icons are organized in linear chronological order according to when the objects were presented within the Cartesian space, and display the timeline within the Cartesian space. In another embodiment, the computer program makes the computer provide a database module for storing and categorizing data regarding each object presented within the virtual space, provide a hyperlink within the database module to respective viewpoint of each object presented within the virtual space, and display the data regarding one or more of the objects within the database module presented along with virtual space.

In accordance with another aspect of the embodiments described herein, there is provided a 3D graphical user interface that takes a user from one computing place to another while creating the illusion of infinite space in three dimensions ("3D"). By capturing the output of the user's traditional two-dimensional desktop, the 3D GUI stages this output seamlessly in a 3D space by plotting the windows or other graphical representations of programs in 3D. In one embodiment of the present invention, the 3D GUI anticipates what the user may seek next (for example, the next webpage in a search result), eliminates dormant computing time, and puts the user in a reduced-click computing environment by automatically plotting the new computing experience while visually recording the old.

Because the 3D GUI creates the illusion of infinite space in 3D, it can create a visual history of the user's computing session, whereby the user can visit past visual computing events (or a snapshot in time) by simply navigating to previously recorded states or viewpoints. Accordingly, the 3D GUI can function as a visual chronological history of the user's computing session, whereby the user can name the computer experience they are currently having through their position (or viewpoint) in a 3D space and revisit it by recalling the name or title at a later time. The 3D GUI automates computing by remembering where the user left off last—visually—such that the next time the user requires the same series of inputs to achieve that same given output, the 3D GUI will navigate the user through a 3D space that is the visual history of where the user last left off.

In one embodiment, the 3D GUI can run as an Active X control within a browser window on the desktop of a computer (in conjunction with a web-browser program, such as Internet Explorer). In addition, the present invention can run as a stand-alone application or embedded within an HTML page. For example, a 3D virtual space (that was saved in the 3D GUI) of a series of photographs of a model wearing different jewelry styles can be embedded on a jewelry e-commerce site by embedding the code for the Active X control version of the 3D GUI into the markup language of the HTML page according to the syntax for the component.

The program may run, for example, in conjunction with Internet Explorer, other web browsers, or stand-alone applications. The 3D GUI allows the user to create a 3D space on their computer or the web. Through programmatic access or helper applications (e.g., represented by interactive icons within the 3D space), the 3D GUI allows the user to locate data, applications, files created by applications, desktop windows, HTML pages, and 3D applications, and it facilitates or invites the graphical output of these files and programs in their interactive 3D spaces. In general, the present invention displays graphics from the user's 2D finite desktop in 3D infinite space while retaining the functionality of the 2D programs and documents. Users will be able to use these files and applications, without restrictions, within 3D spaces.

In accordance with another aspect of the embodiments described herein, the 3D GUI allows the user to create one or multiple 3D spaces on the fly to facilitate the graphical output of files and applications. For example, the user may have the option of linking multiple 3D spaces together, thereby creating a network of 3D spaces. Regardless of where the files or applications are located (e.g., within the same folder, in a subfolder, on a different computer, within the network, on a different network, across the Internet, etc.), the user will have full access to the file through its native program, or to the website through the default browser. In this way, the 3D GUI allows the output of disparate computer programs to visually converge in one expandable, changeable 3D space.

A more complete understanding of the disclosed 3D graphical user interface will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF ILLUSTRATIVE EMBODIMENTS

The present invention satisfies the need for a system and method of providing an improved three-dimensional graphical user interface. In particular, the present invention is directed to a system and method for displaying a three-dimensional graphical user interface by receiving an input from an end user, capturing computing output from at least one computer source in response to the received end-user input, and presenting the computing output as at least two objects within a three-dimensional virtual space displayed to the end user. The method preferably further comprises generating a timeline that includes an icon for each object presented within the virtual space, wherein each of the icons are organized in linear chronological order according to when the objects were presented within the virtual space. In the detailed description that follows, like element numerals are used to describe like elements illustrated in one or more of the figures.

Described herein is a system for (i) selectively capturing computing output and information (webpages, applications, documents, desktops and/or anything that can be visualized on a computer) from disparate sources (local computer or network); (ii) allowing the captured output and information to visually converge by staging or drawing it in a common 3D virtual space; (iii) organizing this staged output in a meaningful way utilizing a novel 3D GUI to allow end users an easier and more efficient way to organize, visualize, search, and sort this captured output and information; and (iv) sharing these virtual spaces by saving them, publishing them to the web, e-mailing them, or allowing multiple users to collaborate by simultaneously viewing and modifying them.

Figure 1A:
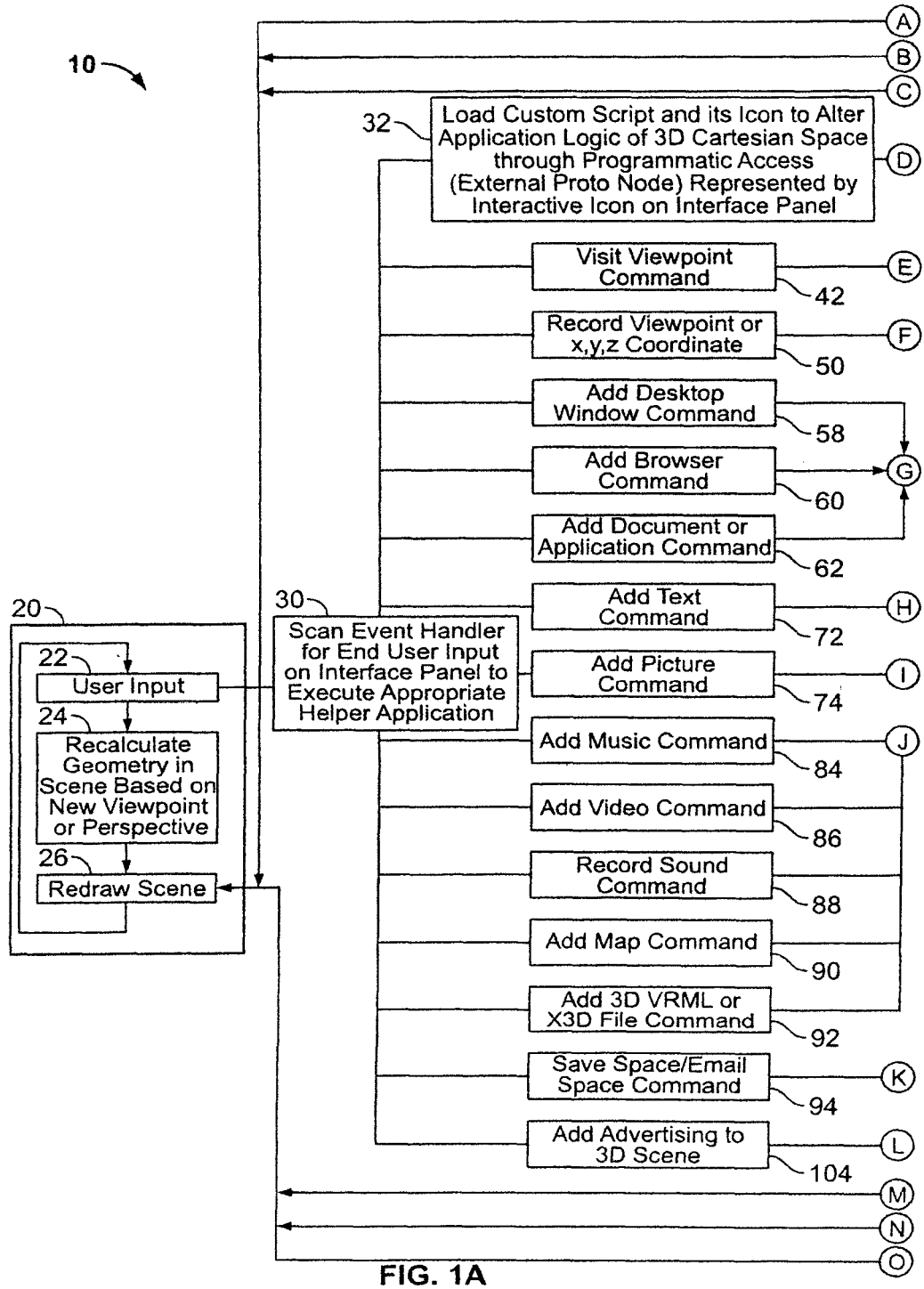
FIGS. 1A-1C provide a block diagram detailing one embodiment of the process for providing in improved three-dimensional graphical user interface.
Figure 1B:
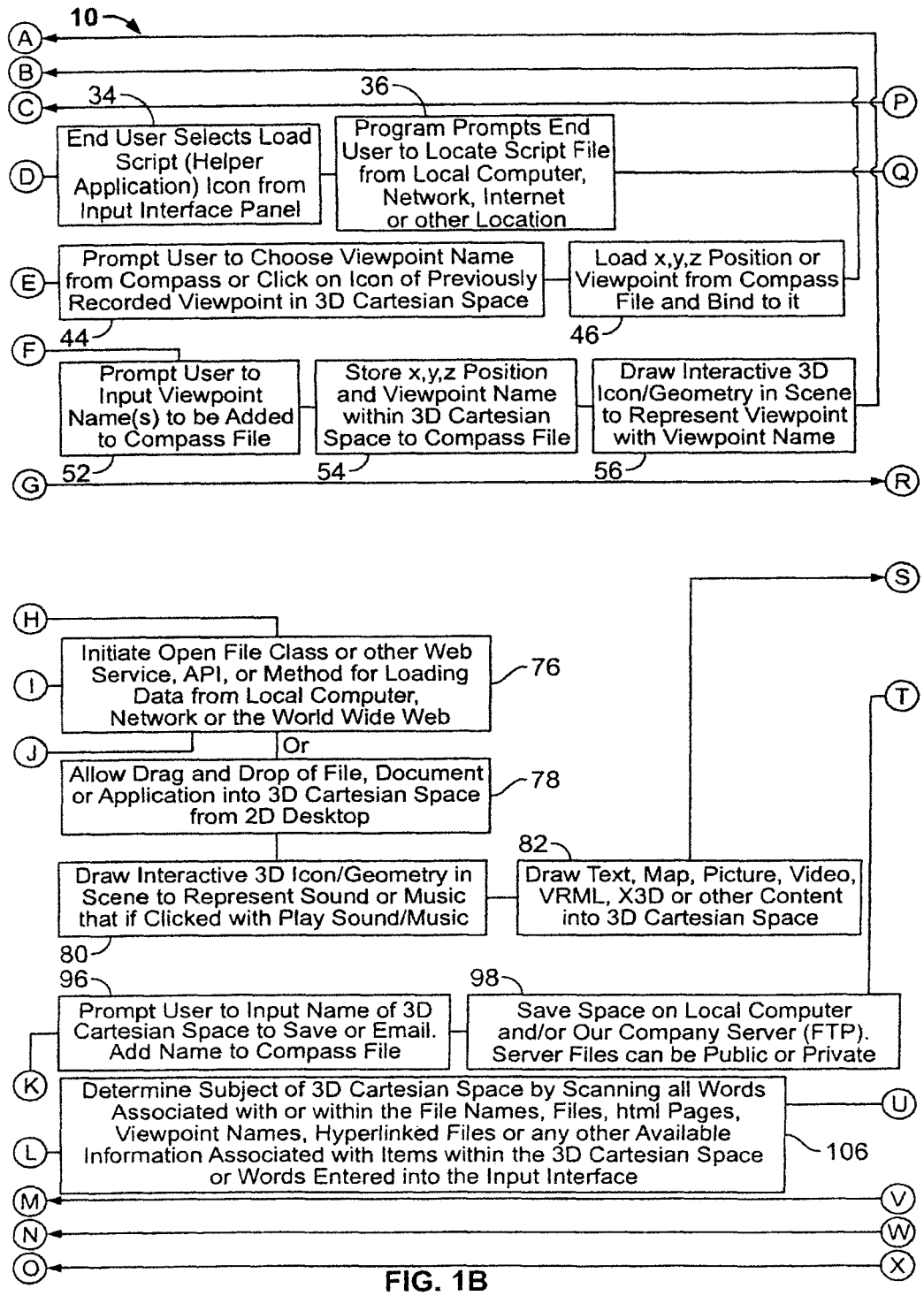
Figure 1C:
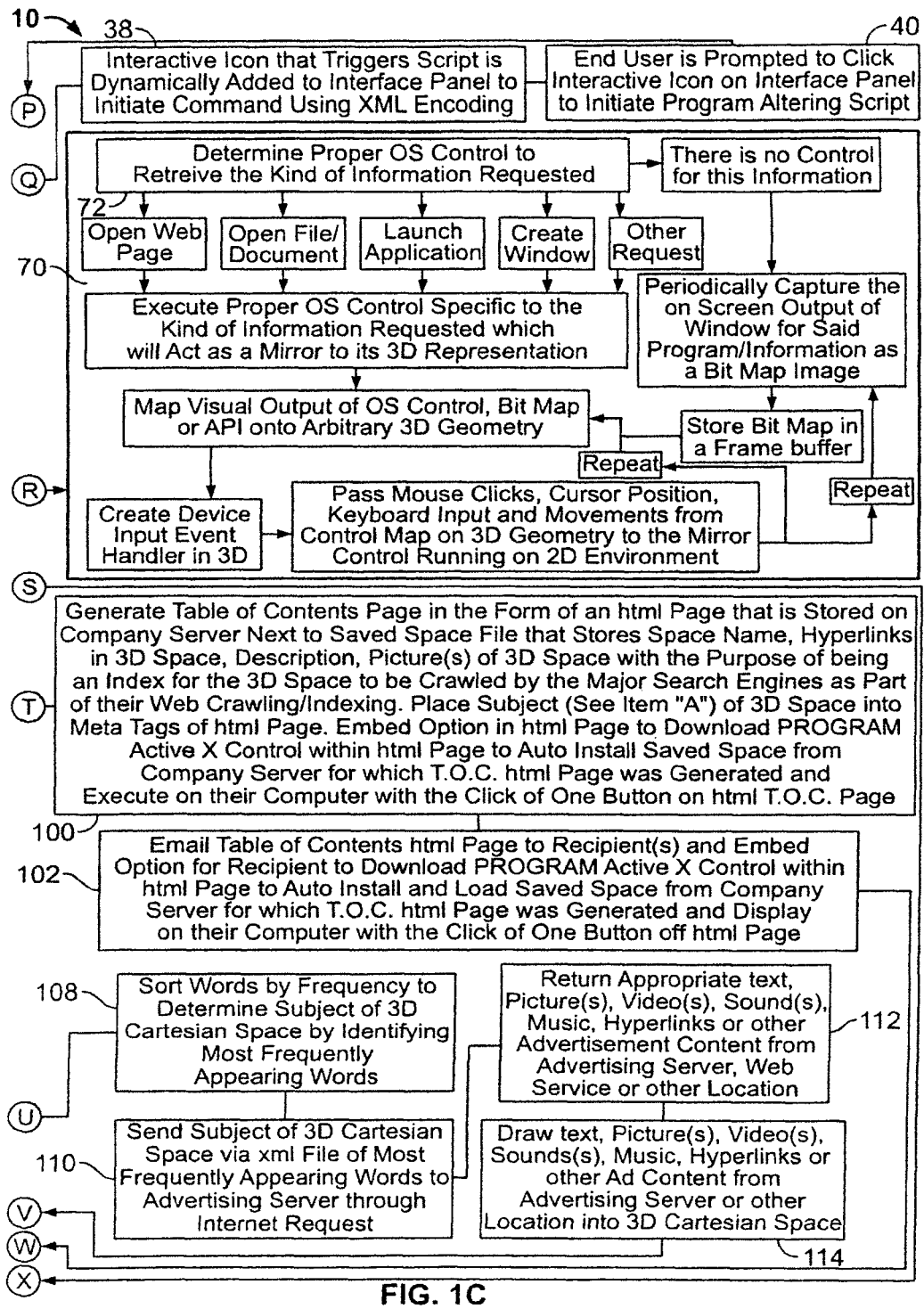

Described herein is a system for creating and managing this new 3D computing experience, based on the existing infrastructure of a 2D operating system's output. A preferred embodiment of this system, diagrammed in FIGS. 1A-1C, is described in further detail below. In accordance with one aspect of the embodiments described herein, there is provided a system and method for creating a 3D interactive computing interface and sorting interface that includes information from real-time and static sources, including meta search results from the web; information from APIs, webservices, search engine outputs, application program outputs, and networks; and files on the end user's desktop/laptop in a unique interactive 3D interface.

"Meta search" refers to a search wherein a query is submitted to more than one search engine or directory, and wherein results are reported from all the engines, possibly after removing duplicates and sorting. "API" refers to an interface that enables one program to use facilities provided by another, whether by calling that program or by being called by it. At a higher level, an API is a set of functionality delivered by a programming system, and as such, the mix of APIs in a particular system explains what that system can do. "Web" refers a network of servers linked together by a common protocol, allowing access to millions of hypertext resources. It is also known as WWW, W3 and the World Wide Web. "Webservices" refers to a standard approach to interoperating between different software applications, running on a variety of platforms and frameworks, over the Internet. It is software that runs over a network and provides information services based on XML standards that are accessed through a URI (Universal Resource Identifier) address and an XML-defined information interface. "Real time" refers to a transmission or data-processing mode in which the data is entered in an interactive session where an application can respond fast enough to affect later data input.

Figure 10:
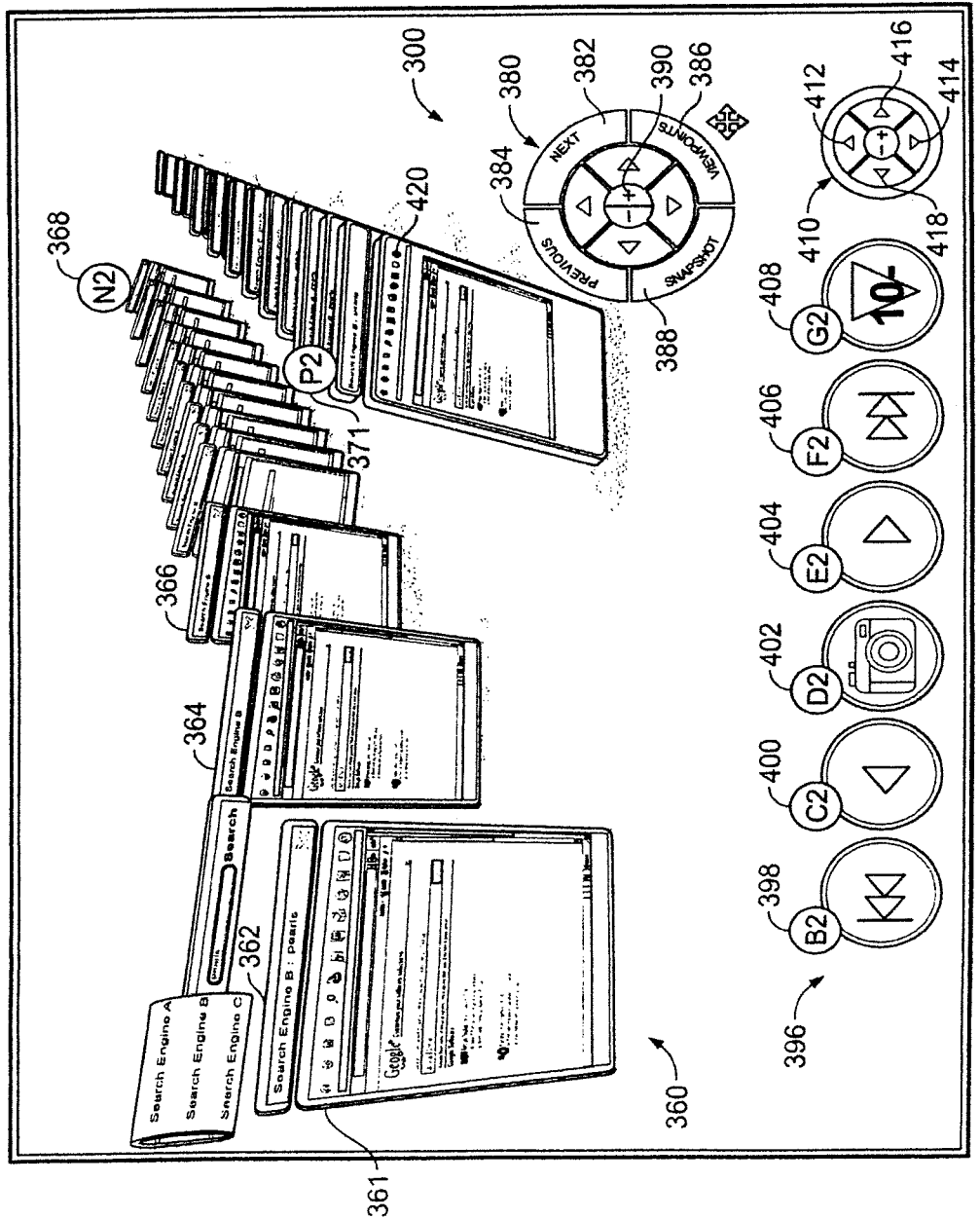
FIG. 10 illustrates another embodiment of a 3D GUI application window.

The invention provides a Graphical User Interface (GUI) that uses the two-dimensional display of an end user's computer to display information (e.g., webpages and other information mapped onto 3D objects) in a simulated real-time 3-D immersive Cartesian space. The program runs within web browsers (e.g., Internet Explorer and Mozilla Firefox) or as a stand-alone application compatible with the local operating system. The 3D GUI program creates the appearance of a 3-D space within a 2-D window on the desktop of a computer, as illustrated in the embodiment of FIG. 10. The program can utilize a ubiquitous interactive and immersive 3D rendering browser or player which will process 3D drawing instructions based on higher-level language code (the program) written in the drawing language native to the browser.

Figure 11:
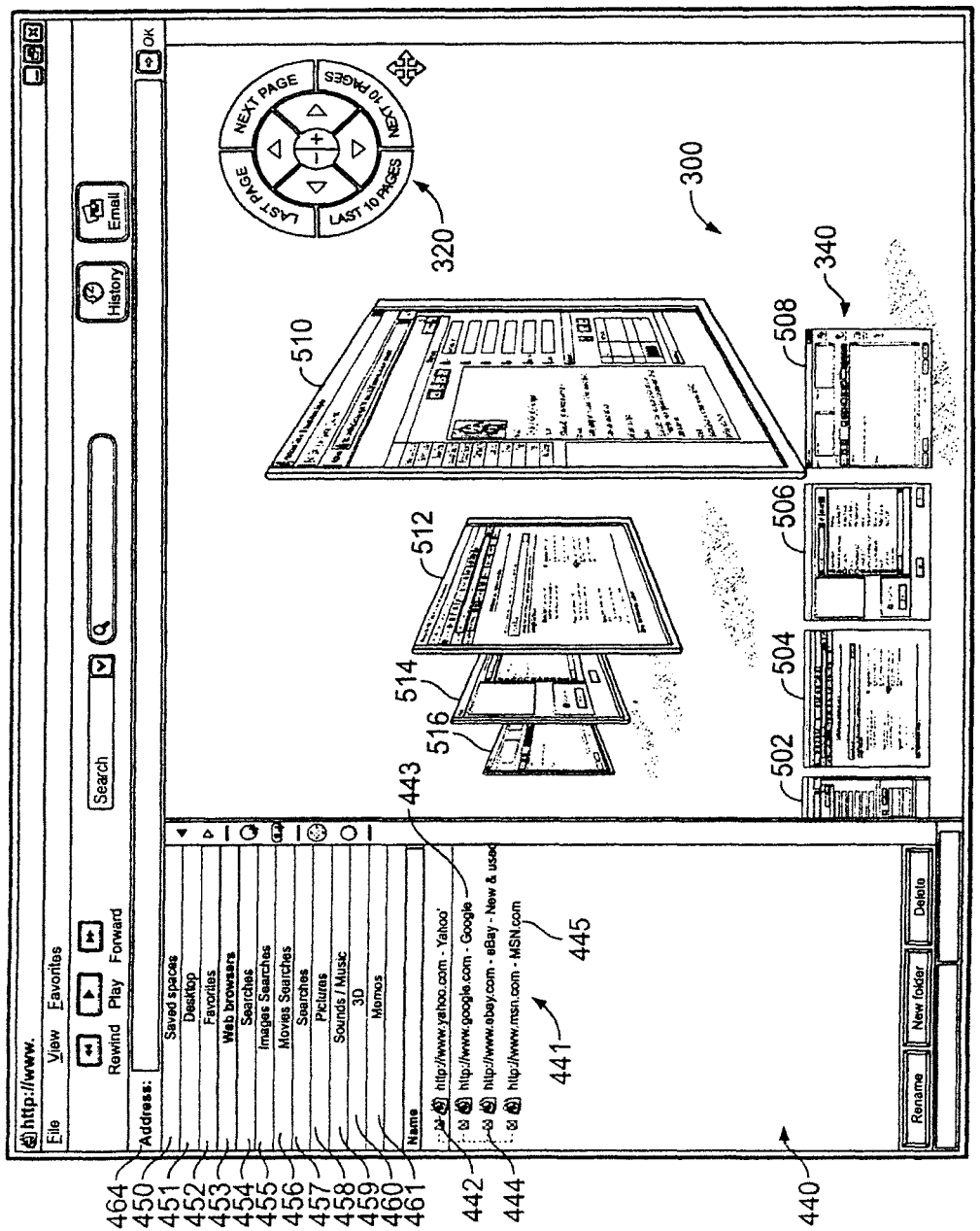
FIG. 11 illustrates an embodiment of a 3D GUI application window with an opened database module.
Figure 12:
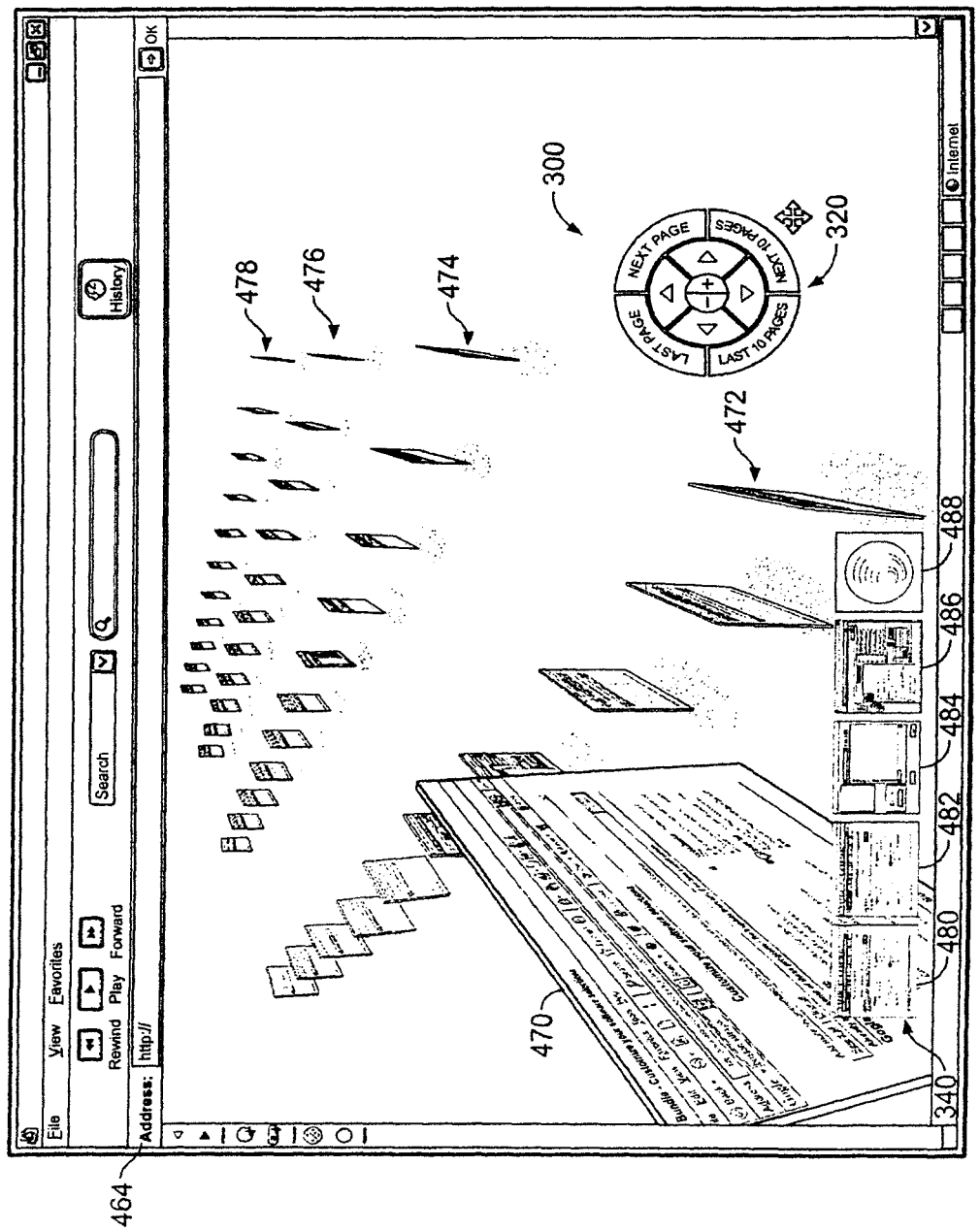
FIG. 12 illustrates an arrangement of windows within the virtual space of one embodiment of a 3D GUI application window.

The program creates what seems to be an infinite simulated 3-D Cartesian space within the two-dimensional display or window of an end user's computer by abiding by the visual rule of perspective whereby geometry or objects that are supposed to be closer to oneself appear larger concerning their spatial attribute and objects or geometry that are further away appear smaller, as shown in the exemplary embodiments of FIGS. 10-12. The program simulates a 3-D space within a 2-D window by redrawing objects in the space relative to one another as determined by their perceived distance from the viewer. Objects that are supposed to be further away are smaller whereas objects that are supposed to be closer are larger.

The program creates interactivity of the simulated real-time 3-D immersive Cartesian space. While the user is immersed in this 3D space, the program will take instructions from the user processed by the event handler presented by the Graphical User Interface initiated controls that can change their perspective or viewpoint (as defined as a location or visual perspective in the local coordinate system or three-dimensional space) by moving closer to it, away from it, changing their angle or both. Once the program receives user-initiated input to change the visual perspective of the scene, the program will redraw the scene to reflect the user-initiated input, as well as changes to the visual perspective.

Figure 5A:
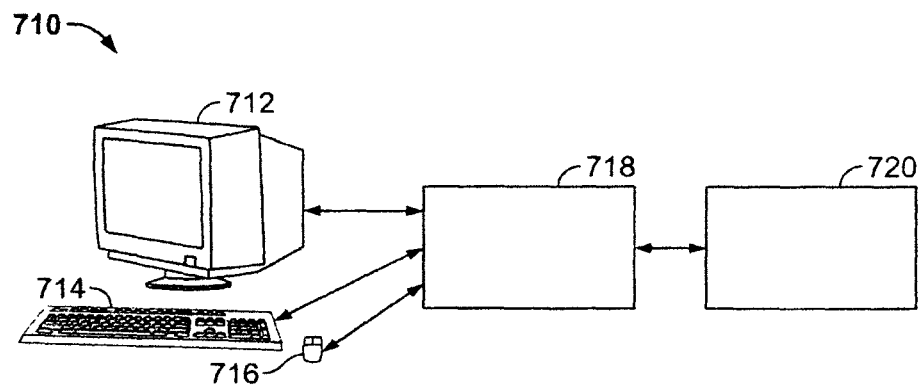
FIG. 5A is a block diagram of one embodiment of a system for providing a 3D GUI.
Figure 5B:
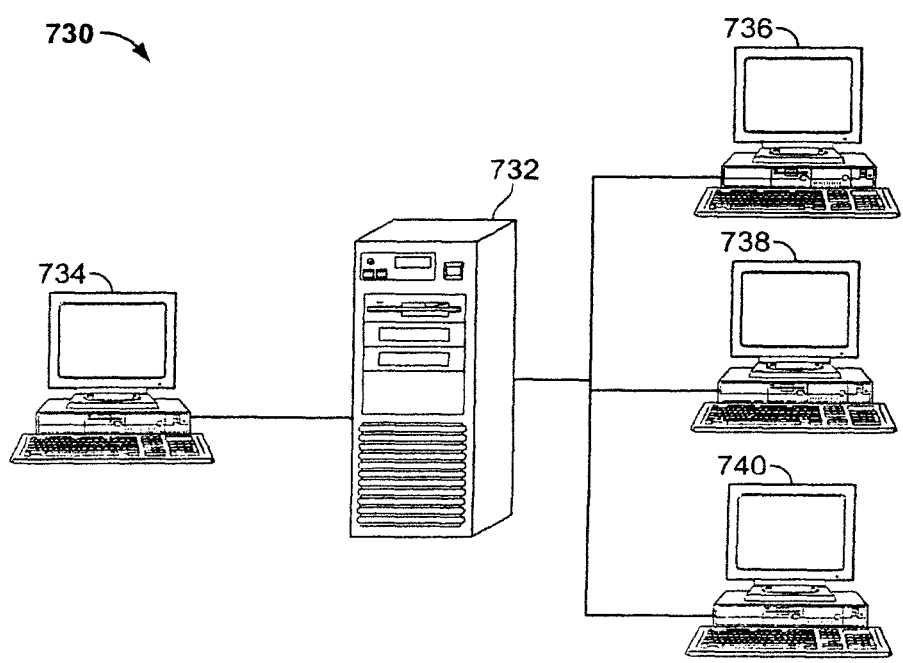
FIG. 5B is a block diagram of one embodiment of a system for providing a 3D GUI in a computer network.
Figure 5C:
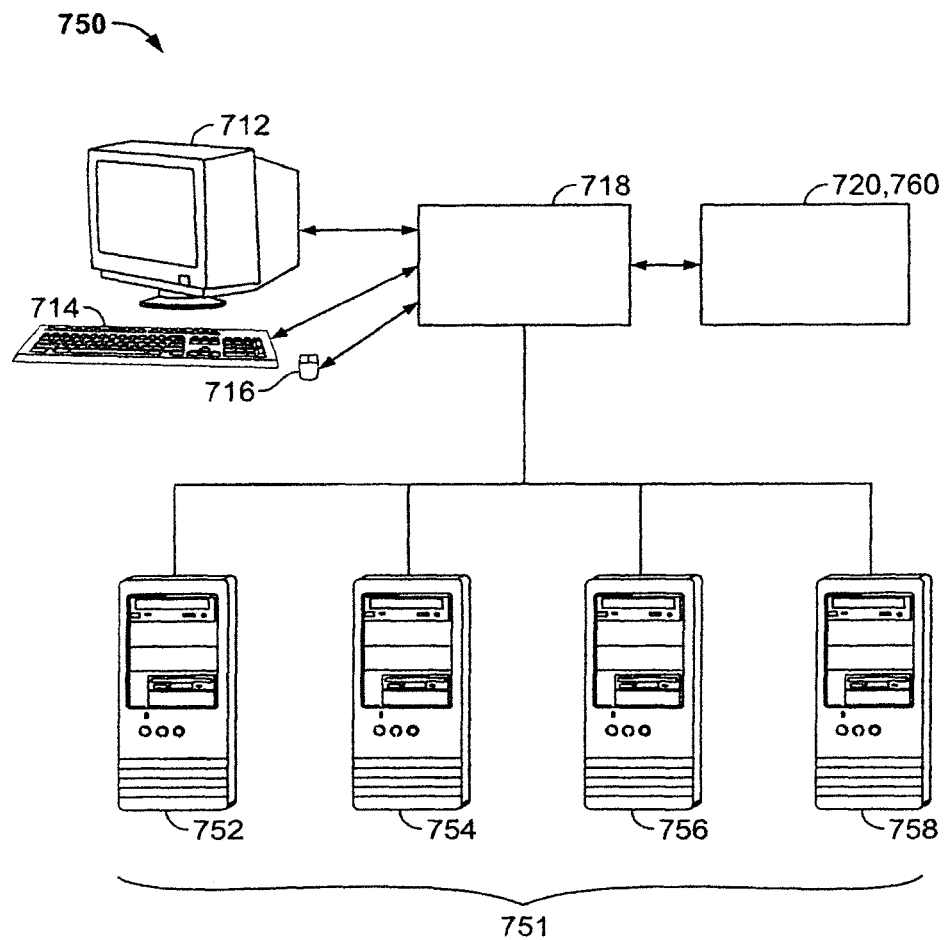
FIG. 5C is a block diagram of one embodiment of a network system for providing a 3D GUI.
Figure 6:
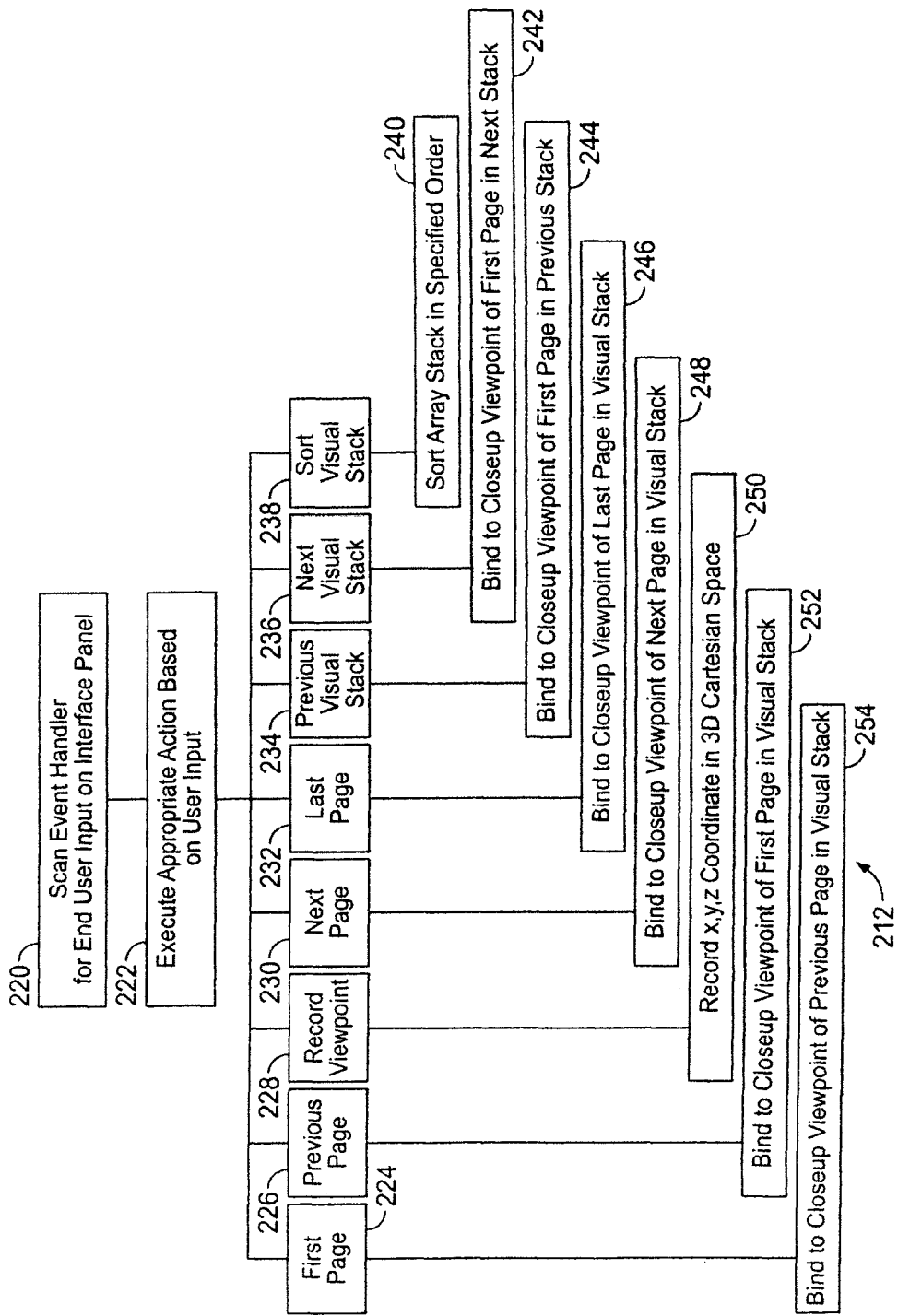
FIG. 6 is a block diagram detailing a process for sorting an array of webpages in a 3D stack.
Figure 7:
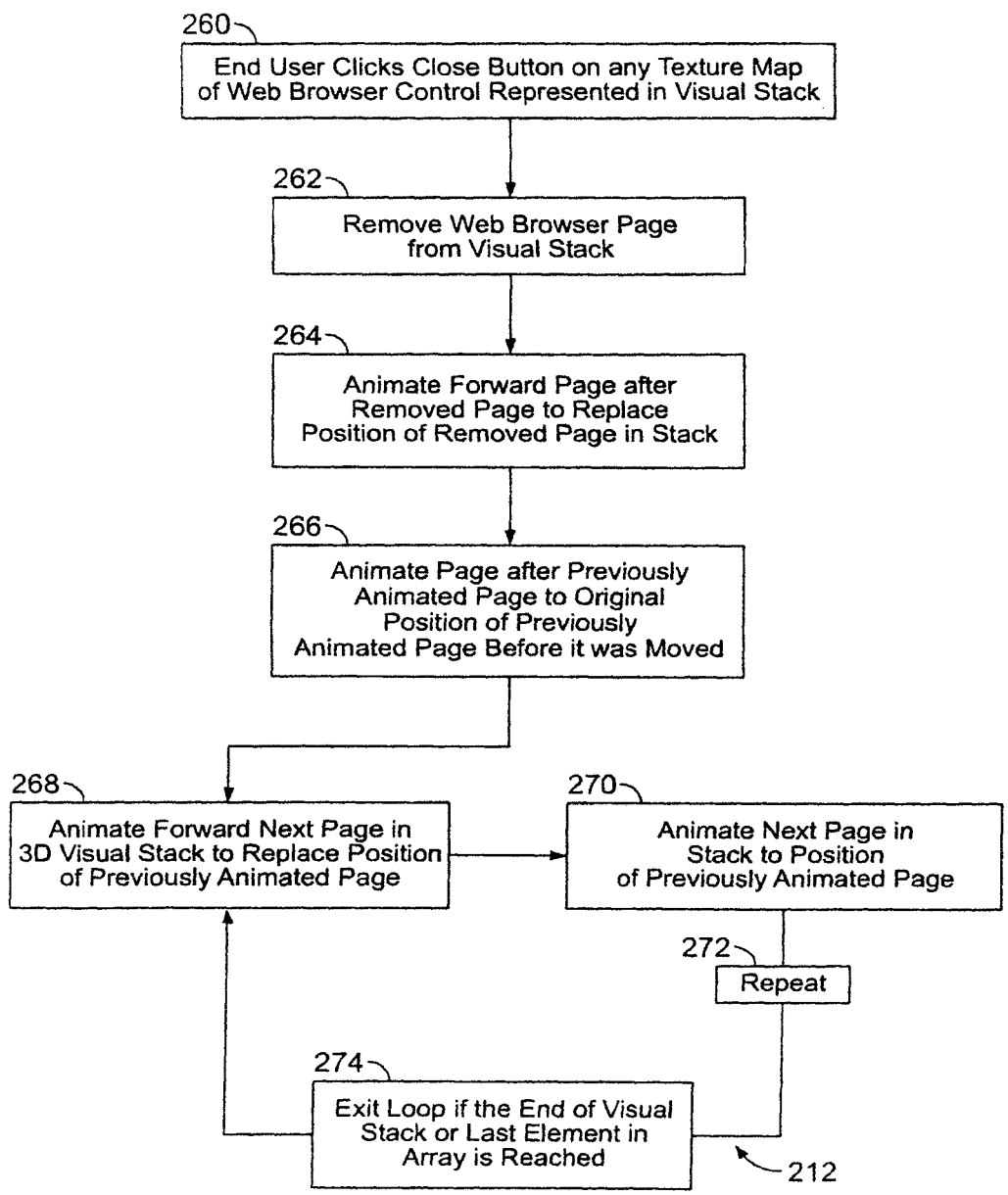
FIG. 7 is a flowchart showing a process for sorting an array of webpages in a 3D stack.

In accordance with one aspect of the embodiments described herein, there is provided a system and method for providing a three-dimensional graphical user interface. With reference to FIG. 5A, in one embodiment, the system 710 comprises a display screen 712 and input devices 714, 716 for receiving an input from an end user. The system 710 further comprises a processor module 718 (operatively coupled to the display screen 712 and the user input devices 714, 716) and a memory module 720 (operatively coupled to the processor module 718).

The memory module 720 preferably comprises executable code for the processor module 718 to capture computing output from at least one computer source in response to the received end-user input, and to present the computing output as at least two objects within a three-dimensional virtual space displayed on the display screen 712. In one embodiment, the memory module 720 preferably further comprises executable code for the processor module 718 to generate a timeline 340 that includes an icon for each object presented within the virtual space 300, wherein the icons are organized in linear chronological order according to when the objects were presented within the Cartesian space 300. In another embodiment, the memory module 720 preferably further comprises executable code for the processor module 718 to provide a compass or database module 440 for storing and categorizing data regarding each object presented within the virtual space, to provide a hyperlink within the database module to respective viewpoint of each object presented within the virtual space, and to display the data regarding one or more of the objects within the database module 440 presented along with virtual space 300.

In accordance with another aspect of the embodiments described herein, there is provided a system for providing a three-dimensional graphical user interface in a computer network. With reference to 5B, in one embodiment, the system 730 comprises a server 732 connected to the computer network (734, 736, 738, 740) and a user-interface application executing in association with the server 732 to provide the functions of receiving an input from an end user; capturing computing output from at least one computer source in response to the received end-user input; and presenting the computing output as at least two objects within a three-dimensional virtual space displayed to the end user. In one embodiment, the user-interface application executing in association with the server 732 preferably provides the functions of generating a timeline 340 that includes an icon for each object presented within the virtual space 300 wherein the icons are organized in linear chronological order according to when the objects were presented within the Cartesian space 300 and displaying the timeline 340 within the virtual space 300. In another embodiment, the user-interface application executing in association with the server 732 preferably provides the functions of providing a compass or database module 440 for storing and categorizing data regarding each object presented within the virtual space, providing a hyperlink within the database module to respective viewpoint of each object presented within the virtual space, and displaying the data regarding one or more of the objects within the database module 440 presented along with virtual space 300.

In accordance with another aspect of the embodiments described herein, there is provided a network system for providing a three-dimensional graphical user interface. With reference to 5C, in one embodiment, the network system 750 comprises: a computer-server network 751 comprising a plurality of servers (752, 754, 756, 758) in communication with each other; at least one display screen 712 in operative communication with or operatively coupled to the computer-server network 751 (directly or indirectly); at least one input device (714, 716) for receiving an input from an end user, the input devices (714, 716) being operatively coupled to the computer-server network 751; and a software module 760 for providing a series of screen displays to the end user, the software module 760 being accessible by one or more of the servers (752, 754, 756, 758) of the computer-server network 751.

The software module 760 preferably comprises instructions for directing the servers (752, 754, 756, 758) to capture computing output from at least one network source in response to the received end-user input, and present the computing output as at least two objects within a simulated three-dimensional Cartesian space 300 displayed on the display screen 712. In one embodiment, the software module 760 further comprises instructions for directing one or more of the servers (752, 754, 756, 758) to generate a timeline 340 that includes an icon for each object presented within the Cartesian space 300, wherein the icons are organized in linear chronological order according to when the objects were presented within the Cartesian space 300, and to display the timeline 340 within the Cartesian space 300. In another embodiment, the software module 760 further comprises instructions for directing one or more of the servers (752, 754, 756, 758) to provide a compass or database module 440 for storing and categorizing data regarding each object presented within the virtual space, to provide a hyperlink within the database module to respective viewpoint of each object presented within the virtual space, and to display the data regarding one or more of the objects within the database module 440 presented along with virtual space 300.

Within the 3D immersive space that the 3D GUI creates, the user's viewpoint can be changed, where "viewpoint" is defined as a specific location or perspective in the local coordinate system (3D space) from which the user can view the scene or file. As such, an interface called a compass 440 can be used to help the user name, map, and navigate the viewpoints in a 3D space, as illustrated in the exemplary embodiment of FIG. 11. Here, the compass or database module 440, which is located to the left of the display of the virtual space 300, can be used to record the user's current viewpoint at any time while immersed in the 3D space. For example, the entry 442 shows the viewpoint "Yahoo!" indexed in the compass 440. The compass 440 can be used to assign one or multiple names to the recorded viewpoint, and/or to store the names of viewpoint(s) as one name in a collection of names in a relational database. The names constitute a map of the 3D space as well as a method to navigate the map. For example, in one embodiment, there is provided a linear map, called a timeline 340, having a plurality of icons (502, 504, 506, 508). The icons 502, 504, 506, 508 in the timeline represent viewpoints indexed in the compass 440 and correspond to the windows 510, 512, 514, 518, respectively. The compass can also serve as the user interface to the relational database of stored names/viewpoints. The compass can have drop-down menus, wherein each menu is a record (in the relational database) that stores the name(s) and/or fields of viewpoints assigned by the user or automatically generated by the application program. The compass can be expandable to facilitate an infinite array of menus or records, thereby creating a table or group of records.

In the embodiment shown in FIG. 11, the explorer pane of the 3D GUI window serves as the compass 440 as it pertains to the Windows environment. In this pane, one can see tabs labeled Saved Spaces 450, Desktop 451, Favorites 452, Web Browsers 453, Searches 454, Images Searches 455, Movies Searches 456, Searches 457, Pictures 458, Sound/Music 459, 3D 460, and Memos 461. These tabs represent programmatic access or helper applications, which are described in further detail below.

As shown in the embodiment of FIG. 11, the tab called Web Browsers 453 is selected, revealing the Web Browsers menu below it, and the name of the viewpoint of the webpage (shown in the main window or virtual space) whose URL is http://www.yahoo.com and whose viewpoint name as it relates to the compass 440 is "http://www.

yahoo.com—Yahoo!" 442. More specifically, listed in the menu of the compass 440 are the names of four viewpoints of the webpages (shown in the main window or virtual space) whose URLs are http://www.yahoo.com, http://www.google.com, http://www.ebay.com, and http://www.msn.com and whose viewpoint names as they relate to the compass (and are listed as such) are "http://www.yahoo.com—Yahoo!" 442, "http://www.google.com—Google" 443, "http://www.ebay.com—ebay" 444 and "http://www.msn.com—MSN" 445. In this way, the end user can use the programmatic access or helper applications (450-461) to have their content staged in a 3D virtual space, can have the viewpoint representation of their content automatically indexed and organized in the compass 440, and can have a linear representation of the graphical events in the compass 440 indexed on the timeline 340 via 3D icons (502, 504, 506, 508).

Figure 22:
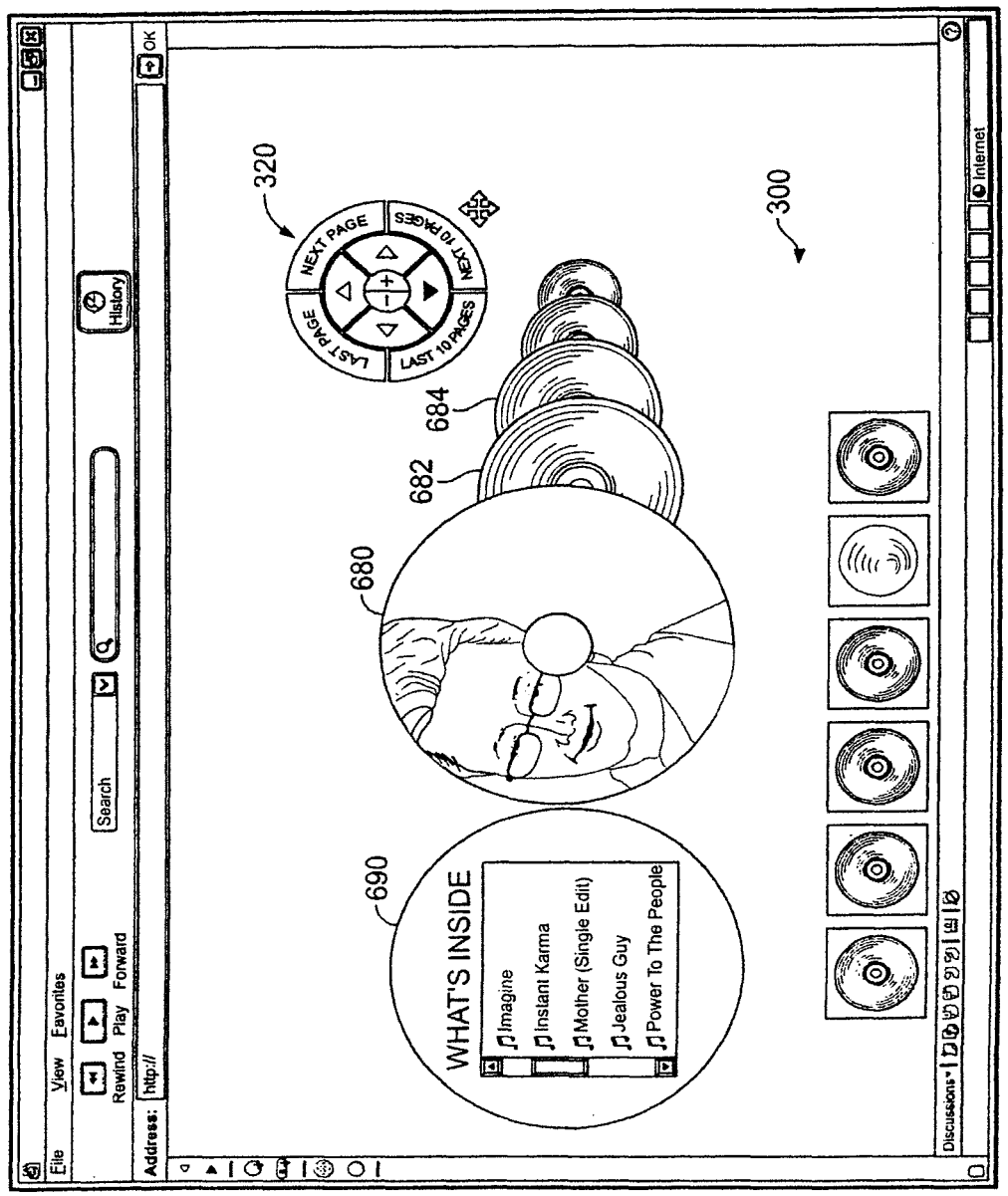
FIG. 22 shows a 3D GUI with an exemplary helper application for a music file opened within the virtual space.

In a preferred embodiment of the present invention, the helper applications are adapted to display the output of files and programs within windows (e.g., within the 3D spaces). In an alternate embodiment of the present invention, the programmatic access or helper applications are adapted to display information via customized interfaces whose graphical designs look like the real-world objects they seek to represent. For example, with reference to the embodiment of FIG. 22, a user may run a helper application or programmatic access for a music file. After clicking on the icon for the helper application for sounds/music, the 3D GUI will prompt the user to locate the music file on either their local computer, a networked computer, or the World Wide Web. The helper application will then draw the interface (680, 682, 684) for the music file, preferably in the form of a compact disc, in the 3D space (300). The user can then interact with the graphical representation of the music file (e.g., the graphical representation of a CD) to run and play the music file shown in interface 690.

The naming of stored viewpoints can exist as a single name in one menu in the compass or as a combination of multiple names in multiple menus. In one embodiment, each viewpoint is associated with only one name in each menu. This way, the user can select multiple names in multiple menus to create meaningful combinations of names that dynamically retrieve stored viewpoints based on the relationship of names selected. The user can edit the menus of the compass, thereby adding or removing categories or expanding the menus. All of this can happen in real time, as the user authors and interacts with his or her 3D scene(s). The user may also be able to combine two or more disparate compass interfaces, thereby creating a larger virtual map and navigation system for one or more 3D spaces. A named viewpoint in the compass can link to a viewpoint in the current scene, a viewpoint in another 3D file on the local desktop, or a viewpoint in another 3D file hosted on the World Wide Web. This way, the compass creates a means of navigation that creates abstraction between viewpoints in any given files (local desktop files, files on the web, etc.).

In one embodiment of the present invention, the 3D GUI is further adapted to generate custom 2D maps of stored viewpoints and their names for specific menu items in the compass. Specifically, the 3D GUI creates 3D icons for each viewpoint named and created via the compass and plots them into the 3D space with the respective names assigned to them as signposts, allowing the user to map all of the viewpoints for a 3D space and to draw lines among the viewpoints to see relationships among disparate viewpoints.

With reference to the embodiment of FIG. 11, there is provided a linear map 340 (drawn on the bottom margin of the virtual space 300), in an infinite possibility of maps, whereby the 3D GUI is adapted to express the map of stored viewpoints as 3D icons with their names (should the end user mouse-over them) for specific menu items in the compass 440 expressed as a timeline 340. Here, the timeline 340 is a map which represents the linear progress of animation from the first viewpoint to the last viewpoint, should the end user click each 3D icon in such a sequence, originally created and indexed in the compass 440. In essence, each 3D icon (502, 504, 506, 508) is a hyperlink or graphic that jumps to a new location or viewpoint (when clicked).

Figure 18:
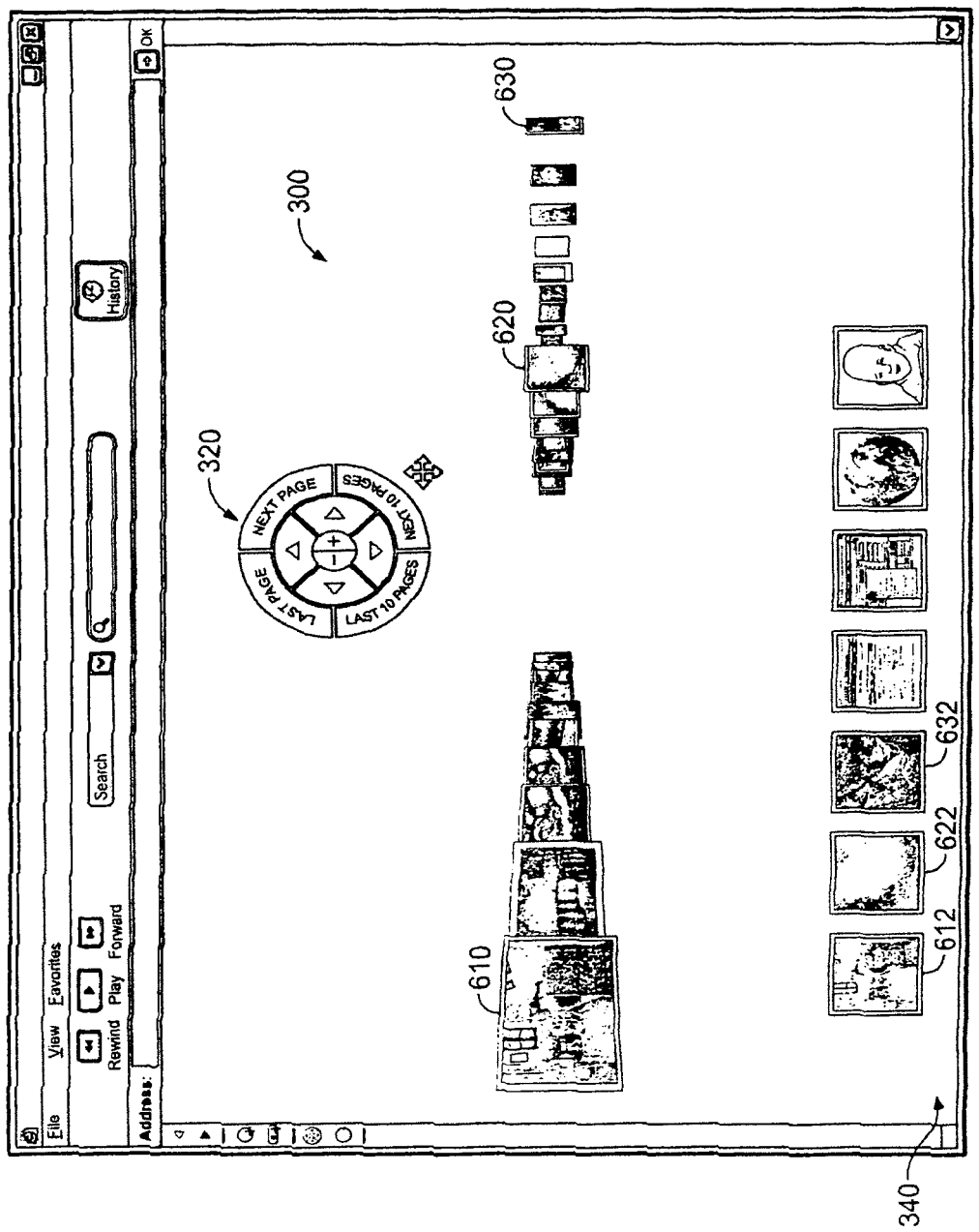
FIG. 18 illustrates another exemplary arrangement of 3D stacks and timeline icons in a 3D GUI application window.

The present system utilizes a unique graphical user interface called a timeline that allows end users to (i) index and keep track of, (ii) navigate to and (iii) replay every visual event and important action that occurs within a virtual space as it is happening (on-the-fly) by drawing icons for these visual events in linear chronological order within the virtual space (see FIG. 18). As used herein, "visual event" refers to a change in appearance to the 3D virtual space typically caused by adding information and output captured from other sources (automatically through programmatic access or manually by the end user) and drawn within the 3D virtual space (see FIGS. 1 and 2—boxes 22, 24, 26).

Figure 13A:
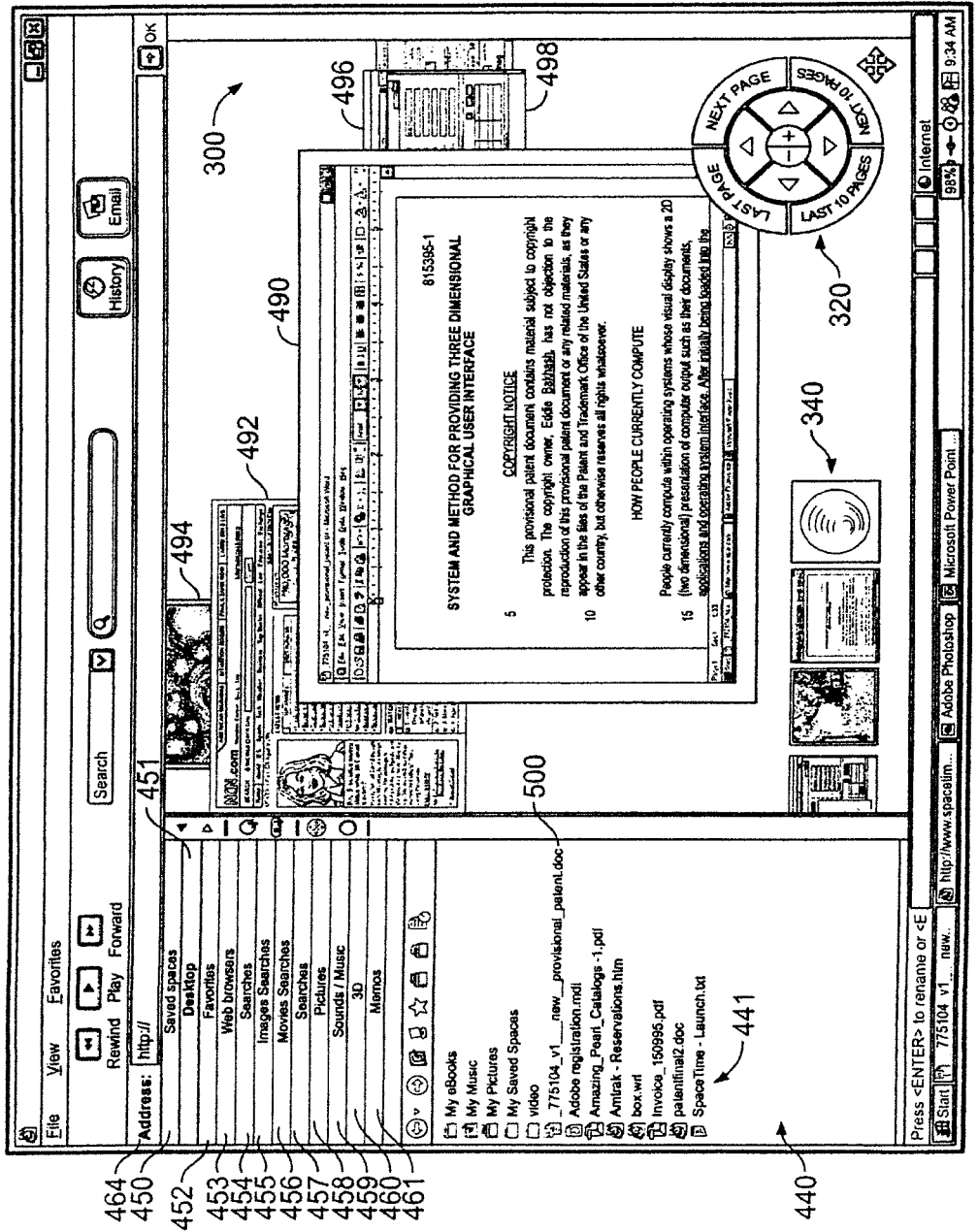
FIGS. 13A and 13B illustrate another embodiment of a 3D GUI application window with an opened database module.

In one embodiment, each new action, initiated as a result of input from the end user or otherwise initiated by programmatic access, that results in a visual event, is automatically stored in the compass and then plotted as an icon on a dynamic timeline linear map 340 (see FIGS. 11, 12, and 13A). Those skilled in the art will understand that it would be impossible to list every possible kind of computing event that would constitute a visual event that would be drawn as an icon on the timeline 340. In one embodiment (shown in FIGS. 11, 12, and 13A), the timelines 340 are drawn horizontally on the bottom margin of the page in a straight line. In another embodiment (not shown), the timeline can be drawn vertically on the left or right margin of the page.

Each item plotted in the timeline is an icon that represents the action the end user initiated to cause a visual event for which the icon on the timeline was created. For example, with respect to a horizontal timeline, items to the left of a given item on the timeline occurred before the given item, whereas items to the right of the given item on the timeline occurred after the given item. With reference to the illustrative embodiment of FIG. 18, the visual event (610) for which icon 612 was drawn on the timeline 340 occurred before the visual event (620) for which icon 622 was drawn on the timeline 340. Similarly, the visual event (630) for which icon 632 was drawn on the timeline 340 occurred after the visual event (620) for which icon 622 was drawn on the timeline 340.

This way, end users can go back to past computing experiences (what was drawn at some viewpoint or x,y,z coordinate in the virtual space at the time an icon was created and added to the timeline) by clicking any icon on the timeline (in a linear order, random order, etc.) which binds the end user to a viewpoint for which information regarding the visual event is plotted within the virtual space; in this case in its own unique 3D or visual stack in the current embodiment.

With reference to FIG. 13A, in one embodiment, there is provided a helper application called Desktop 451 that allows the user to drag and drop items shown in the menu 441 of the database module 440 into the virtual space 300. A dynamic linear map (drawn on the bottom margin of the virtual space) in the form of the timeline 340 is provided to express the actions of the end user's input as icons on the timeline 340. Should the user click any icon on the timeline 340, the user's viewpoint will change to the first item in the 3D stack (i.e., stack visualized in 3D) created for the action or visual event. Ultimately, the timeline 340 is a linear map for all the items or output the helper applications (450-461) capture and draw within the 3D GUI's stage or virtual space 300.

Figure 16A:
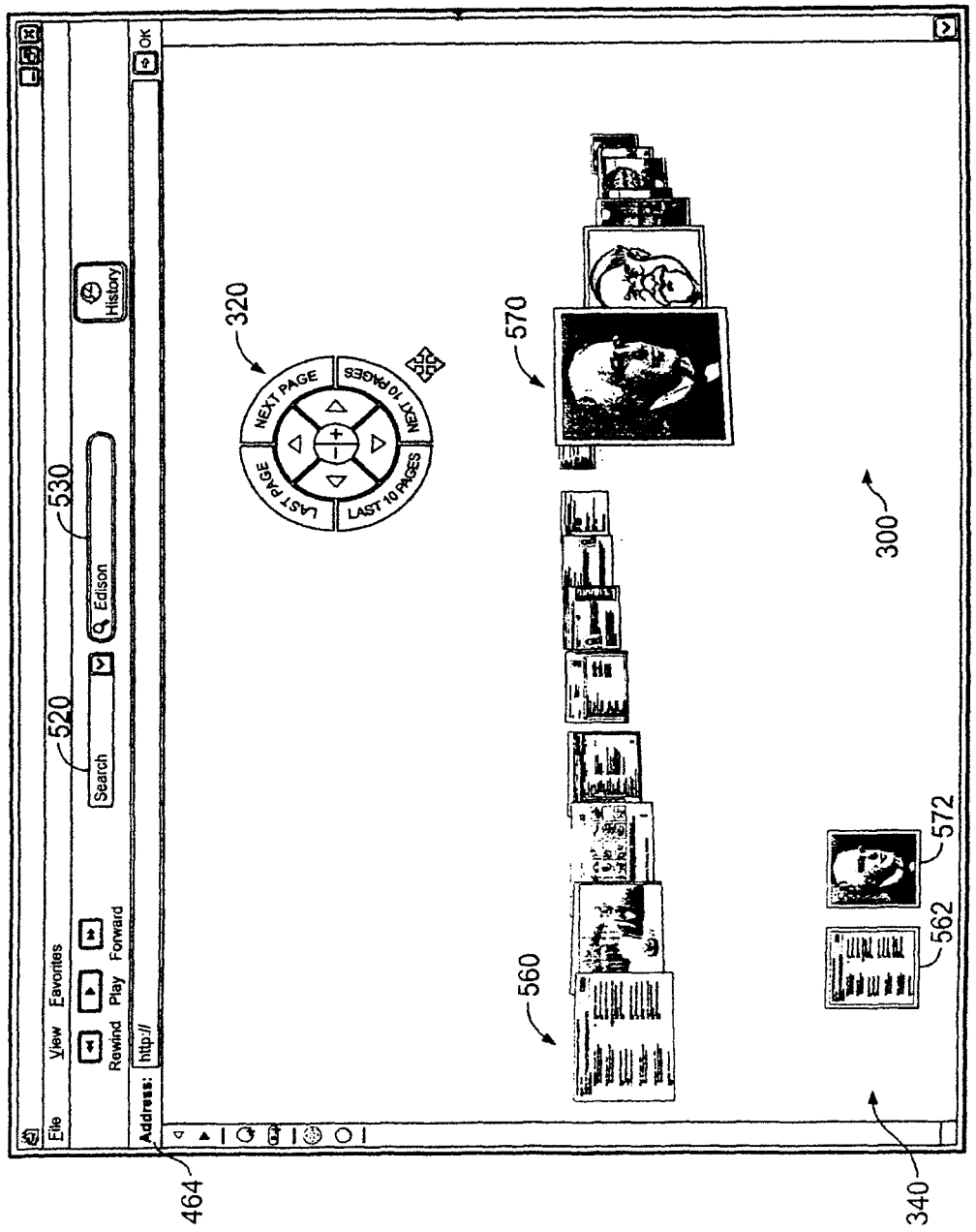
FIGS. 16A and 16B illustrate exemplary arrangements of 3D stacks and timeline icons in a 3D GUI application window.

In another embodiment, illustrated in FIG. 16A, an end user selects the helper application called Yahoo! Search (520), and types a search term (e.g., "Albert Einstein" or "Thomas Edison") into the helper application's text input field (530). The helper application gathers the information for the search request through a webservice or other technique (FIGS. 4A and 4B) and plots the search results in a unique 3D stack 560, which is represented in the timeline 340 by an icon 562. The plotting of the search results in its own 3D stack by a helper application constitutes a visual event or change to the 3D virtual space for which an icon is drawn and added to the timeline.

An end user can select another helper application called Yahoo! Image Search (520) and enter the same search term in the search field (530) of the Yahoo! Image Search text input field. The Yahoo! Image Search helper application gathers the information for this search request by interfacing with Yahoo!'s webservices and then plots the search results in its own unique 3D stack 570 translated to the right (+x in the 3D Cartesian virtual space) of the previously plotted 3D stack or stack visualized in 3D. In addition, the drawing of the new visual stack within the virtual space constitutes a visual event whereby another icon 572 representing stack 570 is added to the timeline (to the right of the last icon 562).

Figure 16B:
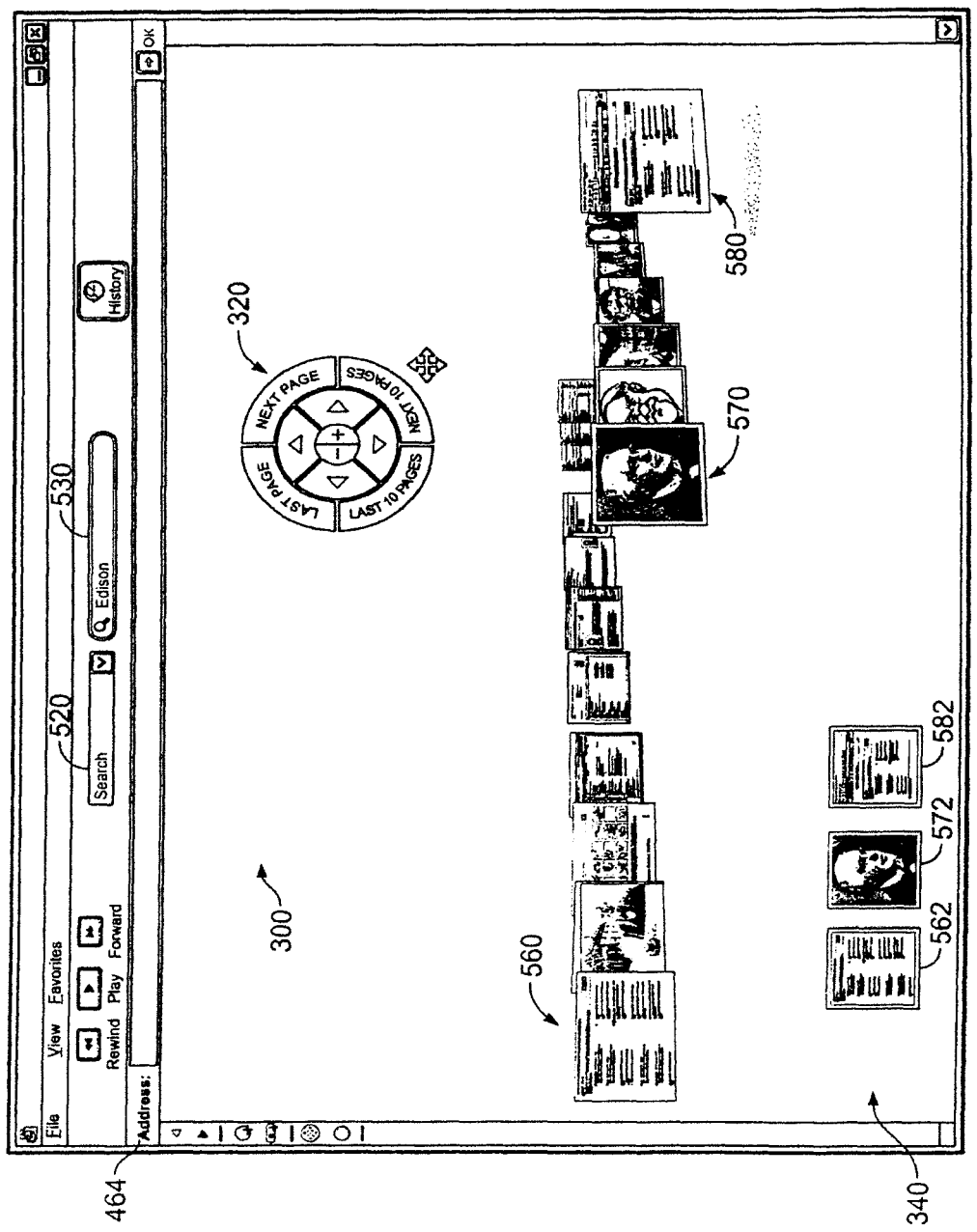

With reference to FIG. 16B, should an end user create a web-browser page within the virtual space (FIGS. 1A-1C—box 60) such as http://www.google.com through the "address": command-line interface 464, whereby an end user can input a URL and have it added to the virtual space (FIGS. 1A-1C—box 60), the new webpage would be drawn in its own 3D stack 580 translated to the right (+x in the 3D Cartesian virtual space) of the previously plotted 3D stacks 560, 570. This would add another icon 582 to the timeline (to the right of the last icon 572). If the end user navigated within the virtual space and changed their viewpoint and selected the "record viewpoint" feature of the 3D GUI system (FIGS. 1A-1C—box 50), the would records the x, y, and z position (viewpoint) within the virtual space, adds this to the database module, such as under a tab called favorites.

Figure 20:
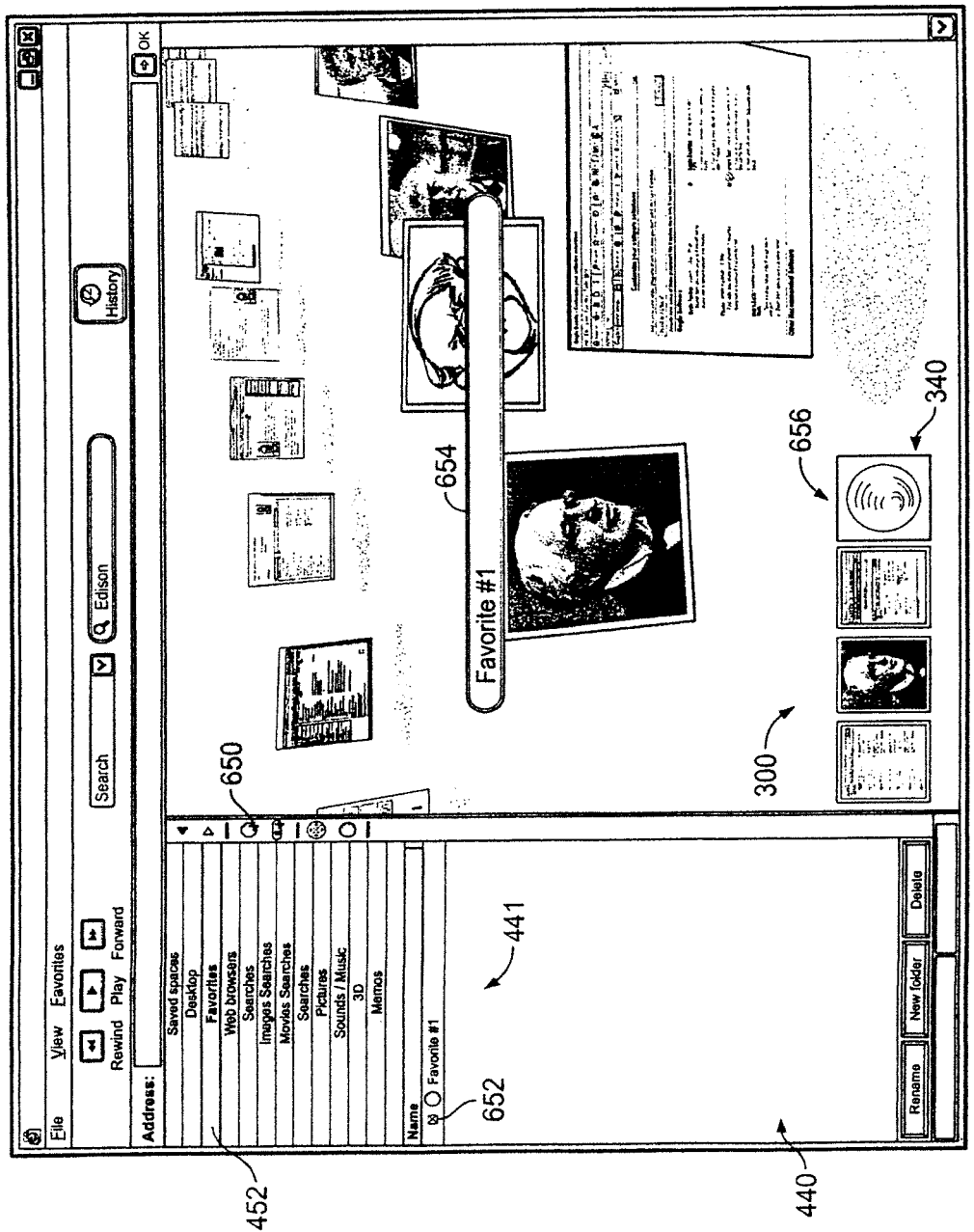
FIG. 20 shows a 3D GUI with the Favorites helper application opened within the database module.

As shown in FIG. 20, when the user clicks on the "record viewpoint" icon 650, the system records the x, y and z position ("viewpoint") within the virtual space, and adds this to the compass 440 as an item 652 under the tab called favorites 452. The system preferably allows the user to name the viewpoint and draw a 3D icon 654 within the 3D virtual space indicating the position of the stored viewpoint within the virtual space as a signpost. The system preferably draws the 3D icon 656 for the newly created viewpoint on the timeline 340 translated to the right of the previously drawn icon on the timeline as this would be categorized as a visual event. In this way, each visual event added to the virtual space is archived and expressed on-the-fly on the timeline through its icon.

Clicking each of the icons on the timeline from left to right in succession would result in successive changes to the end user's viewpoint. In this way, visual events within the virtual space are archived as they happen and expressed on the timeline in linear order. The user can travel back in time by simply clicking the icon on the timeline that represents the "visual events" that were drawn in the virtual space, for which the icon on the timeline was created. Clicking the item on the timeline would change the end user's viewpoint to the position in the virtual space where the visual events were originally drawn; in this case, the first item in each 3D stack.

Within the 3D GUI system, the addition of items to the timeline is dynamic and happens when new visual events are created. Furthermore, the timeline becomes an important component of the GUI system when a virtual space is viewed by an end user other than its author (either through e-mail or visiting a published URL of the saved space on a server). Upon viewing for the first time a virtual space that another end user authored, an end user can click the icons on the timeline from left to right in linear fashion and experience in chronological order what the author of the virtual space experienced as they created it. In this way, the timeline captures or records the visual changes of a virtual space in chronological order so others viewing it can re-experience the virtual space by clicking the icons on the timeline in succession from left to right.

The 3D GUI preferably utilizes an application program or run-time environment that is used to execute code programmed for it based on this system. For example, the program can utilize an interactive and immersive 3D-rendering browser that processes 3D drawing instructions based on higher-level language code (the program) written in the drawing language native to the browser program. There are numerous programming languages as well as run-time environments/3D-rendering browsers that can be used to achieve this. The run-time environment or browser can be (1) a stand alone application, (2) an Active X control or object within a web browser, and/or (3) an embedded object in webpages.

This system or 3D interactive computing interface will create what is known as a virtual space on the computer desktop for which it runs through the browser program. A virtual space is simply a program (running within the run-time environment/3D-rendering browser) simulating a 3D space within a flat 2D display by redrawing objects in the virtual space relative to one another as determined by their perceived distance from the viewer, FIG. 2. Objects that are supposed to be further away are drawn smaller whereas objects that are supposed to be closer are drawn larger.

Furthermore, the subject matter of a simulated 3-D Cartesian space drawn within the two-dimensional display or Window of an end user's computer is preferably redrawn in a cyclical fashion (FIGS. 1 and 2—boxes 22, 24, 26) to refresh the scene such that changes to the objects drawn must happen quickly enough based on the responses of the end user such that the experience feels truly interactive.

The information that is responsible for a virtual space is not unlike any other file where the information that composes the file can be stored, named, and amended at will (FIGS. 1A-1C—box 94). In addition, because a 3D virtual space is used (1) to express the graphical user interface it utilizes for input and output and (2) as a stage to visualize the information to be sorted and searched on the system, many of the commands that are part of an operating system's file system can also apply to saved virtual spaces. In addition, each saved virtual space (FIGS. 1A-1C—box 96) can act as a container for all of the items that were added to the virtual space through the helper applications (FIGS. 1A-1C—boxes 32, 34, 36, 38, 40) that act as a bridge allowing information to stream into the system's virtual spaces. As one of the more popular functions of the Internet is to download and transfer files from one computer to another, the notion of utilizing a virtual space to output and add files, content, and information into as a medium to e-mail or transfer these files is novel and useful. Those skilled in the art will realize that once a virtual space is archived as a file, it can easily be e-mailed or sent via FTP to another server or computer as easily as any other e-mail or file.

In the current computing paradigm, e-mail messages are sent to one another as messages with attachments of binary files such as pictures, videos, sounds, and executable files. Once an e-mail message is received, to view an attachment, the recipient must (i) select the file, (ii) decode each file using their e-mail software, (iii) download it, and (iv) launch the file in its own new window using a separate program that created it or can view it. In contrast, in the 3D GUI, all the files, such as pictures, video, sounds, webpages, or other content, that are added to a virtual space (see FIGS. 1A-1C—boxes 32, 42, 50, 58, 60, 62, 72, 74, 84, 86, 88, 90, 92, 94, 104) can be e-mailed as a whole in one file. Once the recipient of the e-mail receives the e-mail, they can access the virtual space with all of its content with one click, by clicking the hyperlink to the saved space whether it is (i) attached to the e-mail or (ii) saved on a server (FIGS. 1A-1C—box 98). Doing so opens the virtual space and stages all of the content without the end user needing to open files separately one by one.

More specifically, once the virtual space is received via e-mail or downloaded to an end user's computer from a server or via FTP on the Web, the hyperlink to the saved space in the webpage responsible for showing the e-mail or FTP file sees the embedded HTML <object> tag for the Active X control or application that can execute the e-mailed or transferred file with one click. In general, this tag contains information needed to execute the control, which can be located on the GUI server or elsewhere. In this way, the 3D GUI system (configured in this embodiment of the invention as an Active X control) can run on any computer, allowing saved virtual 3D spaces with an end user's content to be sent to any other computer via e-mail, file transfer protocol or other method and have all the content within the virtual space accessible to an end user with one click.

Figure 8:
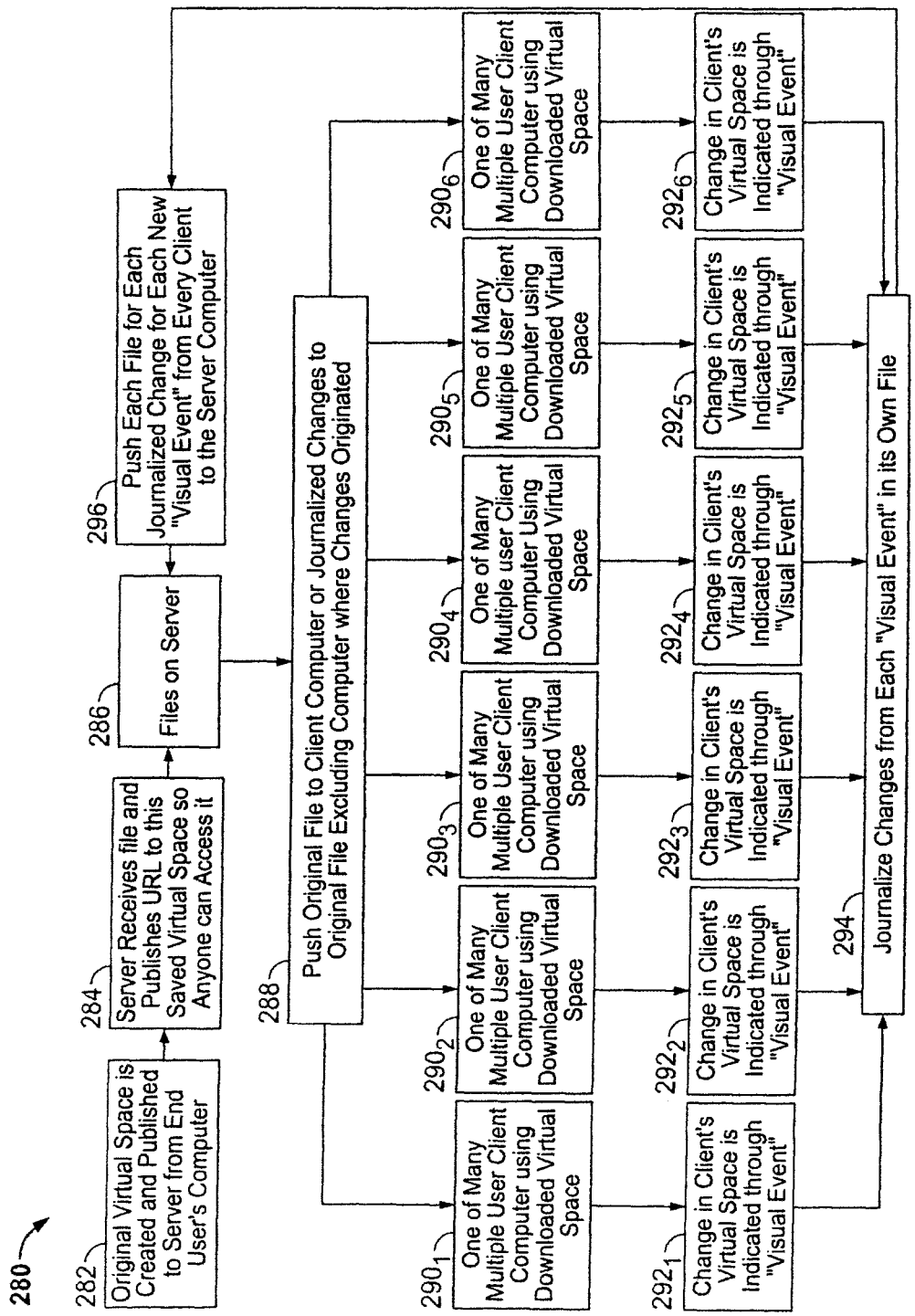
FIG. 8 is a flowchart for a process and system wherein multiple users can simultaneously vie and modify virtual spaces in collaborative fashion.

In one embodiment of the present system, the 3D GUI program allows the end user to publish their spaces to a GUI server (FIG. 8—box 282), such as by clicking a publish button or the like within the program. The 3D GUI program saves the file by uploading it or pushing it to the server and creates an address for this file as a URL (FIG. 8—boxes 284 and 286). One or multiple users (FIG. 8—boxes $290_1$-$290_n$) could visit this published URL at the same time. Visiting this URL would launch the 3D GUI Active X control on each of the end users' client computers and independently download the most recent version of the file to each of the multiple users' computers (FIG. 8—box 288) so they could interact with and use the virtual space. Initially, each end user would be executing the same version of the virtual-space file initially downloaded on their client computer. The server would keep an index of all the end users who downloaded the file (known as the "multiple users") through network communication among the client(s) and the server computer.

Figure 2:
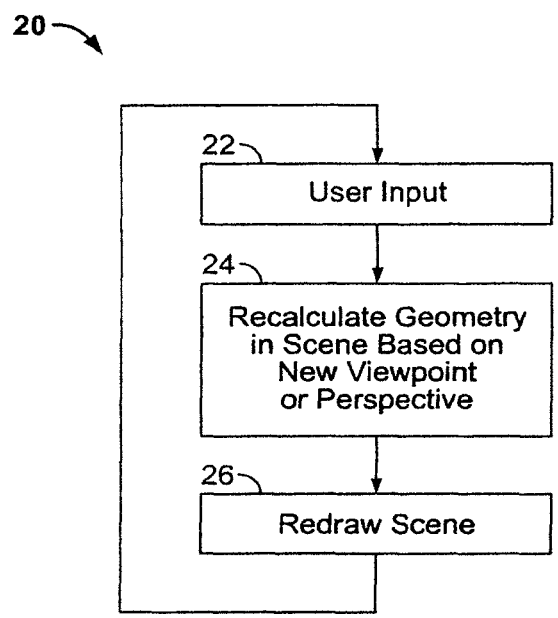
FIG. 2 is a flowchart illustrating the process for cyclically redrawing a 3D Cartesian space based on user input.

Any change through a visual event to any of the multiple users' virtual spaces would be journalized in its own file. Here, visual event refers to a change in appearance to the 3D virtual space, typically caused by adding information and output captured from other sources and drawn within the 3D virtual space (FIG. 2—box 22, 24, 26). The term "journalizing" refers to a file system that logs changes to a journal before actually writing them to the main file. Each file for each journalized change for each new visual event from every client computer would be pushed to the server (FIG. 8—box 296), through a network connection, and added to the original file as a journal entry. Once the server received a journal entry to a file it would push the additions to the original file to all the multiple users' client computers except the client computer for which the change originated. In this way, the new visual events or journalized files from all the multiple users would be updated to the virtual spaces of all the multiple users. This process preferably recurs quickly in a cyclical fashion, thereby allowing all the changes from all of the multiple users to be reflected in real time.

The 3D GUI program provides interactivity of the simulated real-time 3D immersive Cartesian space. While the end user is immersed in this 3D space, the program will take instructions from the user processed by the event handler presented by the Graphical User Interface initiated controls that can change their perspective or viewpoint, which refers to a location or visual perspective in the local coordinate system or three-dimensional space. As such, the end user will be able to achieve multiple, unique viewpoints in a virtual space by moving closer to or away from an object in the virtual space (e.g., a webpage), and/or changing the angle or perspective of the webpage in the virtual space.

In one embodiment of the invention, the Graphical User Interface control that assists the end user in changing their perspective in the virtual space is called a navigator, and it can be seen in FIGS. 11 and 12. By clicking on the icons on the navigator, the end user can change their perspective or viewpoint in the 3D virtual space. In the embodiment shown in FIGS. 11 and 12, (1) the "+" button on the navigator moves the end user forward along the z-axis in the 3D Cartesian space; (2) the "-" button on the navigator moves the end user backward along the z-axis in the 3D Cartesian space; (3) the "up arrow" moves the end user up along the y-axis in the 3D Cartesian space; (4) the "down arrow" moves the end user down along the y-axis in the 3D Cartesian space; (5) the "left arrow" moves the end user left along the x-axis in the 3D Cartesian space; and the (6) "right arrow" moves the end user right along the x-axis in the 3D Cartesian space.

Once the program receives user-initiated input to change the visual perspective of the scene, the program will redraw the scene to reflect the user-initiated input as well as changes to the visual perspective, as illustrated in FIG. 2. The program recalculates the shapes and sizes of objects or geometry in the scene/3D Cartesian space to reflect the location or visual perspective of the end user in the local coordinate system. In order to achieve a realistic real-time experience, the program will redraw the scene in a cyclical fashion.

The event handler is a part of a computer program created to tell the program how to act in response to a specific event (e.g., the clicking of a mouse, the dragging of a scrollbar, or the pressing of a button). The program's custom event-handling functions will be executed by the event dispatcher, which is a part of the operating system that detects graphical user interface (GUI) events and calls functions in the executing program to handle those events (see en.wikipedia.org/wiki/Event_handler).

The program recalculates the shapes and sizes of objects or geometry in the scene/3D Cartesian space to reflect the location or visual perspective of the end user (based on the input gathered by the event handler) in the local three dimensional coordinate system. In order to achieve a realistic real-time experience, the program will redraw the scene in a cyclical fashion. In this way, the end user can control their navigation, position, and viewpoint in the 3D immersive space, giving them the freedom to visualize any geometry within the 3D space at any angle or viewpoint chosen (see FIG. 2).

Figure 4A:
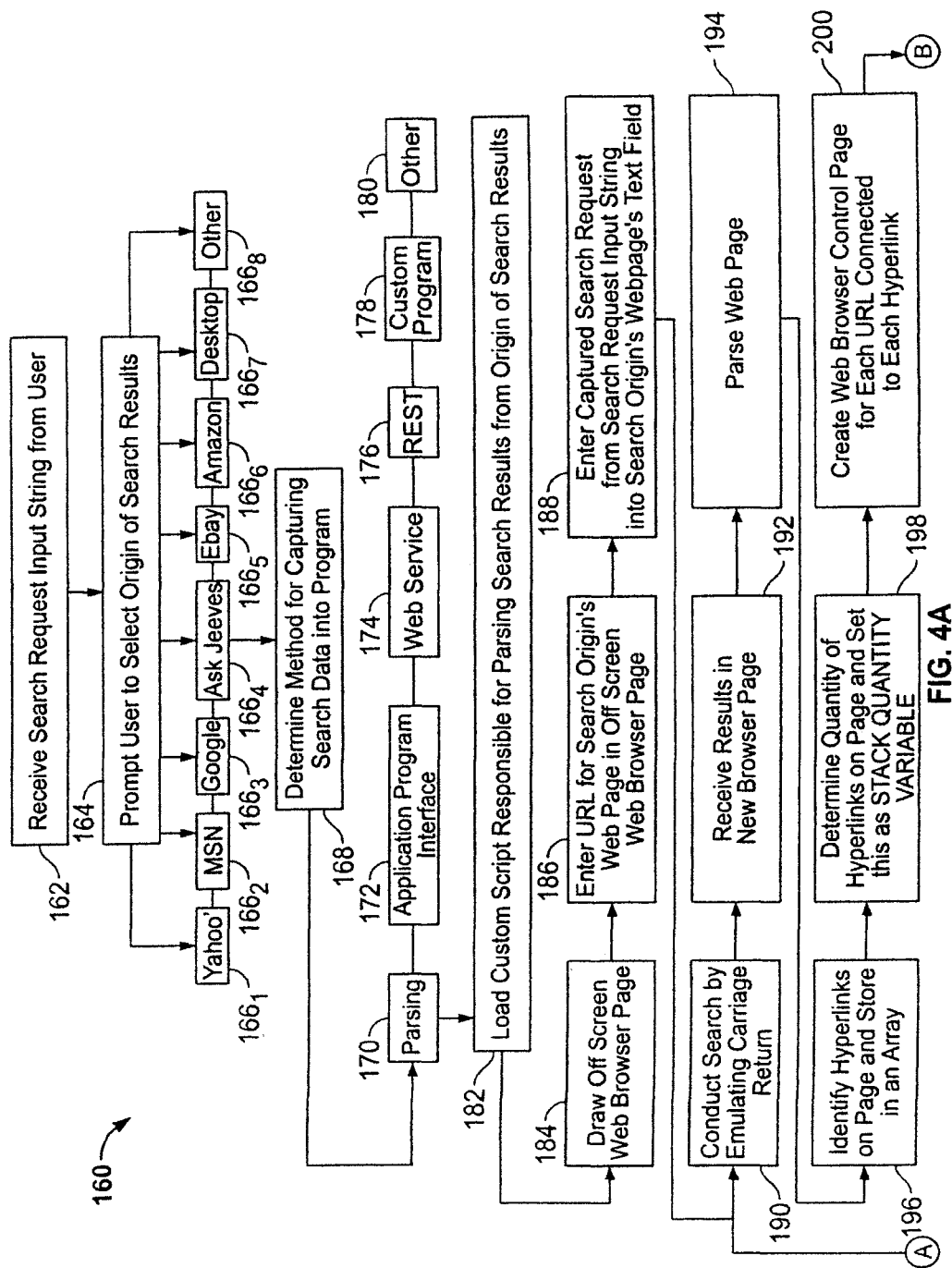
FIGS. 4A and 4B provide a flowchart illustrating a process for creating a 3D output of webpages or other content from hyperlinks.
Figure 4B:
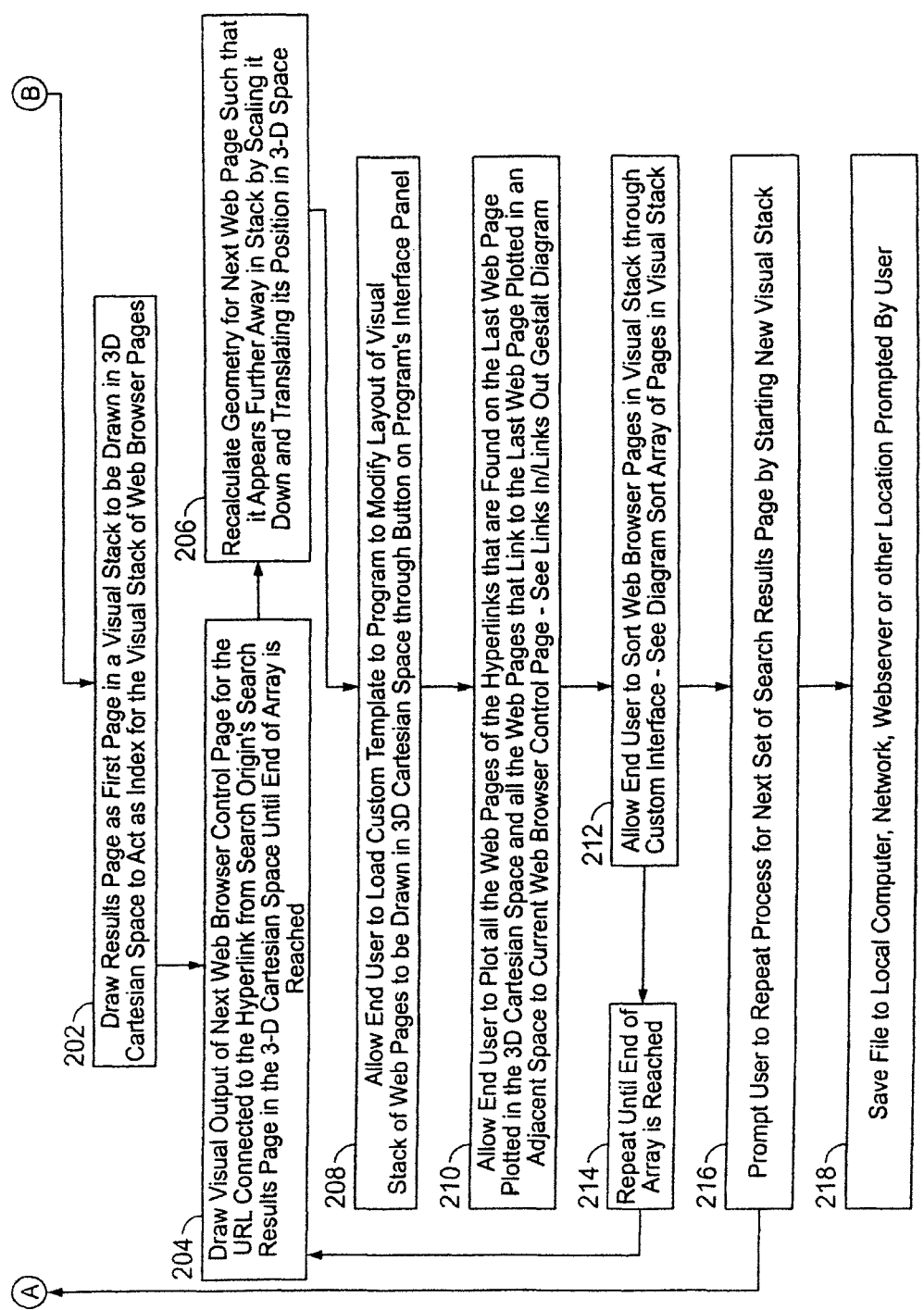

In accordance with one aspect of the embodiments described herein, there is provided a method and system for creating a 3D output of webpages from hyperlinks via interactive meta search results from search-engine outputs. With reference to the embodiment of FIGS. 4A and 4B, there is provided a graphical user interface, such as an input interface or helper application (box 162) within the 3D scene, that allows the end user to input a search term or combination of search terms once an end user is within their 3D space. The helper application or programmatic access can allow the end user to input not only the search term(s), but the source from which the search results should originate (e.g., eBay, Yahoo!, Google, e-mail, desktop, MySpace, MSN, or any other available source of information (as shown in FIGS. 4A and 4B—box 164). Accordingly, the proper helper application must be customized to capture or interface the 3D GUI system with the origin of information. Most search engines, portals and publishers of information on the world wide web require different programmatic access techniques to expose their information through web-services to allow other systems to connect with their information. Workers who are skilled in this art will understand that slight changes must be made to bridge the 3D GUI to this information without departing from the system. For example, the method can comprise connecting with http://www.google.com to facilitate the bridge of information into the 3D GUI system.

Similar to the way a search engine's crawler roams the world wide web by visiting hyperlinks, storing the URLs, and indexing the keywords and text of each page encountered, in one embodiment, the 3D GUI program can conduct a world wide web search on-the-fly, using these search terms in the search system or website of the end user's choice by opening one 2D HTML page of the homepage of the chosen search engine (in this case http://www.google.com FIGS. 4A and 4B—box 184), drawn off screen (hidden) through the operating system's web browser control (FIGS. 4A and 4B—box 184) as a child window within the 3D GUI. Our program will then enter the search term into the off screen text input field of the search engine's homepage (FIGS. 4A and 4B—box 188), emulate a carriage return, retrieve the search results (FIGS. 4A and 4B—box 192), parse the search results found in each HTML page, identify each hyperlink that the search engine returned to the end user as a search result, and store this in an array. In one approach, the program will open one new webpage or window in the 3D space (behind the search results page) for each element of this array or each hyperlink found on the search system's results page that would display the webpage found at the URL for the given hyperlink.

If the end user conducts a new search, the program will open a new browser window with the URL of the search system of their choice off screen for each search phrase entered into the input interface, transfer the keyword phrase to this search page as a staging area and emulate the carriage return. Once the search results appear, they can be brought into the program again. However, each new search result much have its own browser window drawn off screen and then brought back into the 3D Cartesian space.

In addition, it should be noted that the web browser control in the Windows operating system adds browsing, document viewing, and data downloading capabilities to applications. Applications using this control will allow the user to browse sites on the World Wide Web, as well as folders in the local file system and on a network. The web browser control is used in certain embodiments of the present invention. However, it will be noted that the 3D GUI system can utilize any part of the operating system shell or other component, other than the web browser control, as the method to capture and display output from the computer.

The 3D GUI program can open one new webpage or window in the 3D virtual space (behind the search results page FIGS. 4A and 4B—box 202) for each element of this array or hyperlinks found on the search system's results page that would display the webpage found at the URL for the given hyperlink. In this way, the 3D GUI is not unlike a search engine's crawler except here the system visualizes the actual webpages, information and hyperlinks it encounters on-the-fly in a 3D virtual space instead of storing it in a database as an index. In FIGS. 4A and 4B—box 202, one can identify the search results page drawn in front of two webpages. The system as a default draws each new webpage in what we call a "3D stack" (i.e., a stack visualized in 3D, sometimes referred to as a 3D stack) as shown where each new webpage occupies an x,y,z coordinate similar to the position of the existing webpage; except it is drawn further into the distance along the z axis (where it appears smaller from the given perspective) and is translated on the x or y or both x, y axis to allow the end user to see multiple webpages from any given perspective. For example, in the embodiment of FIG. 9, one can see a bird's eye view of four 3D stacks 302, 304, 306, 308 drawn in a virtual space 300 where each 3D stack (each containing about ten items in this embodiment) represents a new search.

With reference to the embodiment of FIG. 10, frames 366 and 371 provide two search results conducted using a search engine (e.g., Google). Each search results in the creation of its own 3D stack (360, 370), each stack including about ten webpages. The dynamic creation of these 3D stacks (360, 370) in the 3D virtual space 300 is the default gestalt that the 3D GUI display engine uses to output the elements found within the 3D virtual space's organized output of information. In another embodiment, the display engine has the ability to load other custom templates to achieve one or more different gestalts (e.g., 3D stacks, etc.).

With continued reference to FIG. 10, there is provided another embodiment of a navigator 380. By clicking on the icons on the navigator 380, such as next page 382 or previous page 384, the end user can easily change his/her perspective or viewpoint to coincide with the meaning of the buttons on the navigator 380. For example, clicking the next page 382 on the navigator 380 binds the end user to a close-up viewpoint of the next page in a 3D stack (e.g., moving from page/frame/window 361 to page/frame/window 364). Additionally, (a) the + button 390 moves the end user forward along the +z axis in the 3D Cartesian space, (b) the – button 392 moves the end user backward along the –z axis in the 3D Cartesian space.

There are also provided a group of navigation buttons 396 near the bottom of the screen. Clicking the button 324 brings up the first page of a 3D stack (e.g., page 361 of stack 360), whereas button 406 pulls up the last page of a 3D stack (e.g., page 368 of stack 360). Stated another way, clicking button 398 binds the end user to a close-up viewpoint of the first page in the 3D stack, whereas clicking button 406 binds the user to a close-up viewpoint of the last page in the stack. Similarly, clicking button 400 brings up the previous page, whereas button 404 pulls up the next page in a given stack. Clicking button 402 causes the program to take a snapshot of the current Cartesian space arrangement of windows and objects, which makes it possible for the user to pull up the current Cartesian space at a later time. Clicking the "next 10 pages" button (now shown) draws the next ten pages in the 3D stack, adding it to the original ten pages to create a total of twenty pages in the 3D stack. Clicking the previous 10 pages button 408 binds the end user to a close-up viewpoint of the previous 10 pages in a 3D stack (for example, moving from the twentieth page back to the tenth page).

Also illustrated in the embodiment of FIG. 10 is a supplemental navigation button 410 for changing his/her perspective or viewpoint in the 3D virtual space 300. For example (a) the up arrow 412 moves the end user up along the +y axis in the 3D Cartesian space, (b) the down arrow 414 moves the end user down along the −y axis in the 3D Cartesian space, (c) the left arrow 418 moves the end user left along the −x axis in the 3D Cartesian space and the (d) right arrow 416 moves the end user right along the +x axis in the 3D Cartesian space.

When an end user clicks the close button 420 on any texture map of a web browser control represented in the 3D stack, the 3D GUI removes the page from the 3D stack, animates the next page after removed page forward to replace position of removed page in stack, animates page after previously animated page to original position of previously animated page before it was moved, animates forward next page in 3D visual stack to replace position of previously animated page, animates next page in stack to position of previously animated page, and repeats this process until the end of the 3D stack or last element in the array is reached.

In addition, the 3D GUI can be easily customized in another embodiment of the invention to accommodate a formula to dynamically compute the position or x,y,z coordinates of each webpage (or other item) drawn within a 3D stack to take on the overall look of what we call a custom gestalt whereby the configuration or pattern (x,y,z coordinates in the virtual space) of elements are so unified as a whole that it cannot be described merely as a sum of its parts. For example, in one embodiment (not illustrated), a different gestalt or pattern for drawing webpages takes on the shape of a three-dimensional cube where each webpage is plotted at the point of intersection of three sides of the cube (different than the column gestalt in FIG. 9).

In another embodiment, the 3D GUI retrieves images from a helper application which are then presented in a matrix wherein four pictures are drawn into two rows and two columns for each 3D stack along the x and y plane within the virtual space. In yet another embodiment, the visual gestalt is of a matrix where sixteen pictures are drawn into four rows and four columns for each 3D stack along the x and y plane within the virtual space's gestalt.

In accordance with another aspect of the embodiments described herein, the 3D GUI "gestalt" can be adapted to provide a "Links In/Links Out" feature in combination with a gestalt for any object or web page in the search results within the virtual space. First, should the user request, the program will automatically allow the end user to plot all of the web pages or objects that "link out" of any given web page or object within the 3D virtual space. Second, should the user request, the program will automatically allow the end user to plot all of the web pages or objects that "link in" to any given web page or object within the 3D virtual space.

The 3D GUI system's display engine can also be adapted to output a custom gestalt suitable for e-mail. The labels drawn in the 3D Cartesian space, their positions and angles for Links In/Links Out can be customized to display any titles which correspond to the kind of data presented. Each coordinate or position in the 3D Cartesian space for plotting the information displayed in 3D stacks and Links In/Links Out, are variables that can be amended within a custom template that is compatible with the program to alter the look of the gestalt in the 3D Cartesian space. This can be accomplished by using xml encoded data in the template that utilizes the extensible nature of the program. Those skilled in the art will be able to create these extensible data tables that work with the system. The program can handle multiple templates at once through template files and switch between different themes on-the-fly at the request of the end user through their input from the interface panel.

In one approach, each coordinate or position in the 3D Cartesian space displayed in the 3D stacks are variables that are amended by a custom template that is compatible with the program to alter the look of the gestalt in the 3D Cartesian space. This is accomplished by using xml encoded data in the template file that utilizes the extensible nature of the program. For example, a cluster of eight windows can be arranged at the corners of a cube configuration, wherein the each window can be rotated through the cube arrangement to sort through the pages in the cluster. The Links In and Links Out feature can be represented by line segments that connect each cluster. It will be noted that a cube cluster is only exemplary and that clusters having variable numbers of pages to display are contemplated as well. For example, in another embodiment, five windows are represented in a cluster having a pyramid configuration, wherein the pyramid comprises a rectangular base with four points and a single point located above the rectangular base.

Figure 21:
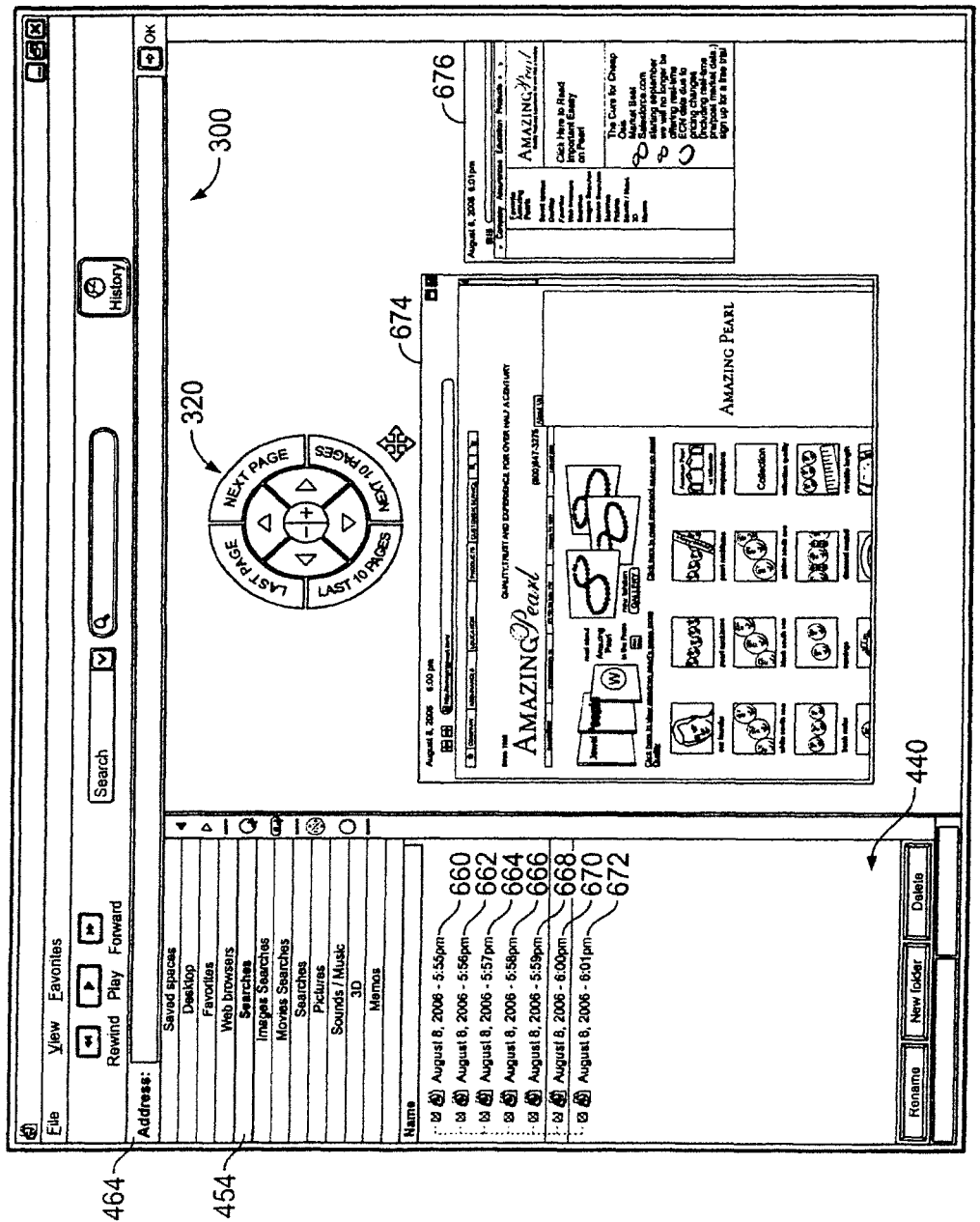
FIG. 21 shows a 3D GUI with the Searches helper application opened within the database module.

In one embodiment of the invention, the 3D GUI can be a historical visual chronology of the user's computing session, whereby the application can archive the date and time of each new visual event by recording the viewpoint at that date and time of the computing session and revisit these visual events by restoring the viewpoint at that date and time. Here, we are calling a "visual event" as any change in appearance to the 3D virtual space usually caused by adding information and output captured from other sources and drawn within the 3D virtual space (FIG. 2—boxes 22, 24, 26). In one embodiment of the present invention a virtual space is created as shown in FIG. 21. Furthermore, the helper application called "Yahoo! Search" is utilized to conduct a search and plot the webpages for the search result in the 3D virtual space in its own 3D stack. The searches tab 454 in the compass 440 is selected showing the date and time that each search result or webpage was plotted within the virtual space in the window pane below it in chronological order (see entries 660-672 in menu 441 of compass 440).

We are calling the "compass" an area in the program that can store information in the 3D GUI that is related to the program such as viewpoints. The compass can have categories where information is stored. Changing the categories gives the end user access to different information, allowing one to filter or discover information based on the category selected where the information resides.

Here we see that the events (674, 676) shown or drawn in the virtual space 300 correspond to the archived date and time indexed for each event in the searches tab of the compass. Since 3D virtual spaces have a (i) horizontal position known as (x), (ii) vertical position known as (y) and (iii) a position of depth (z) which is also known as time, one can see how it is possible to create a visual history of the end user's computing session by plotting new output in a new position further along the (z) axis and date and, time stamp it (e.g., entry 670 which reads Aug. 8, 2006-6:00 p.m.) In fact, the system can be programmed to archive any information combined with the proper operating system controls or other output at the next visual event to be drawn in the 3D virtual space by the help of custom helper applications. For example, a graphical event could be the creation of a webpage in the GUI's 3D virtual space by typing a URL such as http://www.yahoo.com followed by a carriage return on the command line interface labeled "address:" 464.

The 3D GUI automates navigation in computing by remembering where the user left off last—visually—such that the next time the user requires the same series of inputs to achieve that same given output, the 3D GUI will navigate the user through a recorded 3D space that is the visual history of where the user last left off and the items that were output into the virtual space will be staged just as they were.

With reference to FIG. 13A, in one embodiment, the application the 3D GUI runs as an Active X control within the Internet Explorer web browser. The Saved Spaces tab can be selected in the explorer pane to reveal all the saved spaces in the menu below it. Clicking a saved space will load the 3D virtual space into the main window. Window 490 shows the output of another helper application called Desktop 451 whose name is shown as a tab in the compass 440. In the illustrated embodiment, a saved Microsoft Word document 500 is running in a window 490 within a 3D virtual space 300 alongside items 492, 494, 496, 498. All of the outputs of these items were captured through the input of the end user through helper applications using the method called "Interactivity and Persistency" (see exemplary approach shown in FIG. 3). This output saved here as a virtual space 300 can be combined together from disparate sources and saved together as one in a virtual space 300.

Furthermore, the Microsoft Word document 500 whose output is running in the 3D virtual space window 490 was input (into the 3D virtual space 300) by the end user by drag-and-drop (FIGS. 1A-1C—box 78) from the menu of the helper application labeled Desktop 451, in the explorer pane of the 3D GUI application shown as a graphical event. Using the helper application called Desktop 451, any file, document, application or desktop can be added to a 3D GUI virtual space by drag-and-drop (FIGS. 1A-1C—box 78) in the same way the Microsoft Word document 500 was added to the virtual space 300. Furthermore, once the file, document, application or desktop is added to the virtual space 300, it is fully interactive and functional and appears no different from, or close to, the original way the program functions when it was not in the 3D Cartesian space 300.

Figure 13B:
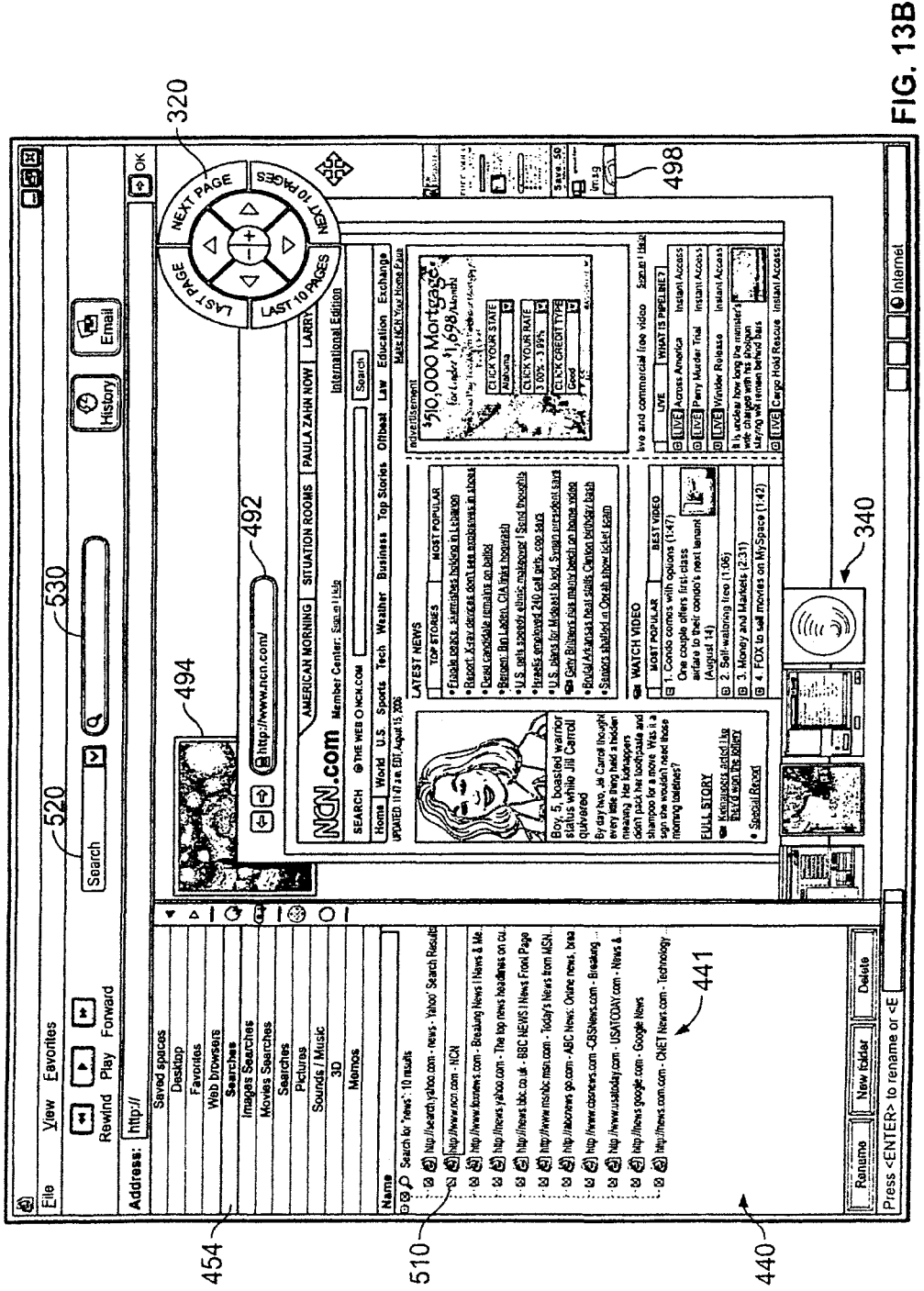

FIG. 13B shows a saved virtual space whose file name is called ncn (510) whose itemized output from helper application called "Yahoo! Search" (520) is indexed in the explorer pane 441 of the 3D GUI window. Clicking one of these indexed names (viewpoints) will bind the end user to a viewpoint created by the helper application that brings a favorable viewpoint/perspective of the output for this particular webpage in the 3D virtual space to the end user's view. As such, each name indexed in the explorer pane of the window (compass or database module 440) under the searches tab 454 serves both as an index of the search results gathered by the helper application as well as a hyperlink or trigger to a favorable viewpoint within the 3D virtual space of each webpage within the search results.

In certain cases it may be difficult to interact with a file, document, application, desktop or other output within a 3D virtual space. This can be the case if the end user is occupying an unfavorable viewpoint in the virtual space where objects are drawn in skew within the virtual space. In such a case, the 3D GUI system uses a technique called "Bind to the HUD", which involves bringing a file, document, webpage, application, desktop or other output into view by drawing it on the HUD. Those skilled in the art will recognize that the term "HUD" or "heads-up display" refers generally to a way of projecting information directly into a human's visual field. This technique was pioneered for military aviation, but has been used experimentally in other applications as well. This can be accomplished by changing the viewpoint of the end user within the virtual space so it is directly in an end user's visual field.

When the viewpoint of the end user within a virtual space has caused the webpage to be drawn in skew, there will often be a distortion in shape of the normal distribution toward one side or the other. In such a case, the 3D GUI system utilizes the Bind to the HUD feature whereby clicking an icon or bottom (analogous to the minimize in windows operating system environment) triggers a change to the viewpoint of the end user within the virtual space so that the webpage is directly in an end user's visual field, thereby making it easier to interact with. In one embodiment, this is accomplished by revealing the 2D version of the webpage that was initially hidden or drawn off screen and positioning it in a layer that is in front of the 3D virtual space such that the end user can interact with this layer in 2D. Furthermore, the end user has the freedom to unbind to the hud or hide the 2D webpage again that was initially hidden or drawn off screen by clicking the appropriate button (again, analogous to the minimize button in the windows operating system environment). As such, an end user can toggle or switch between 2D and 3D for any selectively captured computing output and information (webpages, applications, documents, desktops or anything that can be visualized on a computer) that was drawn within a 3D virtual space at will by using this technique.

Since the 3D GUI takes advantage of seemingly unlimited space, the output of applications and documents need not be closed, hidden or filed. They are staged and can permanently exist visually open (by recording their output in a 3D virtual space) where they are and how the user last left them. The 3D GUI does this by allowing the user to record everything they ever did, visually, and letting them revisit it through unlimited space. Should the user require a new computing experience, they simply create more virtual space and plot new applications and documents within this newly created virtual space through helper applications or programmatic access.

Should the user require an old computing experience, the 3D GUI changes the graphical output of the screen to visually represent what they saw during the old computing experience (e.g., data at a particular viewpoint recorded at a particular date and time or archived under a file name). This old computing experience can be saved in a file as what we call a "saved space". A saved space is not unlike any other file as it stores the information that can be seen in a virtual space by the 3D GUI program at any time the end user chooses by utilizing the save space command. In addition, the 3D GUI can systematically archive any new visual change or addition to the virtual space by date and time and recall what was seen in a past virtual space by date and time. This way, the 3D GUI lets one travel back (visually) in computing time.

In accordance with one embodiment of the present invention, the 3D GUI provides full functionality and interactivity of the 2D display of a user's computer (including the selective and isolated capturing of graphical windows, desktops, HTML pages, and general program outputs) redrawn into a novel simulated real-time 3D immersive Cartesian space, whereby the 2D graphics are drawn or mapped onto 3D objects.

The 3D GUI invention is a novel system that offers a 3D stage to bridge information into and handle this information from an operating system's output. The 3D GUI system disclosed here can be adapted to capture any output from any operating system, in the language of the operating system, regardless of any programmatic or structural changes to the operating system, the way it outputs or the sequence of programmatic events used to program the operating system or interact with it.

In one embodiment, the 3D GUI system implements interactive composite texture mapping of operating system controls or other operating system outputs into infinitely immersive interactive 3D Cartesian space to facilitate search, sort and a browsing GUI system of information (e.g., but not limited to webpages, applications, documents, windows, networks, webservices, etc.).

Regardless of the (1) kind of information brought into (through the output of the operating system) the program whether it be webpages, pictures, windows, applications, desktop screens, pdf files, etc. or (2) the method by which the information is captured by the program whether it be through APIs, Meta Search, or webservices, or (3) the programmatic access by which it is delivered (controls, windows, desktops, images, VNC) it is critical that the program bring the information into the simulated 3D interactive Cartesian space in such a manner that the information being brought in is fully interactive and functional and appears no different from, or close to, the original way the program functions when it was not in the 3D Cartesian space.

In accordance with one aspect of the embodiments described herein, there is provided a special control from the operating system such that the information being dealt with (e.g., webpages) functions properly in the 3D Space as it would in 3D. Accordingly, in the world of computing, a "CONTROL" is defined as an object that enables user interaction or input, often to initiate action, display information or set values. For example, in order for a webpage on the World Wide Web to function properly in the operating system in a typical window on the 2-D desktop of an end user's computer, the language of that webpage (HTML) must be read by an operating system program or CONTROL in order for the webpage in question to be displayed and function properly. One such particular control used by the Windows Operating Systems is called a Web Browser control that deals with webpages as well as typical desktop windows. Currently, most Windows controls are visualized using a 2-D paradigm. The name of one such control is called MSHTML/webbrowser control for rendering HTML webpages and other content on the Windows desktop within a window.

Webpages, unlike pictures that the end user simply view, require interactivity to function properly in a virtual space. Because the viewpoint of an end user within a 3D interactive virtual space can change, so to do the shapes and sizes of the objects being drawn change based on the end user's navigation within the virtual space. If the objects being drawn within a 3D virtual space having operating system output such as controls mapped onto them, a special system must be created to insure that the end user can interact with the mapped object in a 3D virtual space with the same responsiveness of input and output that one would find in a 2D desktop. As such, described herein is a interactive 3D composite texture mapping to serve as a visual bridge of information from an operating system's 2-D output (e.g., the programmatic access for which the 2-D is being displayed utilizes a control, and all the information a control is capable of displaying) to the 3D interactive Cartesian space, wherein the represented objects remains fully functional in the immersive space from any viewpoint that the end user selects (see FIG. 3).

As such, the program delivers full functionality and interactivity of the two-dimensional display of an end user's computer (including the selective and isolated capturing of graphical windows, desktops, HTML pages, and general program outputs or any information a control can display or non-control item) redrawn into a novel simulated real-time 3D immersive Cartesian space whereby the two-dimensional graphics are drawn or mapped onto three-dimensional objects.

While immersed in this 3D space, end users can see their two-dimensional computer display components that were captured and redrawn and fully interact with them, creating an entirely new way of computing. While interacting with their mapped or redrawn two-dimensional displays, end users can change their perspective or viewpoint (as defined as a location or visual perspective in the local coordinate system or three-dimensional space) by moving closer to it, away from it, changing their angle or both.

In one exemplary embodiment, the visual output of an operating system's control that one would normally find output on the 2D desktop (e.g., webbrowser control/msHTML) is texture mapped onto 3D geometry (e.g., a cube, pyramid, etc.) in the GUI system's 3D immersive virtual space. This is one operating system control chosen from an infinite library of possible operating system controls, APIs or any outputs whose output can be captured by the 3D GUI and drawn onto any object in the 3D space. In addition, the origin and method for the visual output of an operating system's control can be texture-mapped onto the 3D Geometry in the GUI system's 3D immersive virtual space regardless of what it is or how it was captured.

Figure 3:
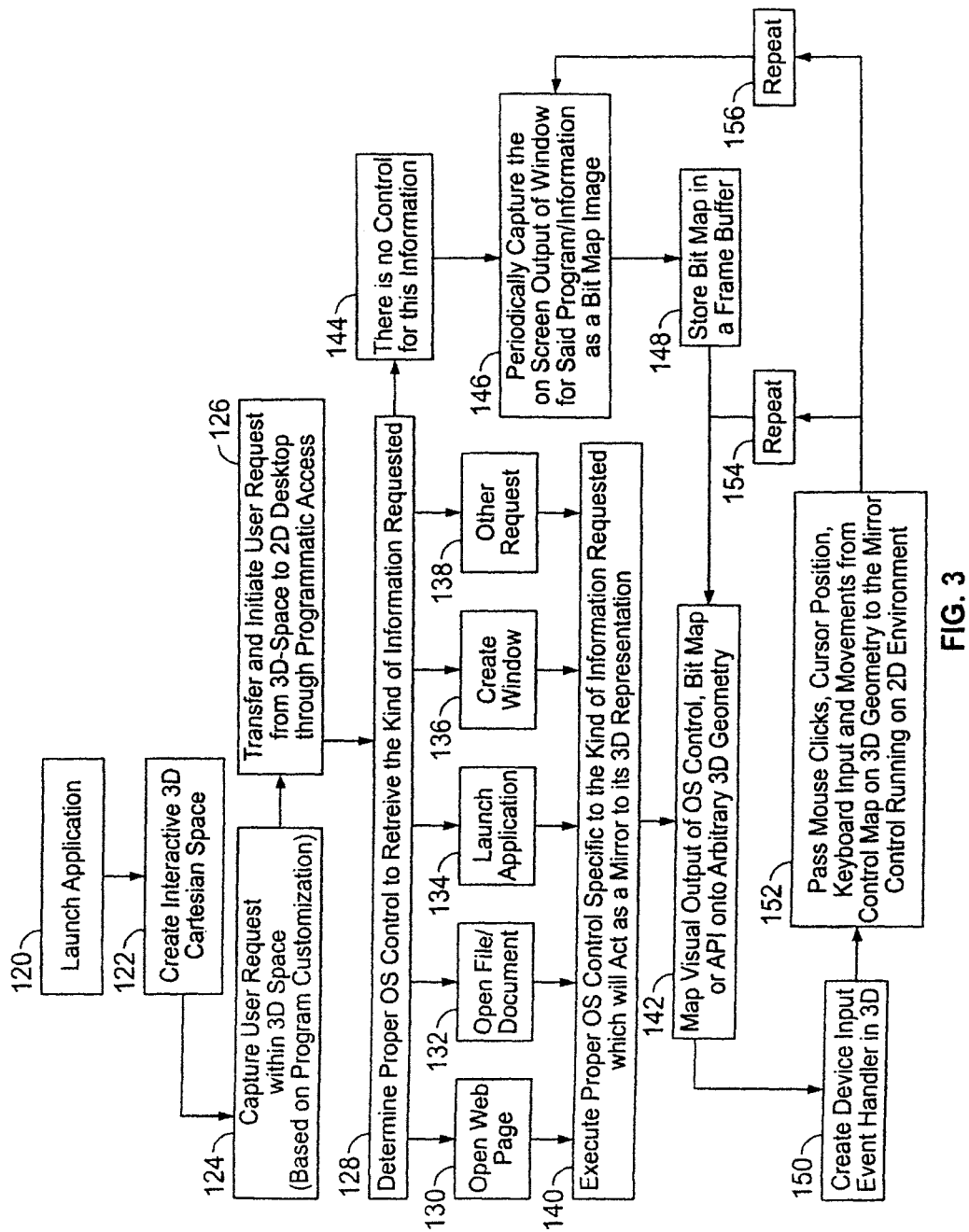
FIG. 3 is a flowchart illustrating an exemplary approach to processing information achieve interactive composite texture mapping, as well as interactivity and persistency, in a virtual space.

With reference to FIG. 3, there is provided an Interactivity and Persistency Diagram illustrating the processing of information required to achieve both interactive composite texture mapping as well as interactivity and persistency in a virtual space. In the diagram, this process is initiated with the launching of the 3D GUI application which can be installed on either a client computer or a server computer.

The 3D GUI running on a server can deliver information and software to other computers linked by a network. Here, the client is the requesting application program or user in a client/server relationship. For example, the 3D GUI client application is effectively making client requests for information from the 3D GUI server over the Web. The 3D GUI program itself is a client in its relationship with the computer that is getting and returning the requested information. The computer handling the request and sending back the information is the 3D GUI server.

In this embodiment, the 3D GUI application program will run locally on the computer rather than as a web-application or network-application over a network connection. However, both configurations are possible. Should the invention execute on a server or other such computer, this would provide a user of the client computer to have access to other computers' operating system's output. Initially, the application is launched as described by Launch Application in the diagram. A virtual space is created, "Create Interactive 3D Cartesian Space", on the computer desktop for which it runs through the program. Virtual space is simply a program (running within the run-time environment/3d rendering browser) simulating a 3D space within a flat 2D display by redrawing objects in the virtual space. Depending on the application or computing purpose at hand, the program will capture user input request based on the intended program customization.

Through programmatic access, the application will transfer and initiate user requests from the 3D virtual space to 2D desktop or directly to the operating system of the computer through an API call. If this transfer of user requests from 3D to 2D is done directly to the 2D desktop without an API call, the user requests are transferred by simulating/emulating or reproducing the request or device input from event handler off-screen onto the hidden 2D mirror component and capturing the response or change in output from the 2D mirror again in a synchronous fashion and mapping it back to arbitrary 3D geometry. We say off-screen because the 2D desktop or operating system control is hidden from the end user to focus attention on the 3D virtual space. In this way, end users can compute with the same outputs from their 2D desktop through a 3D virtual space that acts as 3D window into 2D output, setting the stage for computing with seamlessly unlimited virtual space.

Based on program customization, the application will "Determine proper OS control to retrieve the kind of information requested" by the end-user to the purpose at hand. For example, this could include (but not limited to): (1) opening a webpage, (2) opening a file or document, (3) launching an application, (4) create a window or (5) executing any other program locally or over a network connection.

As such, once the proper operating system control is specified and located, an application program interface call is executed for this system control. In order to enable the usability and functionality of this control or other operating system application program interface within a virtual space, the 3D GUI will blit or map visual output of OS control, bit map or API onto arbitrary 3D geometry. The phrase arbitrary 3D geometry is used to clarify that this geometry can be unique to the theme of the virtual space that the 3D GUI is customized to through a template that utilizes a specific gestalt.

It will be noted that the 3D GUI is not limited to one method for capturing this map or "visual output of OS control" or simulating or passing the user's request to the mirror as each operating system has a unique method for handling controls and their output.

Within the 3D virtual space, a device input event handler is utilized to pass mouse clicks, cursor positions, keyboard input and movements from the operating system control mapped onto the 3D geometry to the mirror control running on 2D environment.

Currently, this method or cyclical process of capturing operating system output and drawing it into a 3D virtual space is a workaround or manual procedure implemented in order to overcome a shortcoming of the operating system to the problem at hand. In another embodiment, the operating system can incorporate this feature or similar to it with one simple API call in the future at which time the 3D GUI system could utilize this API.

This process of (1) mapping visual out of operating system control on 3D geometry in a virtual space, (2) scanning the device input event handler and (3) passing this input to the mirror control running in 2D environment or directly to the operating system is repeated in a cyclical fashion to create a real time experience of interacting with said operating system controls or operating system output in a virtual space, regardless of the viewpoint or perspective of the end-user in the virtual space. The 3D GUI application runs in real time in which information is received and immediately responded to without any time delay among the virtual space and the 2D map or operating system API output. This synchronous communication is advantageous as too much delay would make the system lag.

As one can discern from FIG. 3, in the situation that there is no operating system control or programmatic access to capture the map or visual output of an operating system control, a contingency is incorporated to periodically capture the on-screen output of an operating system control or output (e.g., window) as a bit map from the frame buffer, video driver, operating system graphics API or video memory by blit (to copy an image, or part of an image, from one place to another). With further reference to FIG. 3, it will be noted that the method and system for providing a 3D GUI as described herein allows the system to capture the visual output from any computer source regardless of its origin or how it was output. For example, while boxes 128, 140, 142 in FIG. 3 refer to OS Control and/or say "Execute Proper OS Control Specific to the Kind of information Requested . . . ," it will be noted that the invention is not limited to applications involving OS Control, but can relate more generally to applications involving Programmatic Access or the like. For example, in certain embodiments, box 140 of the flowchart of FIG. 3 can read "Execute Proper Programmatic Access to the Kind of Information Requested which will act as a Mirror to its 3D Representation."

By capturing the output of the user's traditional two-dimensional desktop, the GUI stages this output in a seamlessly 3D space by plotting the windows or other graphical representations of programs in 3D. In one embodiment of the present invention, 3D GUI anticipates what the user may seek next (for example, the next webpage in a search result), eliminates dormant computing time, and puts the user in a reduced-click computing environment by automatically plotting the new computing experience (in a new space, rather than overlapping it onto something else) while visually recording the old. Because the 3D GUI creates the illusion of infinite space in 3D, it can create a visual history of the user's computing session, whereby the user can visit past visual computing events (or a snapshot in time) by simply navigating to previously recorded states. This can be accomplished because new information expressed graphically in a virtual space does not replace old information by replacing it or overlapping it. Instead, it is drawn in new virtual space. Accordingly, the 3D GUI can serve a historical visual chronology of the user's computing session, whereby the user can name the computer experience they are currently having through their position(s) (or viewpoint) in a 3D space and revisit it by recalling the name or title at a later time.

While immersed in this 3D space, the user can see their 2D computer display that was captured and redrawn and fully interact with it, creating an entirely new way of computing. While interacting with their mapped or redrawn 2D display, the user can change their perspective or viewpoint (as defined as a location or visual perspective in the local coordinate system or 3D space) by moving closer to it, away from it, changing their angle or both.

The 3D objects that are being drawn onto (or next to) can collectively represent a theme or backdrop for the content that is redrawn, such as a house, library or even neighborhood. For example, electronic music files may be mapped onto 3D pictures of CDs or Records, electronic videos files may be mapped onto televisions or movie screens, etc. (see FIG. 22). The redrawing of 2D computer screens onto interactive 3D objects increases the visual computing space and allows the user to organize the computer output onto objects or near objects whose 3D visual construct may represent the real world object the computer output is associated with.

In accordance with one aspect of the present invention, the 3D GUI is adapted to create a visual computing history, whereby normal changes to a 2D computer display output are drawn or mapped onto new 3D objects, rather than replace the current output or 2D display once a change is made. For example, in one embodiment, when the user clicks on a hyperlink on webpage A, this results in the creation of a new webpage B instead of replacing A. For example, as the user browses the internet by interacting with a two-dimensional output mapped onto a three-dimensional object, pages that the user would normally hyperlink to by clicking a link would replace the 2D computer display. The 3D GUI, however, is adapted to create an entirely new 3D object whose surface is mapped with the new display content that would normally replace the original 2D interactive page.

By storing and archiving the date and time of each new graphical event, the user creates a visual chronology of their computing session, which can be recalled by clicking icons on a timeline where each icon on the timeline represents the action of the end user at a specific date and time. The programmatic access that is responsible for a past graphical event would also be archived. For example, in the case of viewing a second HTML page that one hyperlinked to, the previous URL would be saved. This way, a user could always look back at what the computer previously displayed before it output the current view and interact and function with a previously saved computing state as represented graphically. This process of capturing visually the computing history in 3D can continue on indefinitely, whereby the 3D visual space can be saved, archived and revisited and the timeline would grow dynamically with additions of icons to represent this.

In accordance with one embodiment of the present invention, a compass (or database module) application is provided. The user is allowed to click at least one button on the compass (while immersed in a three-dimensional interactive space) and assign one or multiple names to a viewpoint (as defined as a location or visual perspective in the local coordinate system or three-dimensional space). The user may then view the three-dimensional image associated with the viewpoint and save this viewpoint (or visual perspective) along with its corresponding name in a file whose content or data can be accessed by the compass. In one embodiment of the present invention, the compass acts as an electronic combination lock, whereby the combination or sequence of one or multiple names assigned by the user and added to the dials of the compass identify the stored location.

For example, consider the situation whereby a user is immersed in a 3D interactive space showing 3D objects of compact discs from The Beatles. To view the current viewpoint, the user could assign multiple names such as MUSIC, ROCK, FOREIGN, BRITISH INVASION whereby each name would occupy one space on one of many dials of the graphical user interface. By turning the dials to the names MUSIC, ROCK, FOREIGN, BRITISH INVASION the program would initiate a change of viewpoint to the 3D interactive space showing the 3D objects of compact disks from The Beatles. The use of the interface feature for naming, storing and re-visiting viewpoints in a 3D space is universal and can be applied to a local file of a 3D space on the user's computer, a networked file or a file on the world wide web.

In accordance with one aspect of the present invention, the user is able to access stored viewpoints on a graphical interface called a compass, which may serve as an electronic combination lock. In this embodiment, the compass will open (or visually visit) a stored viewpoint when its dials are turned through a predetermined sequence of positions identified on the dials' face by the appropriate names assigned to each dial. Therefore, the compass can be used to connect a series of viewpoints together and visually visit a series of connected stored viewpoints.

In accordance with one aspect of the present invention, the user is immersed in a 3D space and provided with a button called new space or the like. When this button is clicked, another file for a completely new 3D interactive space is created, whereby the new 3D interactive space is accessible from the current space by clicking a 3D object or portal button. The portal button, which electronically links the new space to the current one, may be represented by a picture of a viewpoint or visual perspective of the new space. By clicking the new space button, the 3D GUI will automatically create the portal button within the current space that links to the new space. Furthermore, the 3D GUI may also allow the user to concurrently assign one or multiple names to the new space, and add these name(s) to the database module (also known as the compass).

Should a user create a new space and then save this space or e-mail it (FIGS. 1A-1C—boxes 96, 98) the 3D GUI may be adapted to automatically create a table of contents page (FIGS. 1A-1C—box 100) by writing the markup for an HTML page that describes the new space, the names assigned to the new space via the compass, and pictures of the new space through snapshots of different viewpoints or visual perspectives of the 3D file. All this information may be assembled into an HTML file that will be automatically published or sent by file transfer protocol (FTP) to one or many world wide web servers for promotion as to be found and crawled by the many search engines that traverse the world wide web.

One purpose of creating these HTML table of content pages for newly created 3D spaces on-the-fly and publishing them to the world wide web is so that they can be used as portal pages, whereby a user could (i) search the world wide web using keywords, (ii) find a table of contents page whose subject corresponds to the keywords, and (iii) hyperlink the end user from a 2D table of contents page to a 3D interactive space whose subject matter corresponds to the table of contents page. For example, the HTML table of contents page may contain (i) the name of the new space as the title of the HTML page, (ii) meta tags whose names would be taken from the names assigned to viewpoints of the compass interface, (iii) a raster image or picture of the original viewpoint or visual perspective of the new space, (iv) a list of all hyperlinks found within the new space, (v) a description of the scene, (vi) the author of the scene, (vii) remote desktop connection settings and/or (viii) URLs to the desktops for all remote desktop connection links shown within the new space.

Because the search engines that index information on the world wide web mainly do so for HTML (webpages), pictures and (in some occasions) files, the HTML table of content pages disclosed here serve as a doorway for saved 3D virtual spaces to be included in a search engine's index. Information about the 3D GUI Active X control that is responsible for running the control is coded into the HTML table of contents page through use of the HTML <object> tag along with other information disclosed here that make up a table of contents page. In this way, the 3D GUI system allows end user's to author content through their 3D virtual spaces, publish them on a server through a table of contents page and insure that these pages can be crawled and seen by search engines through the current paradigm of the world wide web where search engines primarily use crawlers or spiders to examine hyperlinks and words on webpages.

In accordance with one aspect of the present invention, the display of 3D on a computer screen may involve a run-time execution model that plays a previously programmed 3D space like a tape-recording in a window or web browser as a one-way broadcast medium. The programming of this 3D space is accomplished by hand coding a program or using an editor which prepares a file for the player. In one embodiment of the present invention, the helper applications can be accessed from the player (while an end user is using and immersed within a 3D space) through a graphical user interface of interactive icons that facilitate the display output of a file or functionality of a program within windows within a 3D space.

In one embodiment, content output into the 3D GUI application's virtual space is generated by running a helper application, such as eBay Search or Yahoo Images Search. The resulting first product image output and their product information, generated by helper application whose functional diagram is shown in FIGS. 4A and 4B. The output preferably comprises a linear map (e.g., drawn on the bottom margin of the virtual space), whereby the 3D GUI is adapted to express the map of stored searches as 3D icons with their names (should the end user mouse-over them) for specific search items expressed as a timeline. Here, the timeline is a map which represents the linear progress of animation from the first viewpoint of the first item in each 3D stack to the last viewpoint of the first item in the last 3D stack should the end user click each 3D icon in such a sequence, originally indexed in the compass. In essence each 3D icon is a hyperlink; a graphic, when clicked, that jumps to a new location or viewpoint in the current virtual space corresponding to the 3D icon. In this embodiment of the invention, each new search results in a new 3D stack created for that search result plotted in the 3D virtual space with its corresponding 3D icon drawn.

Figure 9:
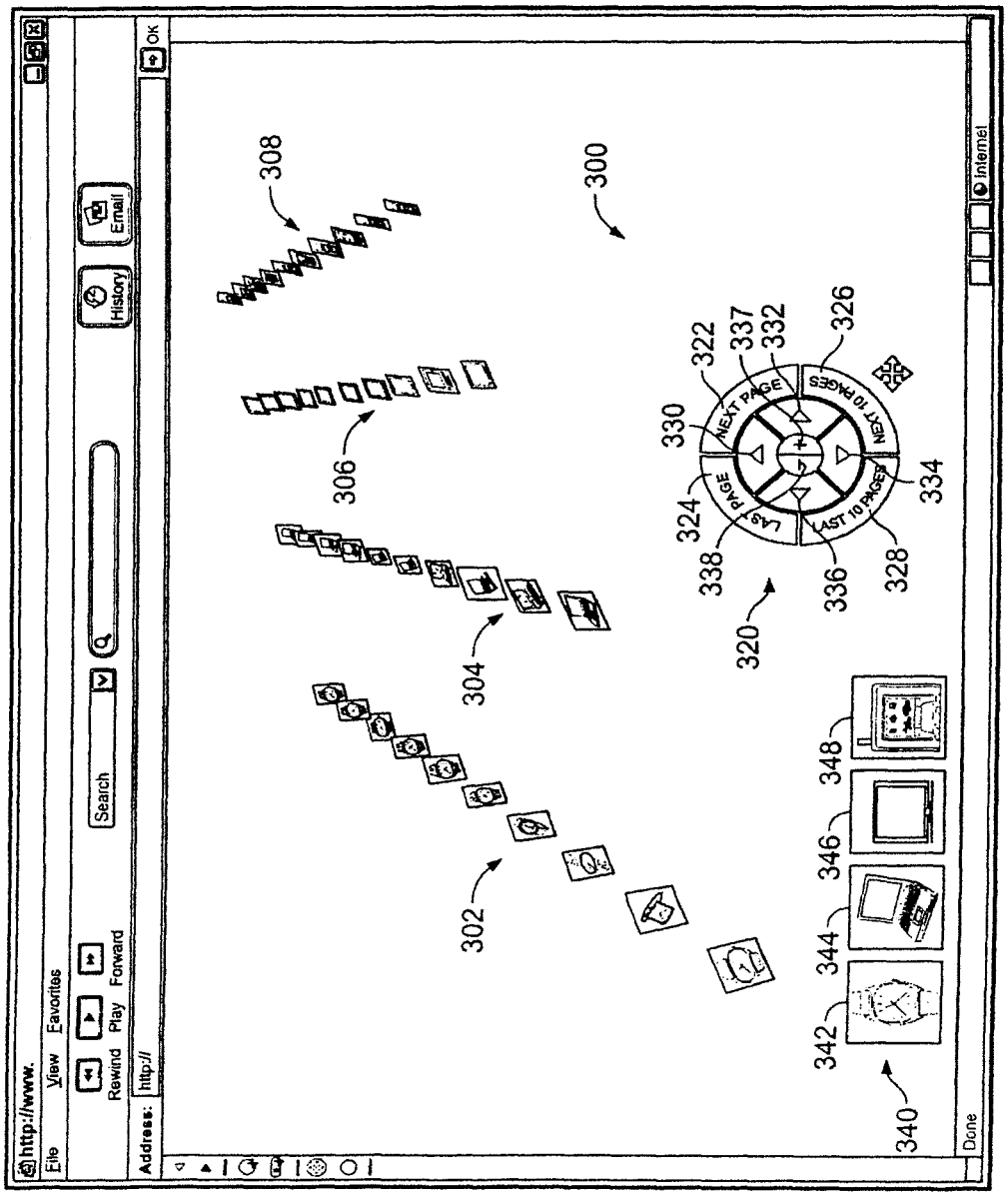
FIG. 9 illustrates one embodiment of a 3D GUI application window.

For example, in the embodiment of FIG. 9, one can see three 3D icons (342, 344, 346, 348) in the timeline 340 representing four unique searches (i.e., Rolex Daytona, IBM laptop, plasma TV, and Treo 650) done with the eBay Search helper application. Each unique search resulted in the creation of its own 3D stacks 302, 304, 306, 308 (each stack showing ten items at a time in this embodiment) as well as their own unique 3D icons plotted in a timeline map 340 at the bottom margin of the 3D virtual space 300. In this embodiment of the invention, should the end user click on any hyperlink or 3D icon, the 3D GUI would visually take the end user to the viewpoint of the first eBay search result item within its 3D stack.

In this way, end users can (1) successively enter in new search terms into the eBay helper application, (2) press the carriage return to initiate their searches, (3) visualize the search results plotted into their own unique visual column, (4) visualize the map of 3D icons expressed as a timeline on the bottom margin of the virtual space, (5) quickly navigate among (through the viewpoint of the first item in each unique 3D stack) searches as they are expressed in 3D stacks by simply clicking the hyperlink of 3D icons on the timeline and shuffle or sort through each item in each 3D stack by clicking the commands on the navigator 320, such as next page 322, last page 324, next 10 pages 326, and last 10 pages 328. Also, by clicking on the icons on the navigator 320, the end user can change their perspective or viewpoint in the 3D virtual space 300. For example, (1) the + sign 337 moves the end user forward along the +z axis in the 3D Cartesian space, (2) the − sign 338 moves the end user backward along the −z axis in the 3D Cartesian space, (3) the up arrow 330 moves the end user up along the +y axis in the 3D Cartesian space, (4) the down arrow 334 moves the end user down along the −y axis in the 3D Cartesian space, (5) the left arrow 336 moves the end user left along the −x axis in the 3D Cartesian space and the (6) right arrow 332 moves the end user right along the +x axis in the 3D Cartesian space.

In the embodiment of FIG. 11, there is provided an address: command line 464 interface or helper application whereby an end user can input a URL or address for a window, document or application in the local file system of a local operating system, etc. When an end user types http://www.yahoo.com on the address field of the command line interface, the application then draws the HTML page through the proper web browser control into the 3D virtual space as depicted. This process can be repeated indefinitely, entering in additional URLs on the command line labeled address: to have them filed in a 3D stack. Four webpages (510, 512, 514, 516) are created in a 3D GUI virtual space having sequentially typed in http://www.yahoo.com followed by a carriage return, http:www.google.com followed by a carriage return, http://www.ebay.com followed by a carriage return and then http://www.msn.com followed by a carriage return. The command line interface, helper application 464 is one way for the user to create and author HTML pages, desktop windows, documents, applications, vnc desktop, or anything else able to be visualized in a virtual space on the fly at their behest.

In an alternate embodiment of the present invention, each helper application is adapted to display information via a customized 3D interface whose graphical design and construct resembles the real world object it seeks to represent. For example, one may run a helper application for a music file. After clicking on the icon for the helper application, the 3D GUI may prompt the user or automatically locate the music file(s) on either their local computer, networked computer or world wide webservice. The helper application may then draw the interface for the music file(s) in the 3D space. The user can then interact with the graphical representation of the music file (e.g., a graphical representation of a CD) to run and play the music file.

Regardless of where the file or application displayed in the 3D GUI is located (e.g., within the same folder, subfolder, a different computer, within the network, a different network, across the internet, etc.), the user has full access to the file through its native program, or to the website through the default browser. In this way, the 3D GUI allows the output of disparate computer programs to visually converge into one expandable, changeable 3D space. The 3D GUI may also prompt the user to search or scan folders and subfolders in the local computer, network computers, webservers or the internet for any files of a given kind or criteria and display their output as windows or customized 3D real world object icons en masse in the 3D space via the helper application. This way, the user can use this feature selectively to choose only one file or automatically to choose all the files available to them.

In accordance with another aspect of the embodiments described herein, the end user is provided with the ability to selectively capture computing output and information (webpages, applications, documents, desktops or anything that can be visualized on a computer) and allowing it to visually converge within a 3D virtual space. In one embodiment of the invention, the 3D GUI offers the ability to drag-and-drop content in the form of files, folders, applications, windows, documents or anything else expressed on the end user's desktop (or networked desktop) to a 3D virtual space by locating it on the desktop or within a window on the desktop and dragging the icon(s) of the item (or the open item through its window) to the 3D GUI window's virtual space to add it to. Drag and drop describes a particular action you can make with the mouse. Click an object, such as a folder, then hold down the mouse button as you drag the object to a new location. One can drop the object by releasing the mouse button. Drag and drop can be used to easily move or embed an object or file into another.

Once the icons are dragged into the virtual space, the document, application, file or other can (i) open within a window in the virtual space or (ii) can be represented by its icon within the virtual space. In one embodiment of the invention, if the drag-and-dropped item is represented by an icon within the virtual space, it can then be double-clicked to open it within the virtual space or outside of the virtual space on the 2D desktop. For example, the icon of the Internet Explorer application within a virtual space can be dragged-and-dropped into the 3D GUI and shown as an icon.

If the end user double clicks this icon, the internet explorer window can open within the 3D virtual space. In one approach, if the end user double clicks this icon and holds the shift key at the same time, the Internet Explorer window will open in front of the 3D virtual space in a 2D window as part of the desktop. Each time the end user completes one drag-and-drop operation, all of the items in the single drag-and-drop are filed in their own 3D stack and an icon is plotted on the timeline to represent this.

In another embodiment of the invention, if an end user drags-and-drops a folder containing multiple items from the desktop, all of those items that are in the folder are drawn individually (outside of the folder) in their own 3D stack within the 3D virtual space. In addition, an icon representing this visual event through a drag-and-drop action by the end user to alter the 3D virtual space is preferably added to the timeline in accordance with its function. In this case, an icon of a folder is drawn on the timeline representing this action (drag-and-drop of a folder into the virtual space) as it is indexed in the timeline In accordance with one aspect of the present invention, the end user can re-order, move around or further organize items plotted within the 3D virtual space automatically through the script or program of a helper application (FIGS. 1A-1C—box 32) written for a specific purpose such as sorting or manually by clicking on one item or multiple items as a group (ctrl-click) and moving them to their new location through drag-and-drop. Drag and drop describes a particular action you can make with the mouse. Click an object, such as a picture or webpage, then hold down the mouse button as you drag the object to a new location. You drop the object by releasing the mouse button.

Figure 17A:
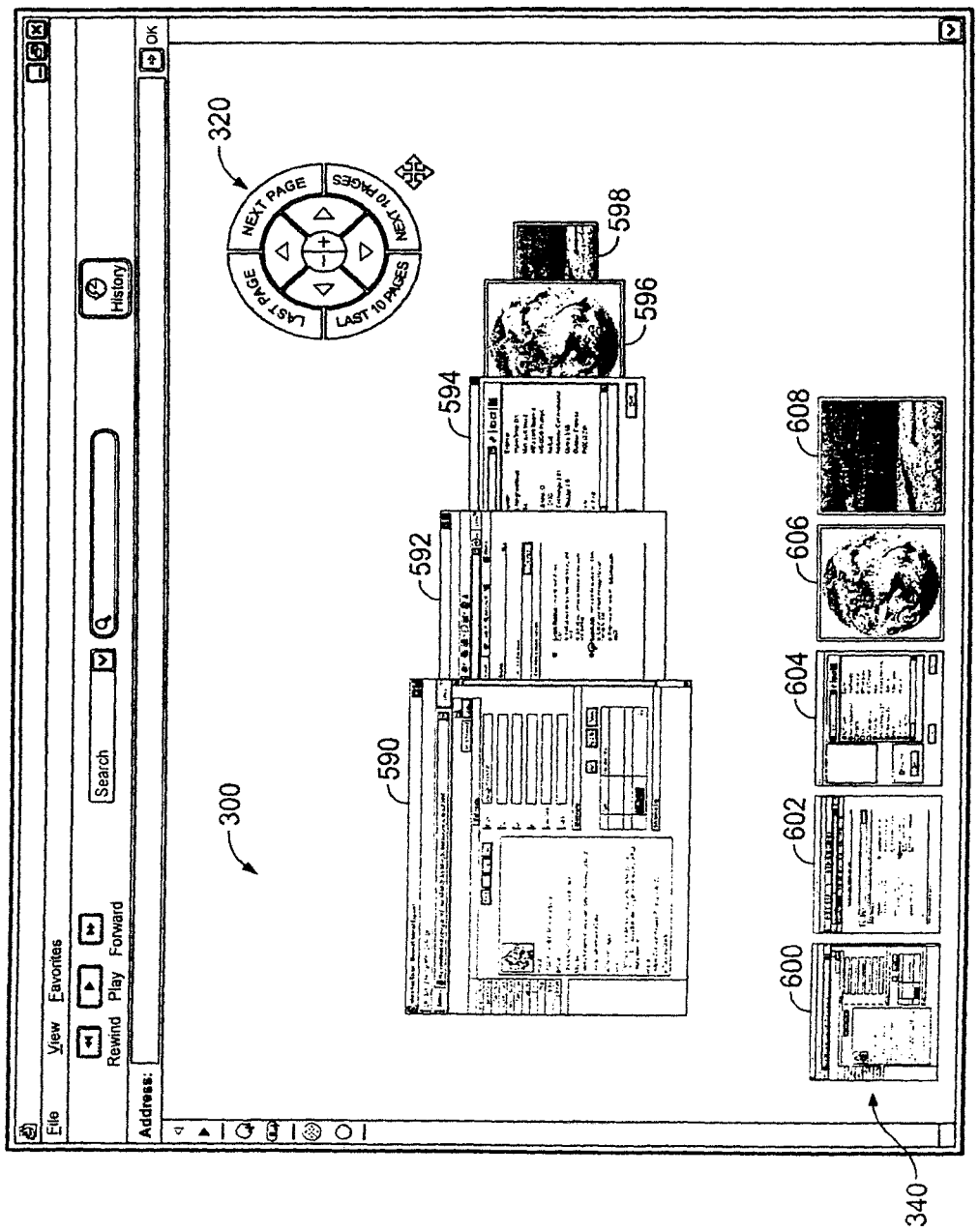
FIGS. 17A-17C illustrate exemplary arrangements of windows and timeline icons in a 3D GUI application window.
Figure 17B:
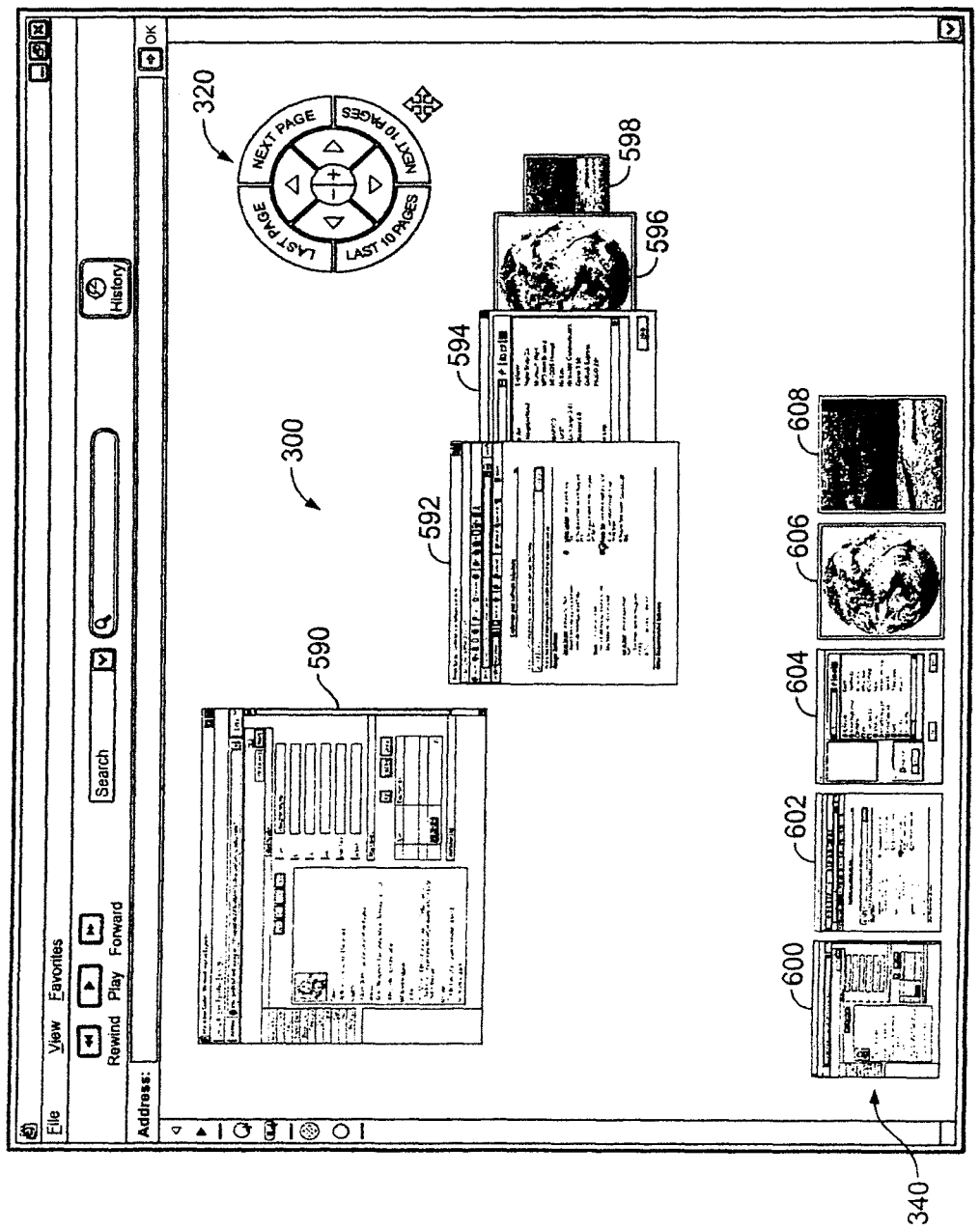
Figure 17C:
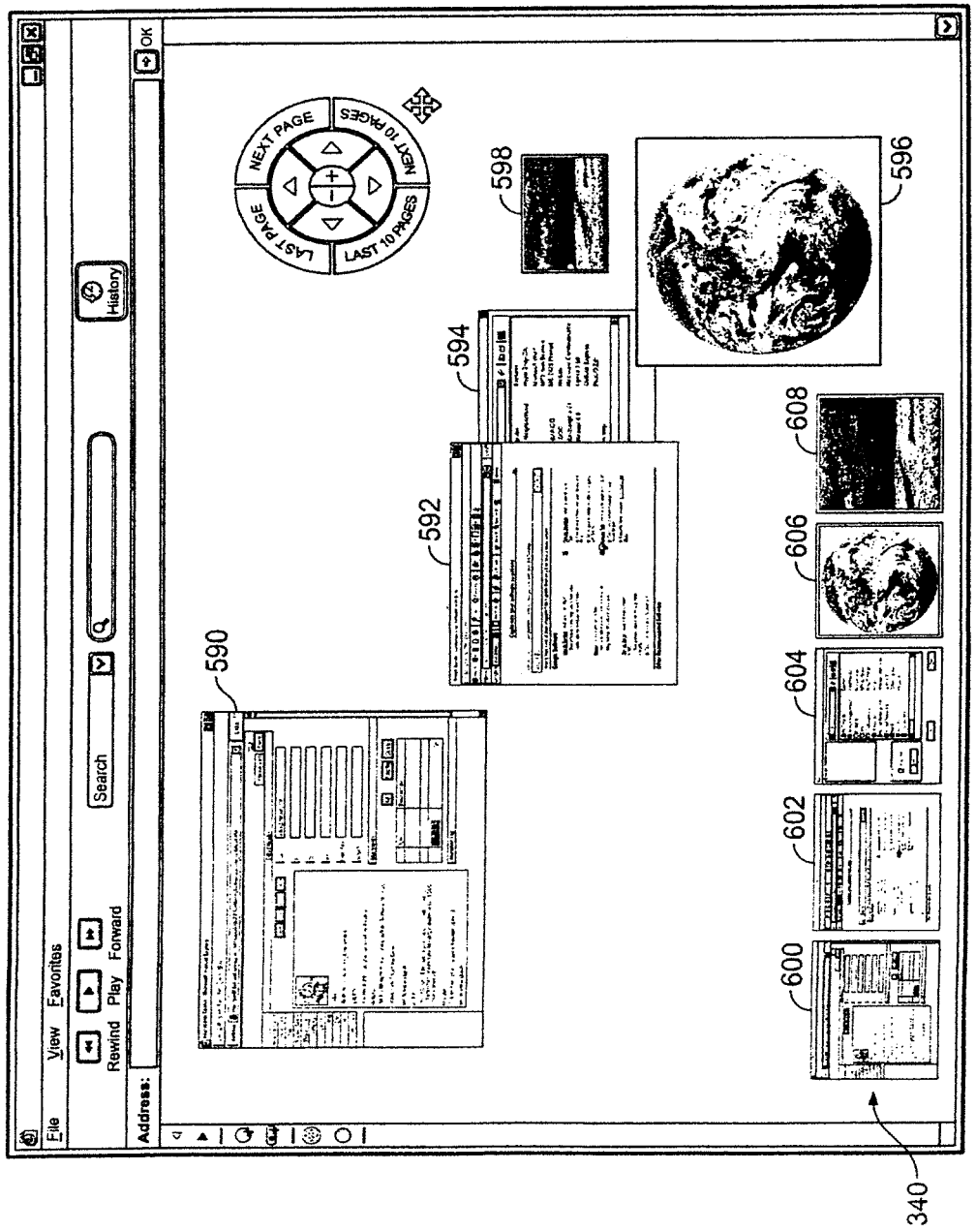

For example in one embodiment, illustrated in FIG. 17A, one can see five items (590, 592, 594, 596, and 598) in the virtual space 300, wherein the five items are represented in the timeline 340 by icons 600, 602, 604, 606, and 608, respectively. The end user has the ability to move any item in the 3D virtual space to any other location within the virtual space by translating it along the x, y axis simply by clicking it, holding down the mouse button, dragging the object to the new location and releasing the mouse button. For example, if the end user clicks the webpage 590, holds down the mouse button and drags the webpage to the left (−x) and up (+y) within the 3D virtual space and releases the mouse button, the webpage will occupy a new location (see FIG. 17B). The end user can also move items closer to their viewpoint (appearing larger) or further away from them (appearing smaller) within the virtual space by translating them along the z axis. In order to accomplish the translation of an item within the virtual space in the −z (further away) or +z (closer) direction, the end user holds down the shift key at the same time they initiate a drag-and-drop of said item. For example, with reference to FIGS. 17A-17C, if the end user clicks the image 596, holds down the mouse button and shift key down at the same time and drags the mouse backwards closer to their person, the picture 596 will be translated forward in the +z direction, appearing larger, and will occupy a new location in the virtual space. Similarly, if the end user clicks a webpage, holds down the mouse button and shift key down at the same time and drags the mouse away from their person in a forward direction, the webpage will be translated backward in the −z direction, appearing smaller, and will occupy a new location in the virtual space (not illustrated).

In accordance with one aspect of the present invention, the user is able to access helper applications while immersed in a 3D interactive scene, by clicking on icons located on a task bar at the base of the screen. By clicking on these animated 3D icons, the icons may duplicate themselves or animate themselves into the 3D scene and provide the beginning of functionality as 3D graphical objects for the tasks at hand for which the icon was initially clicked. For example, the icon on the task bar to initiate this helper application may be of an open doorway. Once the 3D open doorway icon on the task bar is clicked, a picture of a viewpoint or visual perspective of the new space may be animated from the task bar into the scene. If this picture were to be clicked from within the 3D scene, it would act as a doorway that would hyperlink the user from the current scene to another scene.

In accordance with one aspect of the present invention, the display of 3D on a computer screen may involve a run-time execution model that plays a previously programmed 3D space like a tape-recording in a window or web browser as a one-way broadcast medium. The programming of this 3D space is accomplished by hand coding a program or using an editor which prepares a file for the player. A helper application for geometry can be accessed from the player (while an end user is using and immersed within a 3D space) through a graphical user interface of interactive icons that facilitate the display or input of 2D and 3D objects into the 3D scene based on a user interface of geometrical objects (cube, spheres, cones) or real world objects (room, desk, building, stairs, CD rack). This addition of geometry into the 3D scene on-the-fly helps give meaning to an otherwise endless connection of 3D spaces for which users can fill their output with. The 3D GUI may further include a special Search and Browse application to locate 3D geometry files. The user may use the Search and Browse application, for example, to search for geometry files in (or beyond) folders and subfolders located on the local computer, network computers, webservers or the world wide web.

In accordance with one aspect of the present invention, the display of 3D on a computer screen may involve a run-time execution model that plays a previously programmed 3D space like a tape-recording in a window or web browser as a one-way broadcast medium. The programming of this 3D space is accomplished by hand coding a program or using an editor which prepares a file for the player. A helper application for audio, sound and music can be accessed from the player (while an end user is using and immersed within a 3D space) through a graphical user interface of interactive icons that provide pre-recorded audio, sound and music and may also facilitate the recording of sound through a microphone connected to the computer and inserted into the 3D scene through an icon (e.g., of a speaker, etc.) on-the-fly as a way to label (or narrate) the scene and record thoughts next to objects in the scene to further give them meaning. The user may further use the Search and Browse application, for example, to search for audio, sound, or music files in (or beyond) folders and subfolders on the local computer, network computers, webservers or the world wide web.

In accordance with one aspect of the present invention, the display of 3D on a computer screen may involve a run-time execution model that plays a previously programmed 3D space like a tape-recording in a window or web browser as a one-way broadcast medium. The programming of this 3D space is accomplished by hand coding a program or using an editor which prepares a file for the player. The 3D GUI is unique in that it combines authoring capabilities to the end user within the interactive 3D virtual space (FIG. 2—boxes 22, 24, 26). For example, a helper application for pictures, animations, movies and video can be accessed from the player through a graphical user interface of interactive icons that help locate such pictures, animations, movies and video and insert such media into the 3D scene on-the-fly at the end user's behest (see FIGS. 1A-1C—boxes 74, 86 while a user is using and immersed within a 3D space).

In one embodiment, shown in FIG. 13A, the end user selects the Desktop helper application 451 in the database module 440. The selection of the desktop tab 451 reveals files on the end user's local hard drive or network in the window pane or menu 441 below. One can view files shown on the end user's local hard drive within this window pane 441. One can also drag-and-drop (FIGS. 1A-1C—box 78) one or more of these files into the GUI 3D virtual space 300 which results in the display of said picture, video and webpage incorporated into the 3D virtual space along with their 3D interactive icons represented in the timeline 340 of the 3D virtual space 300.

Figure 15:
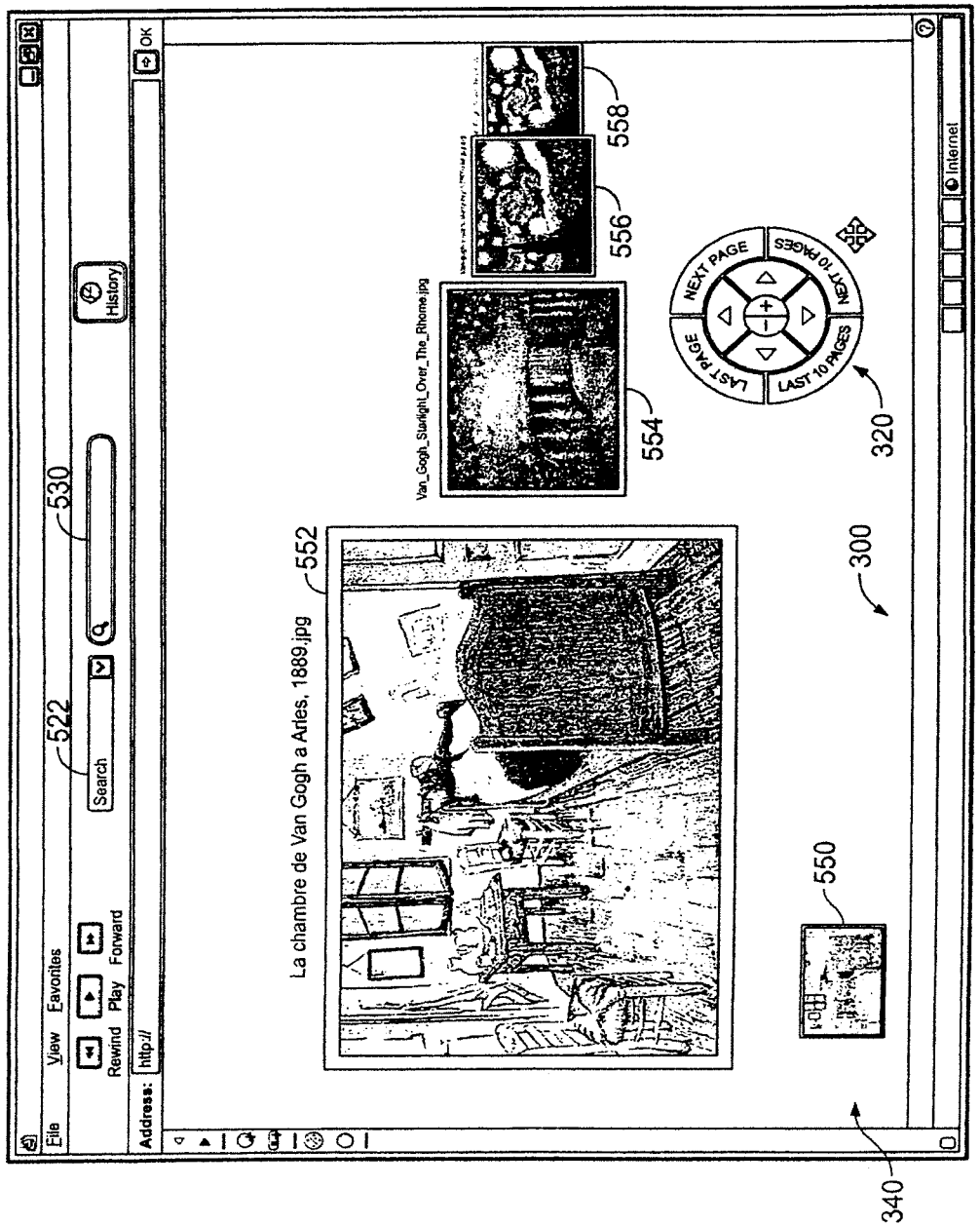
FIG. 15 illustrates an exemplary arrangements of windows and timeline icons in a 3D GUI application window.

In another embodiment, shown in FIG. 15, content output into the 3D GUI application's virtual space results from a search initiated with the helper application 522 (e.g., Yahoo! Image Search). This helper application shows the search term van gogh, having been input into this helper application's text input field 530. The resulting first four image outputs (552, 554, 556, 558), generated by helper application 522 (see functional diagrams in FIGS. 4A and 4B), created the 3D output of images and information from Yahoo! webservice, as shown in the 3D virtual space. The beginnings of a map or timeline 340 are provided (namely, an icon 550 on the bottom margin of the virtual space) whereby the 3D GUI is adapted to express the map as a timeline of stored searches through 3D icons with their names (should the end user mouse-over them). Here, the timeline 340 is a map which represents the linear progress of events within the virtual space. Clicking the 3D icons (e.g., icon 550) would animate from the first viewpoint of the first item in each 3D stack to the last viewpoint of the first item in the last 3D stack should the end user click each 3D icon in such a sequence, originally indexed in the database module.

In essence the 3D icon 550 is a like hyperlink—namely, a graphic that jumps (when clicked) to a new location or viewpoint in the current virtual space corresponding to the 3D icon. In the exemplary embodiment of FIG. 15, each new Yahoo! Image Search results in a new 3D stack created for that search result plotted in the 3D virtual space with its corresponding 3D icon drawn on the timeline. The search for information could be images, video or any other content available from a webservice. The user may further use the Search and Browse application, for example to search for pictures, animations, movies and video files in (or beyond) folders and subfolders on the local computer, network computers, webservers or the world wide web.

In accordance with another aspect of the present invention, the display of 3D on a computer screen may involve a run-time execution model that plays a previously programmed 3D space like a tape-recording in a window or web browser as a one-way broadcast medium. The programming of this 3D space is accomplished by hand coding a program or using an editor which prepares a file for the player. The 3D GUI is unique in that it combines authoring capabilities to the end user within the interactive 3D virtual space. In one embodiment, illustrated in FIG. 14, the user can access a paintbrush feature by selecting the 3D helper application tab 460 in the database module or compass 440, and then selecting the Add Paint Brush feature in the menu 441. A user interface of interactive icons 542, 544 appear in the virtual space 200, wherein the icons 542, 544 facilitate the display or output of 2D and 3D free formed lines and drawings 546 based on mouse events painted into the scene on-the-fly as a way to annotate or decorate objects in the scene or create drawings next to objects to further give them meaning. More specifically, clicking on paintbrush icon 542 causes a painting tool to appear in the virtual space 300.

In this embodiment of the invention, the 3D GUI system redraws the 3D virtual space in a cyclical fashion to reflect the changes of content and perspective within the 3D space based on the end user's input (see FIGS. 1 and 2—box 22). The program scans the event handler for input from one of the many helper applications (FIGS. 1A-1C—box 30). In this present exemplary embodiment, the helper application is the Add Paint Brush. The end user chooses the paintbrush icon 542, which changes the end user's cursor to the brush icon. The 3D GUI captures the mouse movements of the end user and draws or paints this movement (if the mouse button is depressed) which in this example is (i) an arrow, (ii) an underline and (iii) the word important painted in red (546) on to the x and y plane of the end user's viewpoint within the virtual space's 3D Cartesian space in the color red.

In accordance with another aspect of the present invention, there is provided a helper application for text that can be accessed from the player (while a user is using and immersed within a 3D space) through a graphical user interface of interactive icons that facilitate the display or output of 2D and 3D text into the scene on-the-fly as a way to label objects in the scene and write down thoughts next to objects in the scene to further give them meaning.

Figure 14:
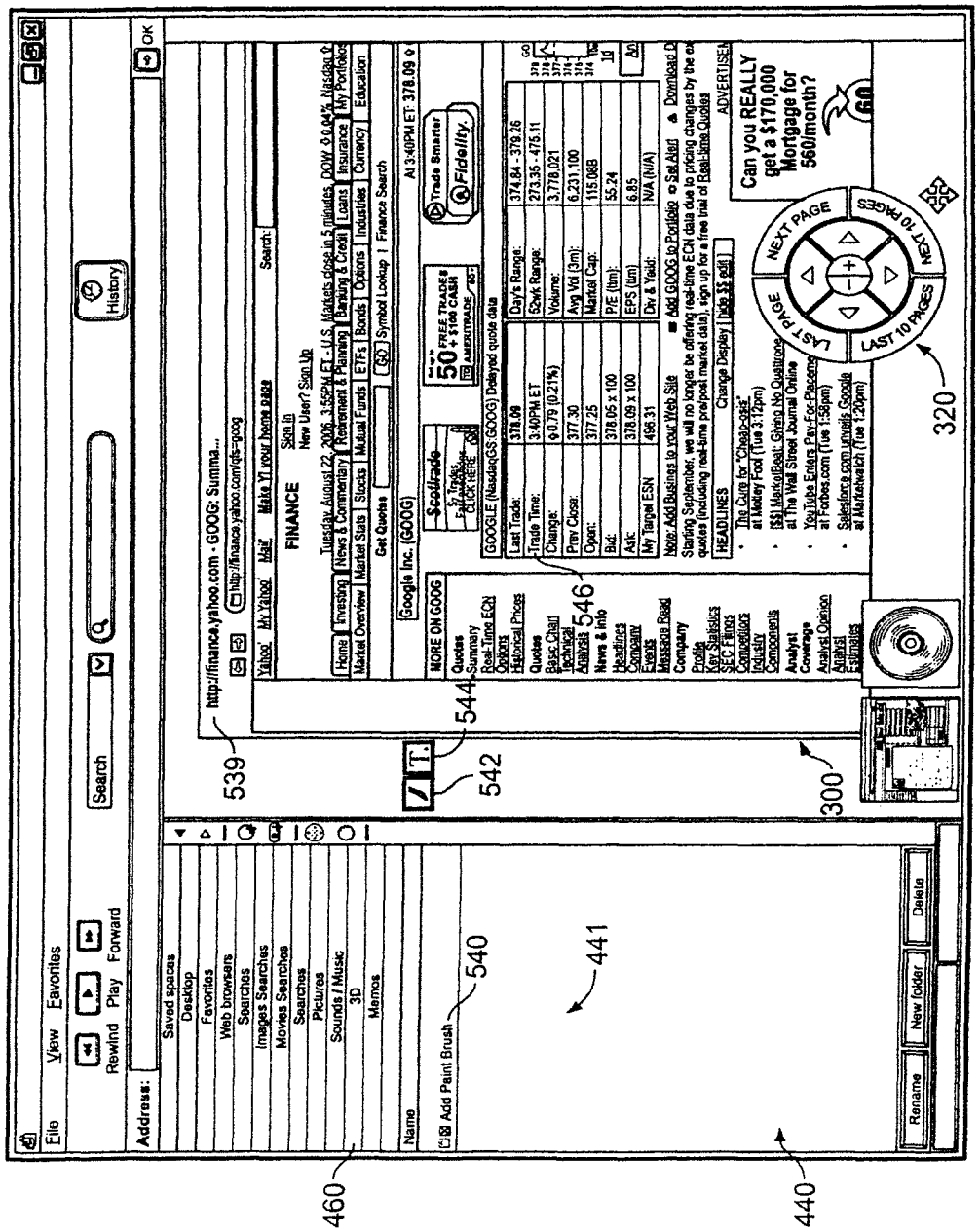
FIG. 14 illustrates an embodiment of a 3D GUI having a paintbrush feature.

In one embodiment, the helper application is an Add Text Command (FIGS. 1A-1C—box 72). For example, as shown in the embodiment of FIG. 14, when the end user chooses the add text command by clicking on the icon 544, the end user's cursor changes to the text I-beam icon. The 3D GUI captures the keyboard input of the end user and draws or paints this text onto the x and y plane of the end user's viewpoint within the virtual space's 3D Cartesian space.

In accordance with another aspect of the present invention, the display of 3D on a computer screen may involve a run-time execution model that plays a previously programmed 3D space like a tape-recording in a window or web browser as a one-way broadcast medium. The programming of this 3D space is accomplished by hand coding a program or using an editor which prepares a file for the player. Once an end user is viewing a 3D space or scene on their computer through a player on either their web browser or stand alone application, a Search application can be used to input a search term or search terms.

The 3D GUI will then conduct a world wide web search using these search terms in at least one search engine (Google, MSN, Yahoo!) by opening one 2D HTML page drawn into a window or other object into the 3D scene for each of the search engines to display the output of the HTML page for each search. The 3D GUI may then parse the search results found in each HTML page and identify each hyperlink that the search engine returned to the end user as a search result. Once identified, the 3D GUI may then open one new window in the 3D space (behind the search results page) for at least one hyperlink found on the search results page that would display the webpage found at the URL for the Hyperlink (e.g., next set of search results, a particular search results, a particular advertisement, etc.).

In one embodiment of the present invention, the 3D GUI may do this for each hyperlink found on the search results page en masse for one or more search engines, and tile them in space. This plotting of search results into a 3D scene is beneficial to consumers as it expands the visual computing space one has available for both web searches and internet browsing.

In another embodiment of the present invention, the 3D GUI makes use of dormant computing time while the end user is connected to a network. For example, most users will conduct a search, scan the page and click one link. Once they realize that the link they clicked was insufficient, they will click the back button on their browser, scan the page again, and click another link. The time the consumer is scanning the page, clicking one link, reading the page at the new link and returning back to the original search results page is dormant computing time where the computer is connected to the world wide web and able to download all (or portions of) the hyperlink pages found on the original search results page, continuously, and draw these results into the 3D scene. The 3D GUI allows users to systematically visit a viewpoint that shows each search results page one at a time for easy viewing. The graphical user interface will have options for saving the current search results into a file and post the name of the search, name of the hyperlink, URL, date/time and/or source onto the database module.

Using this same seemingly unlimited 3D visual space, the 3D GUI may allow the user to automatically parse any open or active webpage to (i) determine which HTML pages are links to it, (ii) determine which HTML pages it links to, and (iii) plot these pages as groups or clusters. There may further be a visual grouping or cluster of pages drawn in a 3D space that link to any given active webpage. In this way, the user can determine in one glance at a given viewpoint of a clustering of webpages in the 3D space which pages to click that either link to their active page or from their active page. In addition, the user may be able to visually expand this network of webpages by choosing any active webpage in any cluster drawn in the 3D space and creating a new cluster of webpages that this active page links to or by creating a new cluster of webpages that is linked to this active page. In this way, the 3D GUI creates a visual gestalt of the world wide web at the behest of the user.

In accordance with another aspect of the present invention, the display of 3D on a computer screen may involve a run-time execution model that plays a previously programmed 3D space like a tape-recording or animation in a window or web browser as a one-way broadcast medium. The programming of this 3D space is accomplished by hand coding a program or using an editor which prepares a file for the player. Once an end user is viewing a 3D space or scene on their computer through an interactive player on either their web browser or stand alone application, the 3D GUI may deliver textual, audio, video, multimedia, web advertisements and/or 3D advertisements whose presentation is automatically incorporated into the programming that is responsible for the current view of 3D. This way, based on user inputs that help define the subject or context for which they are either searching or computing, the 3D GUI may deliver one or a combination of advertisements (e.g., advertisements previously mentioned into the 3D space, etc.).

The 3D GUI described herein is an improvement over existing players that play 3D animation in that 3D GUI described herein anticipates an end user's input to navigate and add content to the 3D virtual spaces (through helper applications), on-the-fly, that it allows an end user to create; merging the editor concept and player concept of 3D into one hybrid editor and player. In doing so, the GUI system redraws the 3D virtual space in a cyclical fashion to reflect the changes of content and perspective within the 3D space based on the end user's input (FIGS. 1 and 2—box 22). The program scans the event handler for input from one of the many helper applications (FIGS. 1A-1C—box 30).

Figure 19:
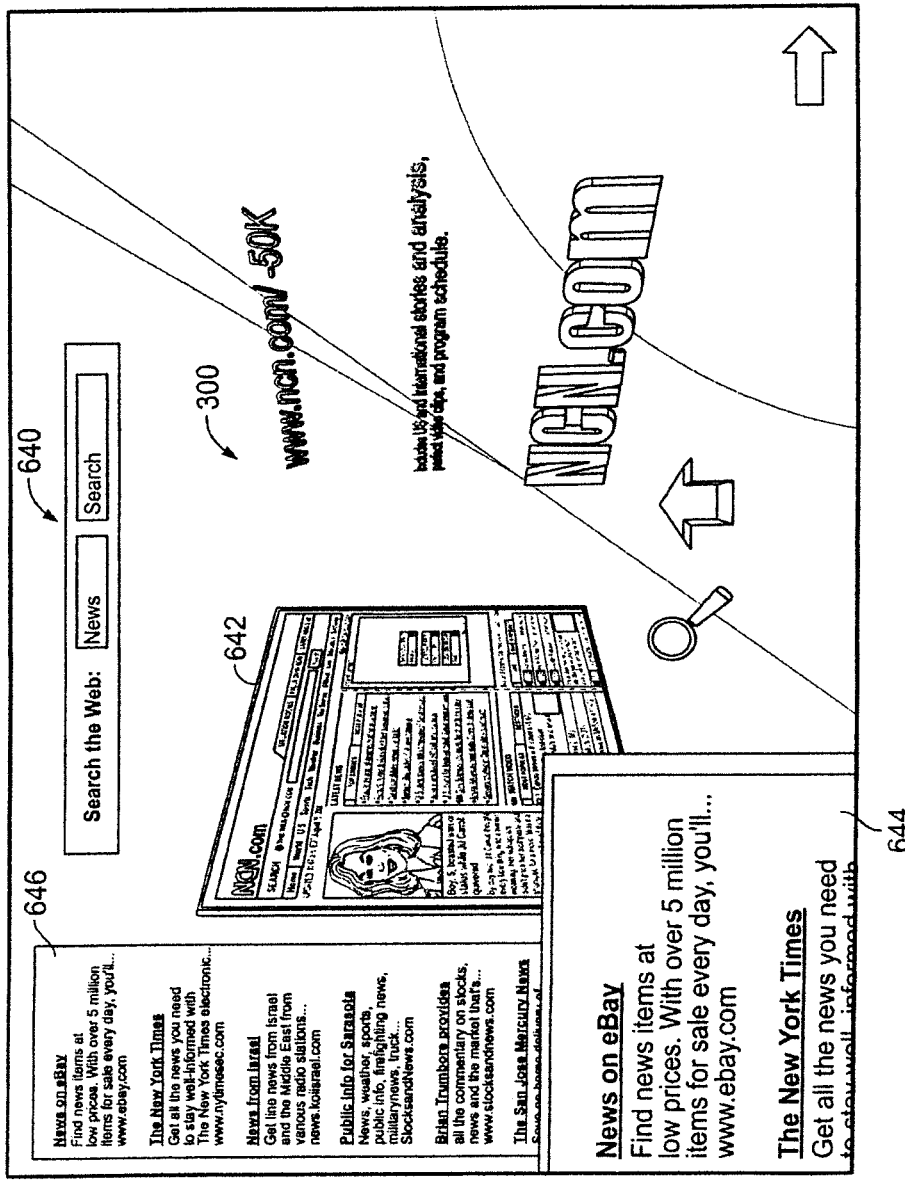
FIG. 19 illustrates an embodiment of a 3D GUI that delivers advertisements into the virtual space for the end user.

The helper applications can initiate the output of content into the 3D virtual space such as but not limited to (i) loading a custom script and its icon to alter the application logic of the 3D virtual space through programmatic access to stream in new information and take on a new theme (a.k.a. helper application such as eBay Search, (ii) visit a viewpoint command to change the visual perspective of the end user in the current virtual space or another virtual space that is hyperlinked to, (iii) record the current viewpoint in the virtual space, (iv) add the output of the desktop the virtual space, (v) add a web browser to the virtual space to view a document, webpage or files and folders on the desktop through a window in the 3D virtual space, (vi) add text command to virtual space, (vii) add a picture to the 3D virtual space, (viii) add music to the 3D virtual space (FIG. 22—Item A), (iv) add video to the 3D virtual space, (x) record sound and at add it to the 3D virtual space, (xi) add a map to the 3D virtual space, (xii) add 3D through a VRML, X3D or other file format to the 3D virtual space, and/or (xiii) add advertising to the 3D virtual space in the form of text, pictures, video or other multimedia (e.g., the embodiment of FIG. 19, described in further detail below). The addition of such content to a 3D virtual space within the 3D GUI system is diagrammed in FIGS. 1A-1C—boxes 32, 42, 50, 58, 60, 62, 72, 74, 84, 86, 88, 90, 92, 94, 104.

Once the 3D GUI scene recalculates the geometry in the scene (FIGS. 1 and 2—box 24) based on the addition of output, information and content to the 3D virtual space it then redraws the scene (FIGS. 1 and 2—box 26), to reflect the addition of this new content. The 3D GUI system will determine the subject or meaning of the output, information and content within the 3D virtual space by indexing all the words associated with (i) the names of the files, HTML pages, viewpoints, hyperlinks and any other available information associated with the 3D virtual space content in the scene, (ii) actual data within the files, HTML pages, viewpoints, hyperlinks and other available information within the 3D virtual space or words entered into the input field of helper application (FIGS. 1A-1C—box 106), (iii) sort the indexed words by frequency to determine subject of 3D virtual space by identifying most frequently appearing words or utilize other method to determine meaning, (iv) send subject of 3D virtual space to advertising server through internet request (FIGS. 1A-1C—box 110), (v) return appropriate text, picture(s), video, sound, music, hyperlinks or other advertisement content and respective software code from advertising server, webservice or other location, (vi) draw text, picture(s), video(s), sound(s), music, hyperlinks or other ad content from advertising server or other location into 3D virtual space using program code (FIGS. 1A-1C—box 114) and (vii) redraw the scene (FIGS. 1 and 2—box 26). Those skilled in the art may identify this process of making an advertising request through the internet as many web sites utilize this technology for delivering advertising through the internet.

In one embodiment, shown in FIG. 19, when the end-user inputs the search term news into the helper application 640 (e.g., Yahoo! Search), the helper application 640 returns a webpage 642 (e.g., URL http:www.ncn.com). The 3D GUI system can further utilizes the input term (in this case news) (see FIGS. 1A-1C—box 104) and returns a group of advertising text 644. The advertising text 644 can be incorporated into the 3D virtual space 300 by presenting the text along with its: (a) hyperlink and associated title (News on eBay); (b) description (Find news items at low prices. With over 5 million items for sale every day, you'll . . . ); and (c) url www.ebay.com, thereby resulting in a more detailed advertisement 646. Currently, text advertisements are prevalent on the world wide web and therefore have been incorporated in this embodiment of the invention. However, it will be understood that other forms of advertising, such as, for example, picture(s), video(s), sound(s), music, hyperlinks, and/or multimedia, and/or combinations thereof, can be incorporated into the 3D virtual space 300.

The present invention provides many advantages over the prior art, including, but not limited to, increased space on the user's desktop, eliminating the need to constantly open and close programs or hide and reveal them each time the user needs them, utilizing dormant computing time to download and/or display information, reducing mouse-clicks and offering a more natural alternative to accessing programs and documents than the traditional folders-within-folders storage system. For example, in the exemplary embodiment of FIG. 12, forty webpages are output into the 3D virtual space 300 organized into their respective 3D stacks 470, 472, 474, 476, and 478, wherein the stacks are represented in the timeline 340 as icons 480, 482, 484, 486, and 488, respectively. As explained above, the present invention also improves the web browser and desktop experience by offering a novel 3D graphical user interface.

In accordance with yet another aspect of the embodiments described herein, there is provided a memory management method whereby computer memory is allocated to the 3D GUI system at the program's request and freed up for reuse when it is no longer needed by unloading memory. More specifically, there is provided a method of using virtual memory whereby a portion of the hard disk is used to swap out this data when insufficient RAM exists to hold all such data. In one embodiment, an end user plots the output of information into the 3D GUI within 3D stacks whereby each new visual event additionally marked with an icon on the timeline. Additional output of information into the 3D GUI virtual space results in the creation of new 3D stacks along with new icons drawn in succession on the timeline creating what is called linear path of the end user's actions through a virtual space as expressed with through a timeline and 3D stack. If this process continues indefinitely, the memory or electronic holding place for this data that the 3D GUI system can access quickly will be used up. In order to create an ending computer experience whereby the end user need not reach such a memory limit, provided herein is a system whereby once a memory limit is reached, the 3D GUI system marks a point in the program representing the position of the end user on this linear path and unloads the memory by saving it to virtual memory. This freeing up of memory will allow the end user to continually output new information into the virtual space. This process of unloading memory to virtual memory and continually outputting new information into the virtual space can go on indefinitely. Should the end user backtrack or retrace one's course over a portion of the linear path (or track) that has already been completed, the 3D GUI system will reload to memory the information stored in virtual memory once the end user revisits any mark on the linear path.

The present invention can be used in a number of applications, including, but not limited to, search engines, desktops, visual music download services, shopping malls, collaborative space for shared documents, collaborative space for video conferencing, tool for publishing webpages, virtual networked computer system, interface for cable TV sets or multimedia PCs, computing interface for large flat panel displays, forum for educational training and visualization, and e-mail visualization programs, just to name a few. Even though the present invention is described here within the embodiment of an operating system that utilizes a desktop personal computer with a monitor, those skilled in the art will be able to adapt the system to work on other electronic devices, such as, for example, cell phones, pdas, handheld mobile devices, flat panel displays, or the like, etc., without giving up the spirit of the invention.

Having thus described a preferred embodiment of a method and system for providing an improved three-dimensional graphical user interface, it should be apparent to those skilled in the art that certain advantages of the within system have been achieved. It should also be appreciated that various modifications, adaptations, and alternative embodiments thereof may be made within the scope and spirit of the present invention. For example, the improved 3D GUI has been presented in the context of a windows operating system, but it should be apparent that many of the inventive concepts described above would be equally applicable for other operating systems and devices.

What is claimed is:

1. A method for using a three-dimensional (3D) space to display a plurality of items to a user via a screen on a mobile computing device, where each one of said plurality of items can be interacted with to acquire additional information, said 3D space including a first virtual space that is initially visible to said user and a second and third virtual space that is initially not visible to said user, comprising:

displaying at least a first one of said plurality of items in said first virtual space and a second one of said plurality of items in said second virtual space, wherein only one of said first and second virtual space is displayed to said user at a time, wherein said plurality of items displayed in said 3D space are programmatic links to photos stored on said mobile device and programmatic links to information available via the internet; and displaying a map in both said first and second virtual spaces, said map simultaneously identifying both said first and second ones of said plurality of items, thereby allowing said user to be aware of said second one of said plurality of items in said first virtual space even though said second one of said plurality of items is not displayed in said first virtual space and aware of said first one of said plurality of items in said second virtual space even though first one of said plurality of items is not displayed in said second virtual space;

wherein moving through said 3D space from said first virtual space to said second virtual space results in movement of said first one of said plurality of items off of a first side of said screen and movement of said second one of said plurality of items onto a second side of said screen;

wherein said first one of said plurality of items can be interacted with to receive corresponding information in said third virtual space, said corresponding information replacing said first one of said plurality of items and said map so that said first one of said plurality of items and said map are not displayed to said user in said third virtual space.

2. The method of claim 1, wherein said corresponding information can be interacted with to receive additional information, said additional information replacing said corresponding information.

3. The method of claim 2, further comprising the step of displaying a compass in both said first and second virtual spaces, where at least a portion of said compass can be clicked on to acquire a list of items corresponding to said plurality of items displayed in said 3D space, wherein one of said list of items corresponding to said first one of said plurality of items can be interacted with to acquire said additional information.

4. The method of claim 1, wherein said first one of said plurality of items is larger than said second one of said plurality of items, indicating that said first one of said plurality of items is closer than said second one of said plurality of items.

5. The method of claim 1, wherein said corresponding information comprises at least first and second information, said second information is being presented to said user by moving at least a portion of said first information off of said screen and moving at least a portion of said second information onto said screen.

6. The method of claim 1, wherein said map identifies said first and second items via a plurality of icons arranged with respect to locations of said first and second ones of said plurality of items in said 3D space.

7. The method of claim 6, wherein interacting with a second one of said plurality of icons results in moving through said 3D space from said first virtual space to said second virtual space.

8. The method of claim 1, further comprising the step of displaying a navigator in said first virtual space, wherein said step of moving through said 3D space is a result of said user interacting with said navigator.

9. A system for using a three-dimensional (3D) space to display a plurality of items to a user on a mobile computing device, where each one of said plurality of items can be interacted with to acquire additional information, said 3D space including a first virtual space that is initially visible to said user and a second and third virtual space that is initially not visible to said user, comprising:

a display device;

at least one processor module; and a memory device comprising executable code for:

displaying on said display device at least a first one of said plurality of items in said first virtual space and a second one of said plurality of items in said second virtual space, wherein only one of said first and second virtual spaces is displayed to said user at a time, wherein said plurality of items displayed in said 3D space are programmatic links to photos stored on said mobile device and programmatic links to information available via the internet; and displaying a map in said first and second virtual spaces on said display device, said map simultaneously identifying said first one of said plurality of items and at least a said second one of said plurality of items, thereby allowing said user to be aware of said second one of said plurality of items in said first virtual space even though said second one of said plurality of items is not displayed in said first virtual space and aware of said first one of said plurality of items in said second virtual space even though said first one of said plurality of items is not displayed in said second virtual space;

wherein moving through said 3D space from said first virtual space to said second virtual space results in movement of said first one of said plurality of items off of a first side of said display device and movement of said second one of said plurality of items onto a second side of said display device;

wherein said first one of said plurality of items can be interacted with to receive corresponding information in said third virtual space, said corresponding information replacing said first one of said plurality of items and said map so that said first one of said plurality of items and said map are not being displayed in said third virtual space.

10. The system of claim 9, wherein said corresponding information can be interacted with to receive additional information, said additional information replacing said corresponding information.

11. The system of claim 10, wherein said executable code is configurable to display a list of items corresponding to said plurality of items displayed in said 3D space, wherein one of said list of items corresponding to said first one of said plurality of items can be interacted with to acquire said additional information.

12. The system of claim 9, wherein said plurality of items are sized to indicate their depth in said 3D space.

* * * * *